United States Patent
Woodgate et al.

(10) Patent No.: US 10,591,772 B2
(45) Date of Patent: Mar. 17, 2020

(54) ILLUMINATION APPARATUS HAVING AN ARRAY OF MICRO-LEDS AND A PLURALITY OF CATADIOPTRIC OPTICAL ELEMENTS CONFIGURED TO OUTPUT LIGHT FROM THE ARRAY OF MICRO-LEDS

(71) Applicants: RealD Spark, LLC, Beverly Hills, CA (US); Optovate Limited, Hemel (GB)

(72) Inventors: Graham J. Woodgate, Henley-on-Thames (GB); Jonathan Harrold, Leamington Spa (GB); Michael G. Robinson, Boulder, CO (US)

(73) Assignee: RealD Spark, LLC, Beverly Hills, CA (US)

( * ) Notice: Subject to any disclaimer, the term of this patent is extended or adjusted under 35 U.S.C. 154(b) by 0 days.

(21) Appl. No.: 16/298,052

(22) Filed: Mar. 11, 2019

(65) Prior Publication Data
US 2019/0278135 A1    Sep. 12, 2019

(30) Foreign Application Priority Data

Mar. 9, 2018    (GB) ................................... 803767.1
Nov. 30, 2018    (GB) ................................... 819612.1

(51) Int. Cl.
*G02F 1/1335*    (2006.01)
*F21V 5/00*    (2018.01)

(52) U.S. Cl.
CPC ........ *G02F 1/133605* (2013.01); *F21V 5/002* (2013.01); *G02F 1/133603* (2013.01); *G02F 1/133606* (2013.01); *G02F 1/133608* (2013.01)

(58) Field of Classification Search
CPC ......... G02F 1/133603; G02F 1/133605; G02F 1/133607; F21V 5/002; F21Y 2115/10; F21Y 2105/10
See application file for complete search history.

(56) References Cited

U.S. PATENT DOCUMENTS

| 6,547,423 B2 | 4/2003 | Marshall et al. |
| 7,171,874 B1 * | 2/2007 | Huang ................. B25B 13/461 403/329 |

(Continued)

FOREIGN PATENT DOCUMENTS

| EP | 1387412 A | 2/2004 |
| EP | 1835550 A | 9/2007 |

(Continued)

OTHER PUBLICATIONS

International search report and written opinion of international searching authority in co-pending PCT/US2019/021570, dated May 24, 2019.

*Primary Examiner* — Robert J May
(74) *Attorney, Agent, or Firm* — Penny L. Lowry; Neil G. J. Mothew

(57) ABSTRACT

A directional illumination apparatus comprises a catadioptric micro-optic array comprising a reflective surface comprising light reflecting facets and an output transmissive surface comprising refractive structures. An array of micro-LEDs is arranged between the reflective surface and output transmissive surface and arranged to illuminate the reflective surface. The light reflecting facets and refractive structures cooperate to provide a uniform output illumination across the output aperture of the array with collimated output. A thin and efficient illumination apparatus may be used for switching display backlighting or environmental illumination applications.

56 Claims, 33 Drawing Sheets

(56) References Cited

U.S. PATENT DOCUMENTS

| | | |
|---|---|---|
| 2004/0239243 A1 | 12/2004 | Roberts et al. |
| 2008/0043466 A1 | 2/2008 | Chakmakjian et al. |
| 2008/0258162 A1 | 10/2008 | Koung et al. |
| 2010/0165635 A1 | 7/2010 | Chen et al. |
| 2010/0195330 A1 | 8/2010 | Schaefer et al. |
| 2011/0038150 A1 | 2/2011 | Woodgate et al. |
| 2012/0119237 A1 | 5/2012 | Leatherdale et al. |
| 2013/0258663 A1 | 10/2013 | Woodgate et al. |
| 2017/0261179 A1 | 9/2017 | Wu et al. |

FOREIGN PATENT DOCUMENTS

| | | |
|---|---|---|
| EP | 1890343 A | 2/2008 |
| EP | 1986023 A | 10/2008 |
| EP | 2182783 A | 5/2010 |
| GB | 2464102 A | 4/2010 |
| JP | 2000323755 A | 11/2000 |
| WO | 2010038025 A | 4/2010 |
| WO | 2012052722 A | 4/2012 |
| WO | 2018185476 A | 10/2018 |

* cited by examiner

ILLUMINATION APPARATUS HAVING AN ARRAY OF MICRO-LEDS AND A PLURALITY OF CATADIOPTRIC OPTICAL ELEMENTS CONFIGURED TO OUTPUT LIGHT FROM THE ARRAY OF MICRO-LEDS

TECHNICAL FIELD

The present disclosure relates to an illumination apparatus comprising a plurality of addressable light-emitting elements aligned to a plurality of catadioptric optical elements. Such an apparatus may be used as a high definition directional backlight for a liquid crystal display (LCD). The apparatus may further be used to provide directional lighting from a spatially uniform area.

BACKGROUND

Thin substrate and polymer substrate LCD panels can provide mechanical characteristics such as flexibility that is similar to organic LED (OLED) displays. Such thin substrate LCDs desirably use backlights with similar mechanical characteristics.

High dynamic range LCDs (HDR-LCD) can achieve dynamic ranges that are superior to that which can be provided by an LCD optical mode alone. An array of light sources such as LEDs (light emitting diodes) that is addressed with lower resolution image data is provided in a local dimming LCD backlight, such that dark areas of an image are illuminated by the backlight with low luminance, and bright areas are illuminated with high luminance.

One type of LCD backlight comprises a light guide plate, and array of input light sources such as LEDs at one end of the light guide plate. Light that propagates by total internal reflection within the waveguide is output by means of surface features that adjust the propagation angle of light within the waveguide and allow extraction at angles close to grazing the outside of the waveguide. Such light is directed in a normal direction to the LCD by means of a turning film and/or rear reflectors. Such optical stacks may have high efficiency, but have multiple optical components with total backlight thickness typically 1 mm or greater. Such an edge illuminated light guide plate is not typically appropriate for two-dimensional local dimming for HDR-LCD illumination, or free-form shaped LCD.

Other known backlights incorporate an array of light emitting diodes (LEDs) in a matrix behind the LCD such as described in US patent application number US20170261179 comprises a plurality of spatially separated packaged LEDs and a multiple "batwing" optical elements, each batwing optical element arranged to direct light from the packaged LED in a lateral direction. Such light is strongly diffused to provide output illumination. Such backlights require expensive pick-and-place LED and individual optics alignment and have a high thickness and reduced efficiency in comparison to edge illuminated backlights.

Illumination systems for environmental lighting such as automobile headlights, architectural, commercial or domestic lighting may provide a narrow directional light output distribution, for example by means of focussing optics to provide spotlighting effects, or can achieve a wide directional light output distribution for example by means of diffusing optics.

In this specification LED refers to an unpackaged LED die chip extracted directly from a monolithic wafer, i.e. a semiconductor element. This is different from packaged LEDs which have been attached to a lead frame in order to provide electrodes and may be assembled into a plastic package to facilitate subsequent assembly. Packaged LEDs are typically of dimension greater than 1 mm, and more typically of dimension greater than 3 mm and are assembled by conventional Printed Circuit Board assembly techniques including pick and place methods. The accuracy of components placed by such assembly machines may typically be about plus or minus 30 micrometres. Such sizes and tolerances prevent application to very high resolution displays.

Micro-LEDs may be formed by array extraction methods in which multiple LEDs are removed from a monolithic wafer in parallel and may be arranged with positional tolerances that are less than 5 micrometres.

White LED lighting sources can be comprised of separate spectral bands such as red, green, blue and yellow, each created by a separate LED element. Such sources enable users to resolve the separate colours, and as a result of the separation of the sources in the lamp, can create coloured illumination patches. It would be desirable if the sources were homogenized so that their separation was less than the visual resolution limit.

Catadioptric elements combine refractive surfaces (dioptrics) and reflective surfaces (catoptrics), which may provide total internal reflection or reflection from metallised surfaces. Backlights employing catadioptric optical elements with small output luminous intensity solid angles are described in WO2010038025 incorporated by reference herein in its entirety.

BRIEF SUMMARY

According to a first aspect of the present disclosure there is provided an illumination apparatus comprising: a plurality of LEDs arranged in an LED array, wherein the plurality of LEDs are micro-LEDs or mini-LEDs, each of the plurality of LEDs being arranged to output light having a respective light output distribution; and a plurality of catadioptric optical elements arranged in a catadioptric optical array, each catadioptric optical element comprising a reflective surface and a transmissive surface facing the reflective surface, wherein: for each catadioptric optical element, the reflective surface is arranged to receive light output from one or more of the LEDs through the transmissive surface and to reflect the received light back through the transmissive surface, thereby to provide re-directed light having a respective light output distribution, wherein the light output distribution of the re-directed light provided by each catadioptric optical element has a luminous intensity half maximum solid angle that is smaller than the luminous intensity half maximum solid angle of the light output distribution of the light output by each of the plurality of LEDs.

Advantageously a thin directional illumination apparatus may be provided which has a pitch that is significantly greater than the thickness. A uniform output illumination profile may be achieved, such that the illumination apparatus may be provided as a backlight for a transmissive spatial light modulator with high uniformity. For a given power consumption the head-on output luminance may be increased in comparison with Lambertian illumination. For a given head-on luminance the power consumption may be increased.

At least some of the light from the plurality of LEDs may be guided, at least in part via total internal reflection, within the catadioptric optical array.

Each of the plurality of LEDs may be arranged on a first surface of at least one transmissive LED support substrate;

and a transmissive output surface is provided by a second surface of the transmissive LED support substrate; wherein the second surface of the transmissive LED support substrate faces the first surface of the transmissive LED support substrate. Advantageously the number of components in the illumination apparatus may be reduced, reducing cost and complexity as well as reducing thickness.

The reflective surface of each catadioptric optical element may be arranged on a first surface of an input substrate, and a second surface of the input substrate facing the reflective surface comprises a transmissive input surface; wherein the first surface of the transmissive LED support substrate faces the transmissive input surface. Advantageously device thickness may be reduced for a given optical pathlength.

The light from the plurality of LEDs that may be guided within the catadioptric optical array is guided, at least in part via total internal reflection, between the reflective surface and the transmissive input surface. Advantageously light from the micro-LEDs may be distributed over large areas. The area illuminated by each micro-LED may be increased so that fewer micro-LEDs are needed, reducing cost.

Each catadioptric optical element may comprise an optical axis.

Each optical axis may be aligned in correspondence with a respective one or more of the LEDs, and each of the LEDs may be aligned in correspondence with the optical axis of only one of the catadioptric optical elements.

The illumination apparatus may further comprise a further plurality of LEDs arranged in an LED array, wherein the further plurality of LEDs are micro-LEDs or mini-LEDs. Each optical axis may be offset from one or more of the LEDs of the further plurality of LEDs. Each of the LEDs of the further plurality of LEDs may be offset from the optical axis of at least one of the catadioptric optical elements.

For each catadioptric optical element, the reflective surface may be arranged to receive light output from one or more of the further plurality of LEDs through the transmissive surface and to reflect the received light back through the transmissive surface, thereby to provide re-directed light having a respective light output distribution.

The light output distribution of the re-directed light provided by each catadioptric optical element using light output from the further plurality of LEDs may have a luminous intensity half maximum solid angle that is greater than the luminous intensity half maximum solid angle of the re-directed light provided by each catadioptric optical element using light output from the plurality of LEDs.

The light output distribution may be switched between a narrow output solid angle and a wide solid angle output. Advantageously a display may be provided that in one mode of operation provides a low stray light output for example to provide privacy, high efficiency for head-on viewing, or night operation and a second mode of operation with a wide range of viewing freedom and increased uniformity.

For each catadioptric optical element of the catadioptric optical array, the transmissive surface may comprise at least one refractive light output structure arranged on the transmissive surface and aligned in correspondence with the optical axis of the catadioptric optical element. Advantageously light output may be achieved with controllable angular distribution in areas of the output surface that would otherwise be shielded by the micro-LED, providing increased uniformity for a wide range of output angles, and minimising dark spot appearance in the region of the micro-LED. Uniformity is increased.

The input substrate may be formed as an integrated body that extends between the optical axes of the plurality of catadioptric optical elements. Advantageously a common alignment step may be provided for multiple catadioptric optical elements to the plurality of micro-LEDs, reducing cost and complexity and increasing robustness.

The LED support substrate may be formed as an integrated body that extends between the optical axes of the plurality of catadioptric optical elements. Advantageously many micro-LEDs may be arranged on the substrate in parallel, providing a known separation. Uniformity of alignment to the catadioptric optical array may be provided, increasing uniformity, reducing alignment cost and increasing robustness.

A transparent material may be provided between the first surface of the transmissive LED support substrate and the transmissive surface of the catadioptric element. The light from the plurality of LEDs that is guided within the catadioptric optical array may be guided between the reflective surface and the second surface of the transmissive LED support substrate. A transparent material with a lower refractive index than a material from which the input substrate is made may be arranged between the plurality of LEDs and the transmissive surfaces of the catadioptric optical elements. The transparent material may be air. Advantageously robustness may be increased and sensitivity to thermal variations reduced. Further the spatial uniformity of light output may be increased.

The reflective surface of the catadioptric optical array may comprise a reflective layer formed on the reflective surface. The reflective layer may comprise a metal material. The reflective layer may extend to cover the reflective surface of the catadioptric optical array. Advantageously light that is incident below the critical angle at the reflective surface may be reflected for output in directions that are near to the normal direction or in directions that guide within the catadioptric optical array. The overall efficiency of reflection from the reflected surface may be increased, increasing output efficiency.

The reflective surface of each catadioptric optical element may comprise a plurality of light reflecting facets.

For each catadioptric optical element the transmissive surface of the input substrate may further comprise a refractive light input structure aligned in correspondence with a respective optical axis of the catadioptric optical element. Each refractive light input structure may be arranged between the transmissive input surface and the reflective surface of the input substrate. The luminous intensity of light that is directed for output at locations near to the optical axis may be increased. Advantageously the appearance of dark spots near to the micro-LED may be reduced and uniformity increased.

In at least one catadioptric cross-sectional plane through its optical axis the refractive light input structure may comprise a plurality of pairs of oppositely inclined refractive input facets.

In at least one catadioptric cross-sectional plane the plurality of pairs of inclined input facets may be inclined at equal and opposite inclination angles. In the plane of the catadioptric optical array the plurality of pairs of inclined refractive input facets may be circularly or elliptically symmetric. Advantageously the thickness of the output microstructure may be reduced, reducing total thickness.

The transmissive surface of the input substrate may comprise planar regions between the refractive light input structures. The reflective surface may comprise reflective planar regions between at least some of the light reflecting facets of the reflective surface. Advantageously light may be guided to outer regions, increasing device area, reducing thickness and reducing total cost of micro-LEDs.

The reflective surface of each catadioptric optical element may comprise a reflective light input structure that is arranged between the reflective surface and the transmissive input surface of the input substrate. In at least one catadioptric cross-sectional plane through its optical axis the reflective light input structure may comprises a first inner surface and a second inner surface facing the first inner surface. For each catadioptric optical element of the catadioptric optical array, the refractive light input structure and reflective light input structure may be arranged to direct at least some light from the respective aligned at least one LED to be the light that is guided within the catadioptric optical array. In at least one catadioptric cross-sectional plane through its optical axis the first and second inner surfaces may comprise curved reflective surfaces. In at least one catadioptric cross-sectional plane through its optical axis the light reflecting facets of the reflective surface may be provided by pairs of inclined facets that are inclined with opposing inclination angles. Advantageously light may be guided to outer regions, increasing device area, reducing thickness and reducing total cost of micro-LEDs.

Some of the light reflecting facets of the reflective surface may be arranged to direct at least some light through the transmissive output surface of the catadioptric optical element in a direction substantially normal to the transmissive output surface. Advantageously additional light deflection films are not used, achieving reduced thickness and complexity of operation.

In the plane of the catadioptric array the light reflecting facets may be circularly or elliptically symmetric about the optical axis of each catadioptric optical element. The plurality of light reflecting facets of each catadioptric optical element may be concentric with the optical axis of said catadioptric optical element. Advantageously the light output may be provided across the area of the catadioptric optical element with high uniformity.

In at least one catadioptric cross-sectional plane through its optical axis the light reflecting facets of a catadioptric optical element may be arranged with a separation that decreases with distance from the optical axis of the catadioptric element. For each catadioptric optical element the length of the light reflecting facets may increase with distance from the optical axis of the respective catadioptric optical element. For each catadioptric optical element the total area of the light reflecting facets may increase with the distance from the optical axis of the respective catadioptric optical element. For each catadioptric optical element, the total area of the at least one light reflecting facet at a distance, r from the optical axis may be proportional to the distance, r. Advantageously the luminance provided from each region of the catadioptric optical element may be substantially the same, independent of distance from the micro-LED. Mura and Moiré effects may be minimised in a backlight apparatus.

Some of the light reflecting facets arranged on the reflective surface of the catadioptric optical element may be arranged to direct light that has not guided within the catadioptric optical array. Advantageously some of the light near to the optical axis may be output to provide luminance that is substantially as the regions in which light that has been guided is output.

The illumination apparatus may comprise a plurality of opaque mask regions wherein the first surface of the transmissive LED support substrate for each catadioptric optical element comprises an opaque mask region that is aligned with an optical axis of the catadioptric optical element. A respective one or more of the LEDs of the plurality of LEDs may be arranged between the mask region and the reflective surface. The opaque mask region may be provided between the refractive light output structure and the respective one or more of the LEDs of the plurality of LEDs. Advantageously the output angular directional distribution near to the optical axis may be substantially the same as the output angular directional distribution for regions not near to the optical axis.

The plurality of opaque mask regions may be provided by LED addressing electrodes. Advantageously the complexity of fabrication of the LED support substrate may be reduced, reducing cost.

Some light reflecting facets of the reflective surface of the respective catadioptric optical element may be arranged to direct light to the refractive light output structure. In at least one catadioptric cross-sectional plane through its optical axis the refractive light output structure may comprise a concave refractive surface arranged to provide negative optical power. In at least one catadioptric cross-sectional plane the refractive light output structure may comprise a plurality of pairs of oppositely inclined transmissive light deflecting facets. For each catadioptric optical element the plurality of pairs of oppositely inclined transmissive light deflecting facets may be circularly or elliptically symmetric in the plane of the transmissive output surface about the optical axis of the catadioptric optical element. Advantageously the angular directional distribution of light close to the optical axis may be substantially the same as the angular directional distribution from other regions of the catadioptric optical element.

The illumination apparatus may further comprise diffuser structures arranged on at least one surface of the transmissive LED support substrate. Advantageously additional diffuser layers may be reduced or eliminated, reducing thickness.

The angular light output distribution of light from the refractive light output structure may be substantially the same as the angular light output distribution of light from the plurality of reflective light reflecting facets that is transmitted through regions of the transmissive output substrate that do not comprise a refractive light output structure. Advantageously output uniformity across the catadioptric optical element may be substantially the same for a wide range of viewing directions.

The illumination apparatus may further comprise a reflective polariser arranged to provide polarisation recirculation of light reflected from the reflective surface of the catadioptric optical element. Advantageously the efficiency of polarised output may be increased. Further the recirculated light may be efficiently recycled by the reflective surface without additional reflective layers, reducing cost and complexity. Flexible, curved and bendable illumination structures may be conveniently provided by a thin illumination apparatus with reduced number of layers.

The ratio of luminous intensity half maximum solid angle of the output light cone to the luminous intensity half maximum solid angle of a Lambertian light source may be less than 1, preferably less than 50%, more preferably less than 25% and most preferably less than 10%. Advantageously display luminance may be increased for a given power consumption, or display power consumption may be reduced for a given display luminance. Further, a backlight for a privacy display may be provided that has low luminance at high viewing angles.

The illumination apparatus may further comprise a wavelength conversion layer. Advantageously white light output may be provided.

The wavelength conversion layer may be arranged between the LEDs of the plurality of LEDs and the reflective surface of each catadioptric optical element. Advantageously the angular directional distribution of output may be reduced.

The wavelength conversion layer may be arranged to receive light from the catadioptric optical array. Advantageously the wavelength diffusion layer may provide a further diffuser function and provide increased uniformity of output.

The electrodes of each of the LEDs of the plurality LEDs may be respectively connected to one column addressing electrode and one row addressing electrode. Advantageously the plurality of micro-LEDs may provide local area dimming for high dynamic range operation in cooperation with an LCD. Display contrast may be increased in comparison to area illumination.

The illumination apparatus may further comprise an integrated circuit controlling one or more LEDs and located within the LED array. The integrated circuit may comprise a storage or memory or latching function. Advantageously the width of the edges of the illumination apparatus may be reduced for small bezel width and flexibility.

The LEDs of the plurality of LEDs may be from a monolithic wafer arranged in an array with their original monolithic wafer positions and orientations relative to each other preserved. In at least one direction, for at least one pair of the plurality of LEDs in the at least one direction, for each respective pair there may have been at least one respective LED in the monolithic wafer that was positioned in the monolithic wafer between the pair of LEDs in the at least one direction and that is not positioned between them in the array of LEDs. Advantageously the pitch of the micro-LEDs may be determined at the time of transfer from the monolithic wafer to the substrate. The catadioptric optical element may have substantially the same pitch such that large numbers of micro-LEDs may be precisely aligned to large numbers of catadioptric optical elements. Advantageously cost and complexity of alignment of the illumination apparatus is reduced.

The LEDs of the plurality of LEDs may be micro-LEDs of width or diameter less than 300 micrometres, preferably less than 200 micrometres and more preferably less than 100 micrometres. In the at least one catadioptric cross-sectional plane the distance between the transmissive output surface and reflective surface may be less than 750 micrometres, preferably less than 500 micrometres and more preferably less than 250 micrometres. Advantageously, a thin and bright directional illumination apparatus may be provided. High resolution local area dimming may be further provided.

According to a second aspect of the present disclosure there is provided a display apparatus comprising an illumination apparatus according to the first aspect and a transmissive spatial light modulator arranged to receive light that has transmitted through the transmissive LED support substrate. Advantageously a thin display may be provided with local area dimming, high contrast, high resolution, high uniformity, free-form shapes, very low bezel width and flexibility. Further such a display may provide power savings, very high luminance in brightly lit environments, low stray light in low illuminance environments and privacy operation such that the display is only visible from a restricted viewing angle.

According to a third aspect of the present disclosure there is provided a backlight apparatus for a liquid crystal display comprising an illumination apparatus according to the first aspect.

According to a fourth aspect of the present disclosure there is provided an illumination apparatus comprising: a plurality of LEDs, the plurality of LEDs being arranged in an LED array, wherein the LEDs of the plurality of LEDs are micro-LEDs; and a catadioptric optical array to provide a light output distribution, the light output distribution being of light output from the LEDs of the plurality of LEDs; wherein: the catadioptric optical array comprises a plurality of catadioptric optical elements, the plurality of catadioptric optical elements being arranged in an array, each of the catadioptric optical elements of the plurality of catadioptric optical elements comprising an optical axis; the optical axis of each of the catadioptric optical elements is aligned in correspondence with a respective one or more of the LEDs of the plurality of LEDs, each of the LEDs of the plurality of LEDs being aligned with the optical axis of only one of the respective catadioptric optical elements of the catadioptric optical array; each catadioptric optical element of the catadioptric optical array comprises: a reflective surface comprising a plurality of light reflecting facets arranged on the reflective surface and aligned in correspondence with the optical axis; and a transmissive output surface wherein the transmissive output surface faces the reflective surface; the plurality of LEDs is arranged between the reflective surface and the transmissive output surface and the plurality of LEDs is arranged to illuminate the reflective surface; at least some of the light from the plurality of LEDs is guided within the catadioptric optical array; and the plurality of light reflecting facets is arranged to direct light through the transmissive output surface of the catadioptric optical array; wherein the light output distribution has a luminous intensity half maximum solid angle that is smaller than the luminous intensity half maximum solid angle of the light output distribution from each of the plurality of LEDs.

Advantageously a thin directional illumination apparatus may be provided which has a pitch that is significantly greater than the thickness. A uniform output illumination profile may be achieved, such that the illumination apparatus may be provided as a backlight for a transmissive spatial light modulator with high uniformity. For a given power consumption the head-on output luminance may be increased in comparison with Lambertian illumination. For a given head-on luminance the power consumption may be increased.

The plurality of LEDs may be arranged on the first surface of a transmissive LED support substrate; and the transmissive output surface may be provided by the second surface of the transmissive LED support substrate; wherein the second surface of the transmissive LED support substrate faces the first surface of the transmissive LED support substrate. Advantageously the number of components in the illumination apparatus may be reduced, reducing cost and complexity as well as reducing thickness.

The reflective surface of each catadioptric optical element may be arranged on the first surface of an input substrate, and the second surface of the input substrate facing the reflective surface may comprise a transmissive input surface; wherein the first surface of the transmissive LED support substrate faces the transmissive input surface. Advantageously device thickness may be reduced for a given optical pathlength.

The light from the plurality of LEDs that is guided within the catadioptric optical array may be guided between the reflective surface and the transmissive input surface. Advantageously light from the micro-LEDs may be distributed over large areas. The area illuminated by each micro-LED may be increased so that fewer micro-LEDs are needed, reducing cost.

For each catadioptric optical element of the catadioptric optical array the transmissive output surface may comprise at least one refractive light output structure arranged on the transmissive output surface and aligned in correspondence with the optical axis of the catadioptric optical element. Advantageously light output may be achieved with controllable angular distribution in areas of the output surface that would otherwise be shielded by the micro-LED, providing increased uniformity for a wide range of output angles, and minimising dark spot appearance in the region of the micro-LED. Uniformity is increased.

The input substrate may be formed as an integrated body that extends between the optical axes of the plurality of catadioptric optical elements. Advantageously a common alignment step may be provided for multiple catadioptric optical elements to the plurality of micro-LEDs, reducing cost and complexity and increasing robustness.

The LED support substrate may be formed as an integrated body that extends between the optical axes of the plurality of catadioptric optical elements. Advantageously many micro-LEDs may be arranged on the substrate in parallel, providing a known separation. Uniformity of alignment to the catadioptric optical array may be provided, increasing uniformity, reducing alignment cost and increasing robustness.

A transparent material may be provided between the first surface of the transmissive LED support substrate and the transmissive input surface; and the light from the plurality of LEDs that is guided within the catadioptric optical array may be guided between the reflective surface and the second surface of the transmissive LED support substrate. Advantageously robustness may be increased and sensitivity to thermal variations reduced.

The reflective surface of the catadioptric optical array may comprise a reflective layer formed on the reflective surface. The reflective layer may extend to cover the reflective surface of the catadioptric optical array. Advantageously light that is incident below the critical angle at the reflective surface may be reflected for output in directions that are near to the normal direction or in directions that guide within the catadioptric optical array. The overall efficiency of reflection from the reflected surface may be increased, increasing output efficiency.

For each catadioptric optical element the transmissive surface of the input substrate may further comprises a refractive light input structure aligned to the respective optical axis; wherein each light input structure is arranged between the transmissive input surface and the reflective surface of the input substrate. The luminous intensity of light that is directed for output at locations near to the optical axis may be increased. Advantageously the appearance of dark spots near to the micro-LED may be reduced and uniformity increased.

In at least one catadioptric cross-sectional plane through its optical axis the refractive light input structure may comprise a plurality of pairs of oppositely inclined refractive input facets.

In at least one catadioptric cross-sectional plane the plurality of pairs of inclined input facets may be inclined at equal and opposite inclination angles; and in the plane of the catadioptric optical array the plurality of pairs of inclined refractive input facets may be circularly or elliptically symmetric. Advantageously the thickness of the output microstructure may be reduced, reducing total thickness.

The transmissive surface of the input substrate may comprise planar regions between the refractive light input structures. The reflective surface may comprise reflective planar regions between at least some of the light reflecting facets of the reflective surface. Advantageously light may be guided to outer regions, increasing device area, reducing thickness and reducing total cost of micro-LEDs.

The reflective surface of each catadioptric optical element may comprise a reflective light input structure that may be arranged between the reflective surface and the transmissive input surface of the input substrate; wherein in at least one catadioptric cross-sectional plane through its optical axis the reflective light input structure may comprise a first inner surface and a second inner surface facing the first inner surface wherein for each catadioptric optical element of the catadioptric optical array, the refractive light input structure and reflective light input structure may be arranged to direct at least some light from the respective aligned at least one LED to be the light that is guided within the catadioptric optical array. In at least one catadioptric cross-sectional plane through its optical axis the first and second inner surfaces may comprise curved reflective surfaces. In at least one catadioptric cross-sectional plane through its optical axis the light reflecting facets of the reflective surface may be provided by pairs of inclined facets that are inclined with opposing inclination angles. Advantageously light may be guided to outer regions, increasing device area, reducing thickness and reducing total cost of micro-LEDs.

Some of the light reflecting facets of the reflective surface may be arranged to direct at least some light through the transmissive output surface of the catadioptric optical element in a direction substantially normal to the transmissive output surface. Advantageously additional light deflection films are not used, achieving reduced thickness and complexity of operation.

In the plane of the catadioptric array the light reflecting facets may be circularly or elliptically symmetric about the optical axis of each catadioptric optical element. The plurality of light reflecting facets of each of the catadioptric optical elements may be concentric with the optical axis of said catadioptric optical element. Advantageously the light output may be provided across the area of the catadioptric optical element with high uniformity.

For each catadioptric optical element the length of the light reflecting facets may increase with distance from the optical axis of the respective catadioptric optical element. For each catadioptric optical element the total area of the light reflecting facets may increase with the distance from the optical axis of the respective catadioptric optical element. For each catadioptric optical element, the total area of the at least one light reflecting facet at a distance, r from the optical axis may be proportional to the distance, r. In at least one catadioptric cross-sectional plane through its optical axis the light reflecting facets of a catadioptric optical element may be arranged with a separation that decreases with distance from the optical axis of the catadioptric element. In the plane of a catadioptric optical element the length of the light reflecting facets may increase with distance from the optical axis of the respective catadioptric optical element. In the plane of a catadioptric optical element the total area of the light reflecting facets may increase with the distance from the optical axis of the respective catadioptric optical element. In the plane of a catadioptric optical element the total area of the light reflecting facets may be proportional to the distance from the optical axis of the respective catadioptric optical element. Advantageously the luminance provided from each region of the catadioptric optical element may be substantially the same, independent of distance from the micro-LED. Mura and Moiré effects may be minimised in a backlight apparatus.

Some of the light reflecting facets arranged on the reflective surface of the catadioptric optical element may be arranged to direct light that has not guided within the catadioptric optical array. Advantageously some of the light near to the optical axis may be output to provide luminance that is substantially as the regions in which light that has been guided is output.

The illumination apparatus may comprise a plurality of opaque mask regions wherein the first surface of the transmissive LED support substrate for each catadioptric optical element may comprise an opaque mask region that is aligned with an optical axis of the catadioptric optical element; wherein a respective one or more of the LEDs of the plurality of LEDs may be arranged between the mask region and the reflective surface; and wherein the opaque mask region may be provided between the refractive light output structure and the respective one or more of the LEDs of the plurality of LEDs. Advantageously the output angular directional distribution near to the optical axis may be substantially the same as the output angular directional distribution for regions not near to the optical axis.

The plurality of opaque mask regions may be provided by LED addressing electrodes. Advantageously the complexity of fabrication of the LED support substrate may be reduced, reducing cost.

Some light reflecting facets of the reflective surface of the respective catadioptric optical element may be arranged to direct light to the refractive light output structure. In at least one catadioptric cross-sectional plane through its optical axis the refractive light output structure may comprise a concave refractive surface arranged to provide negative optical power. In at least one catadioptric cross-sectional plane the refractive light output structure may comprise a plurality of pairs of oppositely inclined transmissive light deflecting facets. For each catadioptric optical element the plurality of pairs of oppositely inclined transmissive light deflecting facets may be circularly or elliptically symmetric in the plane of the transmissive output surface about the optical axis of the catadioptric optical element. Advantageously the angular directional distribution of light close to the optical axis may be substantially the same as the angular directional distribution from other regions of the catadioptric optical element.

The illumination apparatus may further comprise diffuser structures arranged on at least one surface of the transmissive LED support substrate. Advantageously additional diffuser layers may be reduced or eliminated, reducing thickness.

The angular light output distribution of light from the refractive light output structure may be substantially the same as the angular light output distribution of light from the plurality of reflective light reflecting facets that is transmitted through regions of the transmissive output substrate that do not comprise a refractive light output structure. Advantageously output uniformity across the catadioptric optical element may be substantially the same for a wide range of viewing directions.

The illumination apparatus may further comprise a reflective polariser arranged to provide polarisation recirculation of light reflected from the reflective surface of the catadioptric optical element. Advantageously the efficiency of polarised output may be increased. Further the recirculated light may be efficiently recycled by the reflective surface without additional reflective layers, reducing cost and complexity. Flexible, curved and bendable illumination structures may be conveniently provided by a thin illumination apparatus with reduced number of layers.

The ratio of luminous intensity half maximum solid angle of the output light cone to the luminous intensity half maximum solid angle of a Lambertian light source may be less than 1, preferably less than 50%, more preferably less than 25% and most preferably less than 10%. Advantageously display luminance may be increased for a given power consumption, or display power consumption may be reduced for a given display luminance. Further, a backlight for a privacy display may be provided that has low luminance at high viewing angles.

The illumination apparatus may further comprise a wavelength conversion layer. Advantageously white light output may be provided.

The wavelength conversion layer may be arranged between the LEDs of the plurality of LEDs and the reflective surface of each catadioptric optical element. Advantageously the angular directional distribution of output may be reduced.

The wavelength conversion layer may be arranged to receive light from catadioptric optical array. Advantageously the wavelength diffusion layer may provide a further diffuser function and provide increased uniformity of output.

The electrodes of each of the LEDs of the plurality LEDs may be respectively connected to one column addressing electrode and one row addressing electrode. Advantageously the plurality of micro-LEDs may provide local area dimming for high dynamic range operation in cooperation with an LCD. Display contrast may be increased in comparison to area illumination.

The illumination apparatus may further comprise an integrated circuit controlling one or more LEDs and located within the LED array. The integrated circuit may comprise a memory or latching function. Advantageously the width of the edges of the illumination apparatus may be reduced for small bezel width and flexibility.

The LEDs of the plurality of LEDs may be from a monolithic wafer arranged in an array with their original monolithic wafer positions and orientations relative to each other preserved; and wherein in at least one direction, for at least one pair of the plurality of LEDs in the at least one direction, for each respective pair there was at least one respective LED in the monolithic wafer that was positioned in the monolithic wafer between the pair of LEDs in the at least one direction and that is not positioned between them in the array of LEDs. Advantageously the pitch of the micro-LEDs may be determined at the time of transfer from the monolithic wafer to the substrate. The catadioptric optical element may have substantially the same pitch such that large numbers of micro-LEDs may be precisely aligned to large numbers of catadioptric optical elements. Advantageously cost and complexity of alignment of the illumination apparatus is reduced.

The LEDs of the plurality of LEDs may be micro-LEDs of width or diameter less than 300 micrometres, preferably less than 200 micrometres and more preferably less than 100 micrometres. In the at least one catadioptric cross-sectional plane the distance between the transmissive output surface and reflective surface may be less than 750 micrometres, preferably less than 500 micrometres and more preferably less than 250 micrometres. Advantageously, a thin and bright directional illumination apparatus may be provided. High resolution local area dimming may be further provided.

According to a fifth aspect of the present disclosure there is provided a display apparatus comprising the illumination apparatus of the fourth aspect and a transmissive spatial light modulator arranged to receive light that has transmitted through the transmissive LED support substrate. Advantageously a thin display may be provided with local area dimming, high contrast, high resolution, high uniformity, free-form shapes, very low bezel width and flexibility. Further such a display may provide power savings, very high luminance in brightly lit environments, low stray light in low illuminance environments and privacy operation such that the display is only visible from a restricted viewing angle.

According to a sixth aspect of the present disclosure there is provided an illumination apparatus comprising: a plurality of LEDs, the plurality of LEDs being arranged in an LED array, wherein the LEDs of the plurality of LEDs are mini-LEDs; a transmissive LED support substrate comprising a first surface and a second surface facing the first surface wherein the plurality of LEDs is arranged on the first surface of the transmissive LED support substrate; and a catadioptric optical array to provide a light output distribution, the light output distribution being of light output from the LEDs of the plurality of LEDs; wherein: the catadioptric optical array comprises a plurality of catadioptric optical elements, the plurality of catadioptric optical elements being arranged in an array, each of the catadioptric optical elements of the plurality of catadioptric optical elements comprising an optical axis; the optical axis of each of the catadioptric optical elements is aligned in correspondence with a respective one or more of the LEDs of the plurality of LEDs, each of the LEDs of the plurality of LEDs being aligned with the optical axis of only one of the respective catadioptric optical elements of the catadioptric optical array; the catadioptric optical array comprises a reflective surface and a transmissive surface facing the reflective surface; the first surface of the transmissive LED support substrate faces the transmissive surface of the catadioptric optical array; at least some of the light from the plurality of LEDs is guided within the catadioptric optical array between the reflective surface and the transmissive surface; and each catadioptric optical element of the catadioptric optical array comprises a plurality of light reflecting facets arranged on the reflective surface; wherein at least some of the plurality of light reflecting facets are arranged to direct light that is guided between the reflective surface and the transmissive surface of the catadioptric optical array through the transmissive surface of the catadioptric optical array and through the transmissive LED support substrate. The catadioptric optical array may be formed as an integrated body and the reflective surface and the transmissive surface of the catadioptric optical array extend between the plurality of LEDs. The reflective surface of the catadioptric optical array may comprise a reflective coating that extends to cover the reflective surface of the catadioptric optical array. The transmissive surface of each catadioptric optical element may comprise a refractive light input structure that is arranged between the transmissive surface and the reflective surface; wherein each refractive light input structure may be aligned with the optical axis of the catadioptric optical element; wherein in at least one catadioptric cross-sectional plane through its optical axis the refractive light input structure may comprise a plurality of pairs of oppositely inclined refractive facets that are inclined at equal and opposite inclination angles; and in the plane of the catadioptric array the plurality of pairs of inclined refractive facets may be circularly or elliptically symmetric. The reflective surface of each catadioptric optical element may comprise a reflective light input structure that is arranged between the reflective surface and the transmissive input surface of the input substrate to the light guiding surface; wherein in at least one catadioptric cross-sectional plane through its optical axis the reflective input structure comprises a first inner surface and a second inner surface facing the first inner surface; and the refractive light input structure and reflective light input structure may be arranged to direct light from the respective aligned at least one LED to be guided within the catadioptric optical array between the reflective surface and the transmissive surface of the catadioptric optical array. The light reflecting facets of the reflective surface may be provided by pairs of inclined facets that are inclined with opposing inclination angles; and wherein in the plane of the catadioptric array the light reflecting facets may be circularly or elliptically symmetric and are concentric with the optical axis of said catadioptric optical element. The light reflecting facets of the reflective surface may be arranged to direct at least some light through the transmissive surface of the catadioptric optical array and the transmissive LED substrate in a direction normal to the surface of the transmissive LED substrate. In at least one catadioptric cross-sectional plane through its optical axis the light reflecting facets of a catadioptric optical element may be arranged with a separation that decreases with distance from the optical axis of the catadioptric element. In the plane of the catadioptric array the length of the light reflecting facets may increase with distance from the optical axis of the respective catadioptric optical element; wherein the total area of the light reflecting facets increases with the distance from the optical axis of the respective catadioptric optical element. The illumination apparatus may further comprise light reflecting facets arranged on the reflective surface of the catadioptric optical element and arranged to direct light from an aligned LED through the transmissive LED substrate that has not guided between the reflective and transmissive surfaces of the catadioptric optical element. The first surface of the transmissive LED support substrate may comprise a plurality of opaque mask regions that are aligned with the optical axis of the catadioptric optical element wherein a respective one or more of the LEDs of the plurality of LEDs is arranged on each of the opaque mask regions; wherein the plurality of opaque mask regions may be provided by LED addressing electrodes. Some light reflecting facets of the reflective surface of the respective catadioptric optical element may be arranged to direct light through the first surface of the LED support substrate to the output refractive structures arranged at the second surface of the transmissive LED support substrate and aligned with the optical axis of the catadioptric optical element; wherein in at least one catadioptric cross-sectional plane the output refractive structure may comprise a plurality of pairs of oppositely inclined transmissive light deflecting facets. The illumination apparatus may further comprise diffuser structures arranged on at least one surface of the transmissive LED support substrate.

According to a seventh aspect of the present disclosure there is provided a backlight apparatus for a liquid crystal display comprising the illumination apparatus of the sixth aspect.

Such an apparatus may be used for LCD backlighting or for domestic or professional lighting.

These and other features and advantages of the present disclosure will become apparent to those of ordinary skill in the art upon reading this disclosure in its entirety.

BRIEF DESCRIPTION OF THE DRAWINGS

Embodiments are illustrated by way of example in the accompanying figures, wherein like reference numbers indicate similar parts.

DETAILED DESCRIPTION

Figure 1:
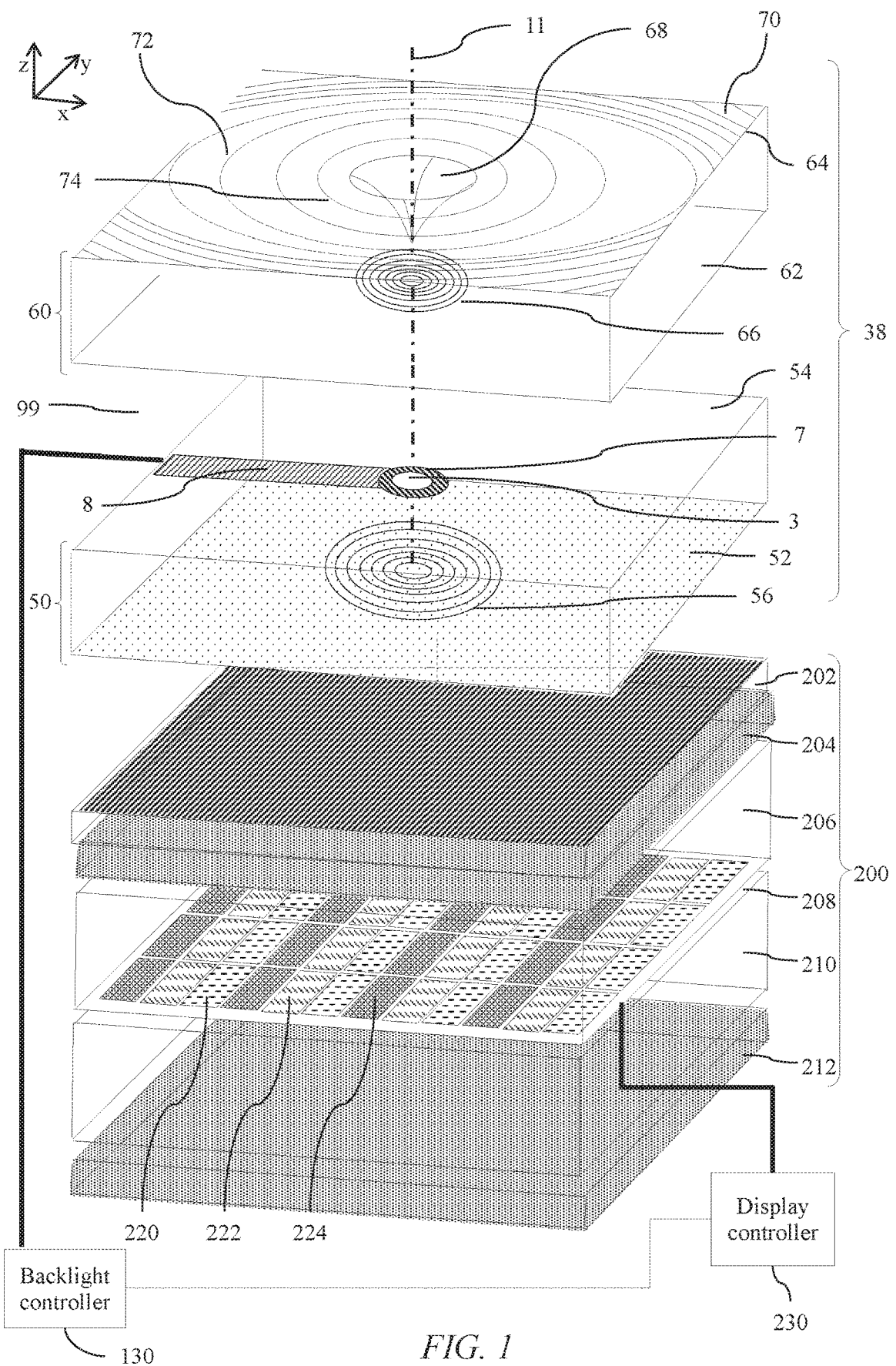
FIG. 1 is a schematic diagram illustrating in side perspective view a display apparatus comprising a backlight comprising a micro-LED and a catadioptric optical element arranged to illuminate an LCD.

It would be desirable to provide a thin illumination apparatus for display, display backlighting or for domestic or professional environmental lighting. Environmental lighting may include illumination of a room, office, building, scene, street, equipment, or other illumination environment. Display backlighting means an illumination apparatus arranged to illuminate a transmissive spatial light modulator such as a liquid crystal display. The micro-LEDs of a display backlight may be provided with image information, for example in high dynamic range operation as will be described herein. However, in general pixel data is provided by the spatial light modulator.

It would further be desirable to provide a thin backlight for a spatial light modulator that can provide local area dimming for high dynamic range, a thin package, a widely spaced array of light sources and high uniformity. It would be further desirable to provide thin, flexible and free-form shapes (for example circular) backlights for thin substrate LCDs with very low bezel widths that achieve appropriate light output distributions with high uniformity, high efficiency and HDR capability.

The structure and operation of various switchable display devices will now be described. In this description, common elements have common reference numerals. It is noted that the disclosure relating to any element applies to each device in which the same or corresponding element is provided. Accordingly, for brevity such disclosure is not repeated.

Figure 2:
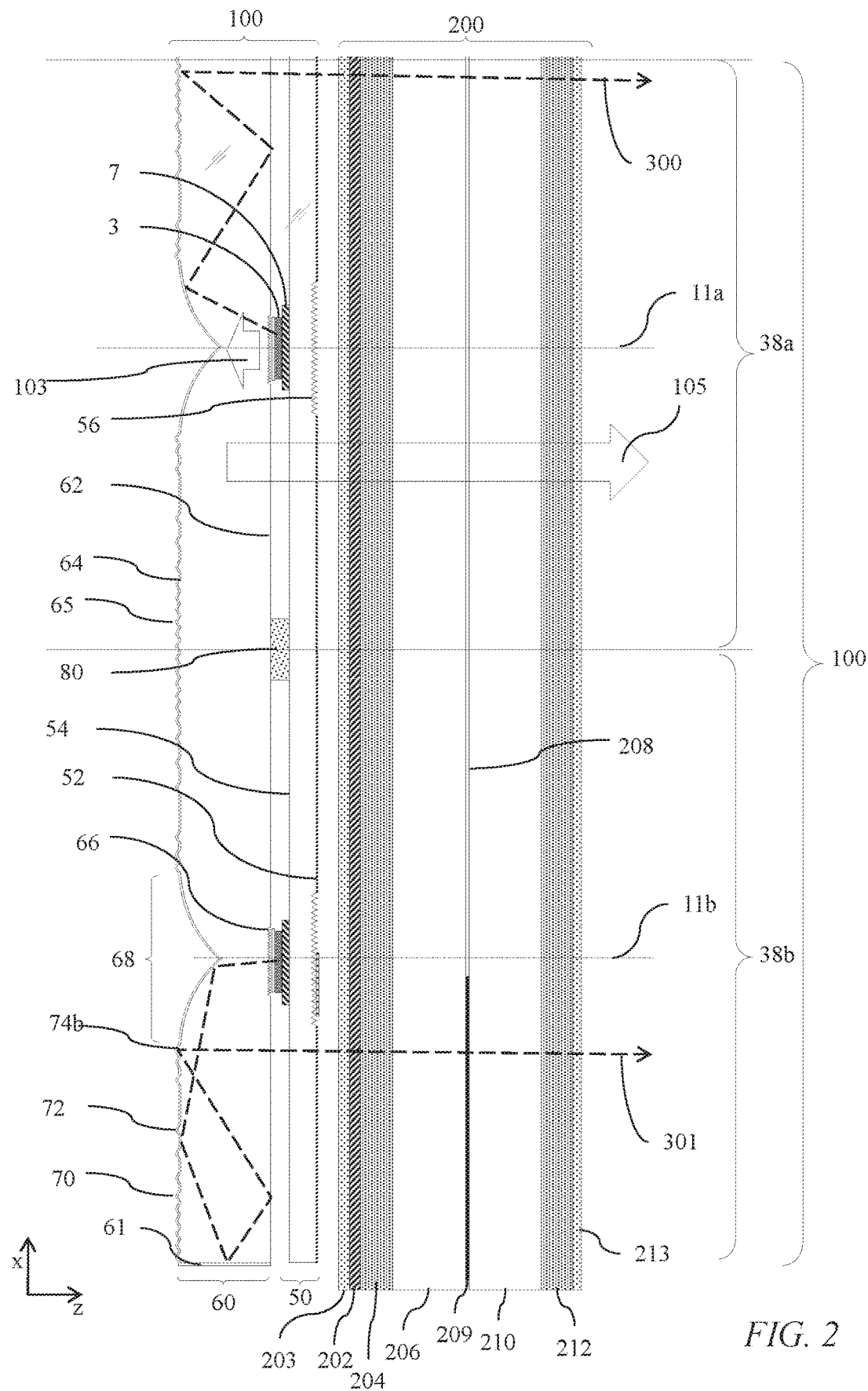
FIG. 2 is a schematic diagram illustrating in top view a display apparatus comprising a backlight comprising a micro-LED array and a catadioptric optical element array arranged to illuminate an LCD.

FIG. 1 is a schematic diagram illustrating in side perspective view a display apparatus comprising a backlight comprising a micro-LED and a unit cell of a catadioptric optical element arranged to illuminate an LCD 200; and FIG. 2 is a schematic diagram illustrating in top view in a cross sectional plane through its optical axes 11a,11b, a display apparatus comprising a backlight comprising a micro-LED array and two unit cells 38a, 38b of a catadioptric optical element array 100 arranged to illuminate an LCD 200.

In operation, micro-LEDs 3 provide light rays in a direction that is away from a spatial light modulator 48 and towards a reflective surface 64 as indicated by arrow 103. Light rays are reflected at reflective surface 64 and directed back through the catadioptric optical element 38 as indicated by arrow 105. In the present embodiments, the folded optical path illustrated by arrows 103, 105 advantageously achieves high optical efficiency, low thickness and high uniformity over areas that are much greater than the area of the individual micro-LEDs, as will be described further herein.

An illumination apparatus comprises a plurality of LEDs, the plurality of LEDs being arranged in an LED array, wherein the LEDs of the plurality of LEDs are micro-LEDs 3; and a catadioptric optical array 100 to provide a light output distribution, the light output distribution being of light output from the LEDs of the plurality of micro-LEDs 3.

The catadioptric optical array 100 comprises a plurality of catadioptric optical elements 38, the plurality of catadioptric optical elements 38 being arranged in an array, each of the catadioptric optical elements 38 of the plurality of catadioptric optical elements comprising an optical axis 11, thus in FIG. 2, adjacent optical axes 11a, 11b are associated with each catadioptric optical element 38a, 38b respectively, each catadioptric optical element 38a, 38b being a unit cell of array 100. The optical axis 11 of each of the catadioptric optical elements 38 is aligned in correspondence with a respective one or more of the micro-LEDs 3 of the plurality of micro-LEDs 3, each of the micro-LEDs 3 of the plurality of micro-LEDs 3 being aligned with the optical axis 11 of only one of the respective catadioptric optical elements 38 of the catadioptric optical array 100.

The plurality of catadioptric optical elements 38 may typically be arranged as a two-dimensional array in the plane of the catadioptric optical array 100. Alternatively the catadioptric optical array may be one dimensional, that is elongate in a direction in the plane of the catadioptric optical array.

Each catadioptric optical element 38 of the catadioptric optical array 100 comprises a reflective surface 64 comprising a plurality of light reflecting facets 70, 72 arranged on the reflective surface 64 and aligned with the optical axis 11. Each catadioptric optical element 38 further comprises a transmissive output surface 52 comprising at least one refractive light output structure 56 arranged on the transmissive output surface 52 and aligned with respect to the optical axis 11. The transmissive output surface 52 faces the reflective surface 64.

A display apparatus comprises the backlight apparatus comprising micro-LED 3 array and catadioptric optical array 100, and a transmissive spatial light modulator 200 arranged to receive light that has transmitted through the transmissive LED support substrate 50. Typically the transmissive spatial light modulator 200 comprises a liquid crystal display with input polariser 204, substrate 206, liquid crystal layer 208, substrate 210 and output polariser 212. Further layers comprising reflective polariser 202 and diffuser 203 may be provided.

Advantageously addressable illumination can be provided in a thin optical stack. Substrates 206, 210 may comprise thin substrates, such as 150 micrometres thickness or less that may be flexible. Thin substrates may be micro-sheet glass, glass that has been thinned by chemical-mechanical polishing, or polymer substrates such as polyimide or colourless polyimide. Advantageously an LCD that may be curved or used for flexible display may be provided as will be described further hereinbelow.

Further the total thickness of the spatial light modulator 200 may be less than 1 mm, preferably less than 500 micrometres, and most preferably less than 250 micrometres for applications such as mobile display. Control electronics may be provided within the active area of the spatial light modulator to provide substantially zero bezel, for example bezel widths of less than 500 micrometres. Further free-form shapes for the spatial light modulator, such as circular display may be achieved as will be described further hereinbelow.

It would be desirable to provide a backlight optical system that has the same or less thickness than the spatial light modulator 48, is flexible and can provide illumination of very low bezel width wherein the x-axis and y-axis dimensions of the display are similar, and free-form displays. Further it would be desirable to provide an addressable array of light sources to illuminate the spatial light modulator 200 to achieve high dynamic range, advantageously increasing image contrast.

For the purposes of the present disclosure, the plurality of LEDs are micro-LEDs 3 of width or diameter less than 300 micrometres, preferably less than 200 micrometres and more preferably less than 100 micrometres. LEDs that have minimum width or diameter between 100 and 500 micrometres may also be referred to as mini-LEDs.

Such micro-LEDs 3 have a minimum width or diameter that may be substantially larger than the width of red, green and blue image pixels 220, 222, 224 provided on the spatial light modulator 200

In an illustrative example, the pixels 220, 222, 224 may have a pitch of 25×75 micrometres for example. Micro-LED 3 may have a width or diameter that is 100 micrometres, and catadioptric optical element 38 may have a pitch in at least one catadioptric cross section that is 1 mm. Thus micro-LED 3 may be arranged to illuminate more than 500 image pixels 220, 222, 224.

The plurality of micro-LEDs 3 is arranged on the first surface 54 of a transmissive LED support substrate 50 and the transmissive output surface 52 of the catadioptric optical element 38 is provided by the second surface of the transmissive LED support substrate 50. The second surface 52 of the transmissive LED support substrate 50 faces the first surface 54 of the transmissive LED support substrate 50.

The LED support substrate 50 is formed as an integrated body that extends between the optical axes 11 of the plurality of catadioptric optical elements 38.

Advantageously during manufacture and assembly the plurality of micro-LEDs 3 may be conveniently assembled on surface 54 of the transmissive LED support substrate 50, that may comprise electrodes 7,8 and other electronic components as will be described further hereinbelow.

Electrodes 8 are arranged to provide electrical connection to the micro-LED 3 and are provided with signals from backlight controller 130. Display controller 230 is arranged to provide image pixels 220, 222, 224 with image data and may further provide backlight controller 130 with image data such that the LEDs 3 of the LED array are provided with image data. High dynamic range operation may be provided to advantageously achieve increased image contrast.

The reflective surface 64 of each catadioptric optical element 38 is arranged on the first surface 62 of an input substrate 60, and a transmissive input surface 62 faces the reflective surface 64. The first surface 54 of the transmissive LED support substrate 50 faces the transmissive input surface 62.

The input substrate 60 is formed as an integrated body that extends between the optical axes 11 of the plurality of catadioptric optical elements 38. Advantageously during manufacture and assembly optical structures may be arranged on the substrate 60 such that a large area backlight may be conveniently provided. Further, alignment with the transmissive LED support substrate 50 may be conveniently provided over a large area.

The reflective surface 64 of the catadioptric optical array 100 comprises a reflective layer 65 formed on the reflective surface 64. The reflective layer 65 extends to cover the reflective surface 64 of the catadioptric optical array 100. The reflective layer may be provided for example by a metal layer that may be formed on the surface 64 by means of evaporation, sputtering, spray or dip coating. Suitable metals include silver or aluminium that may be provided with protective layers to minimise corrosion and provide barrier layers to water and oxygen ingress.

The metal reflective layer 65 achieves efficient reflection of light for angles of incidence below the critical angle at a surface if the surface were uncoated. In conventional edge illuminated waveguides for LCD backlights, metals undesirably provide substantial losses because of large number of surface reflections that take place during guiding along the waveguide. In the present embodiments, the number of reflections from the metal layer is small in comparison to conventional waveguides and thus losses from metal layers 65 are substantially reduced. Advantageously a thin catadioptric optical element 38 can be provided with high efficiency with micro-LEDs that are arranged within the active area of the spatial light modulator 48 and do not provide hot-spots of illumination around said micro-LEDs 3.

The metal layer 65 may alternatively be patterned, for example to cover the region of reflective light input structure 68. Advantageously losses due to reflections at metal layers 65 may be reduced.

Adhesive regions 80 may be further provided between the input substrate 60 and transmissive LED support substrate 50. Adhesive regions 80 may provide attachment of the two layers to advantageously achieve robust alignment and reduced sensitivity to thermal changes.

In other words, an illumination apparatus may comprise a plurality of LEDs, the plurality of LEDs being arranged in an LED array, wherein the LEDs of the plurality of LEDs are micro-LEDs 3. The mini-LEDs 3 may be arranged on a transmissive LED support substrate 50 comprising a first surface 54 and a second surface 52 facing the first surface 54 wherein the plurality of mini-LEDs 3 is arranged on the first surface 54 of the transmissive LED support substrate 50. Further a catadioptric optical array 100 may be provided to provide a light output distribution, the light output distribution being of light output from the mini-LEDs 3 of the plurality of mini-LEDs 3. The catadioptric optical array 100 comprises a plurality of catadioptric optical elements 38, the plurality of catadioptric optical elements 38 being arranged in an array, each of the catadioptric optical elements 38 of the plurality of catadioptric optical elements 38 comprising an optical axis 11. The optical axis 11 of each of the catadioptric optical elements 38 is aligned in correspondence with a respective one or more of the mini-LEDs 3 of the plurality of mini-LEDs 3, each of the mini-LEDs 3 of the plurality of mini-LEDs 3 being aligned with the optical axis 11 of only one of the respective catadioptric optical elements 38 of the catadioptric optical array 100. The catadioptric optical array 100 comprises a reflective surface 64 and a transmissive surface facing the reflective surface 64. The first surface of the transmissive LED support substrate 50 faces the transmissive surface of the catadioptric optical array 100. At least some of the light from the plurality of mini-LEDs 3 is guided within the catadioptric optical array 100 between the reflective surface 64 and the transmissive surface. Each catadioptric optical element 38 of the catadioptric optical array 100 comprises a plurality of light reflecting facets 70 arranged on the reflective surface 64; wherein at least some of the plurality of light reflecting facets 70 are arranged to direct light that is guided between the reflective surface 64 and the transmissive surface of the catadioptric optical array 100 through the transmissive surface of the catadioptric optical array 100 and through the transmissive LED support substrate 50.

The arrangement of optical structures in the plane of catadioptric optical array 100 will now be described.

Figure 3:
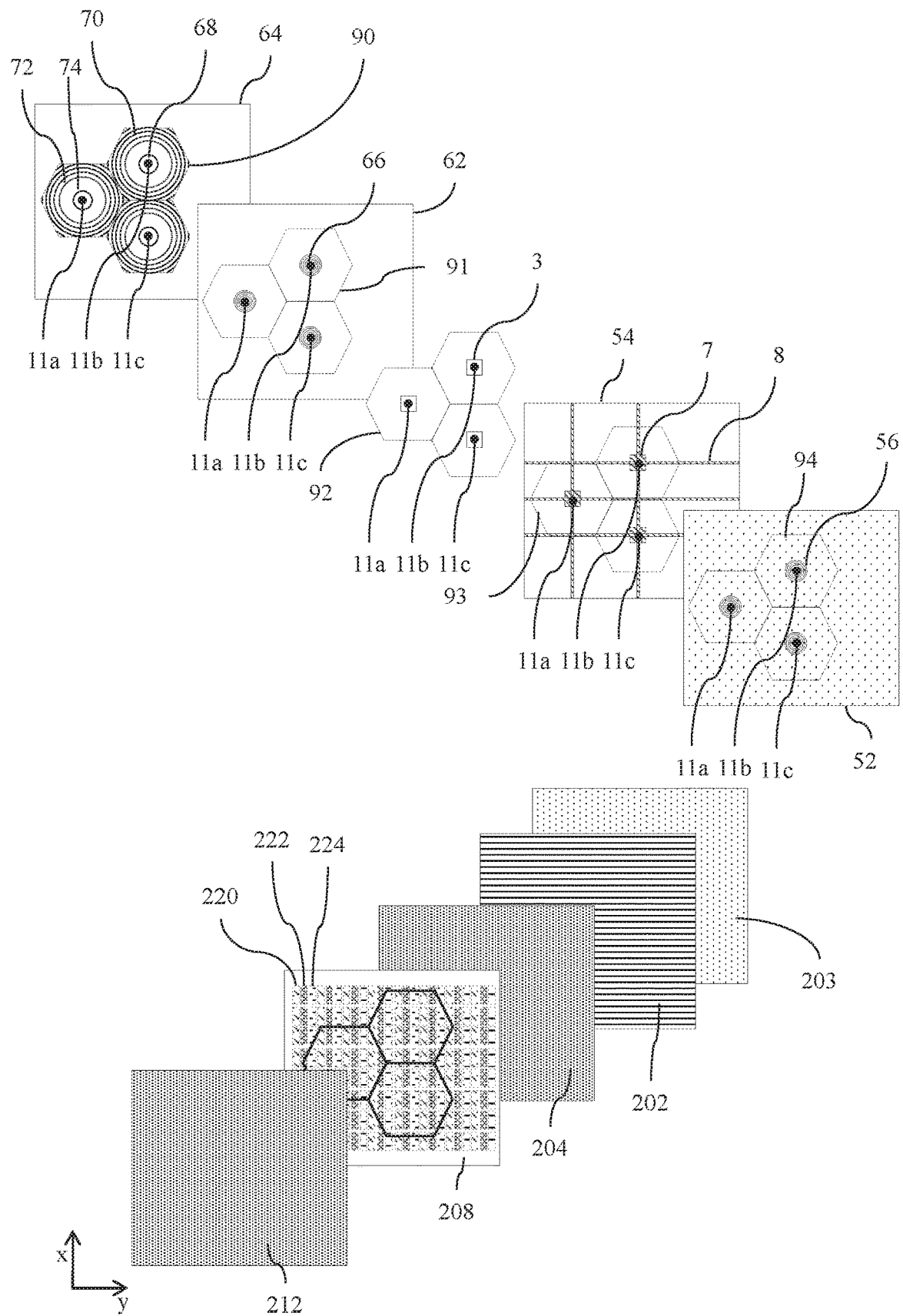
FIG. 3 is a schematic diagram illustrating in expanded front view layers of a display apparatus comprising a backlight comprising a micro-LED array and a catadioptric optical element array arranged to illuminate an LCD.

FIG. 3 is a schematic diagram illustrating in expanded front view layers of a display apparatus comprising a backlight comprising a micro-LED array and a catadioptric optical element array 100 arranged to illuminate an LCD 200.

Reflective surface 64 comprises a plurality of tessellated polygons, in this illustration hexagonal regions 90 are centred on optical axes 11a, 11b and 11c. Hexagonal regions are arranged over the width of the backlight and represent the location of each catadioptric optical element 38 in the plane of the reflective surface 64. Each catadioptric optical element 38 comprises reflective light input structure 68 and reflective facets 70, 72, 74 as will be described further hereinbelow.

Transmissive input surface 62 comprises hexagonal regions 91 centred on the same respective optical axes 11a, 11b and 11c as for the reflective surface 64. Refractive light input structures 66 are arranged in alignment with optical axes 11a, 11b and 11c.

The plurality of micro-LEDs 3 is centred on hexagonal regions 92 and on the same respective optical axes 11a, 11b and 11c as for the reflective surface 64.

The first surface 54 of the transmissive LED support substrate 50 comprises hexagonal regions 93 centred on the same respective optical axes 11a, 11b and 11c as for the reflective surface 64, as well as opaque regions 7 that may be electrodes, as well as addressing electrodes 8 to provide electrical connectivity to each of the micro-LEDs 3, each arranged in alignment with optical axes 11a, 11b and 11c.

The transmissive output surface 52 comprises hexagonal regions 94 centred on the same respective optical axes 11a, 11b and 11c as for the reflective surface 64, as well as refractive light output structure 56.

Light output through the transmissive output surface 52 may be incident on a diffuser 203, reflective polariser and spatial light modulator 200 comprising input polariser 204, liquid crystal pixel layer 208 and output polariser 212. For illustrative purposes the location of the hexagonal structures in alignment with the spatial light modulator 200 is shown, illustrating that many pixels may be illuminated by each catadioptric optical element 38. The arrangement of catadioptric optical elements 38 in the catadioptric optical array may be provided to minimise appearance of mura in the final output image. Further the arrangement may be adjusted to optimise the appearance of high dynamic range addressing of the plurality of micro-LEDs 3.

It would be desirable for the light from the plurality of micro-LEDs 3 to be distributed such that the output luminance is substantially spatially uniform over the area of each catadioptric optical element 38, and the luminous intensity directional distribution is substantially the same for each region over the area. Further it would be desirable to provide such spatially and directionally uniform distribution of light output across adjacent catadioptric optical elements 38 of the catadioptric optical array 100 to achieve desirable uniform illumination of the spatial light modulator 200.

Features of the arrangement of FIG. 3 not discussed in further detail may be assumed to correspond to the features with equivalent reference numerals as discussed above, including any potential variations in the features.

The operation of the catadioptric optical array 100 that achieves spatially uniform distribution of light output will now be further described with reference to certain raypaths of light from the micro-LED 3.

Figure 4A:
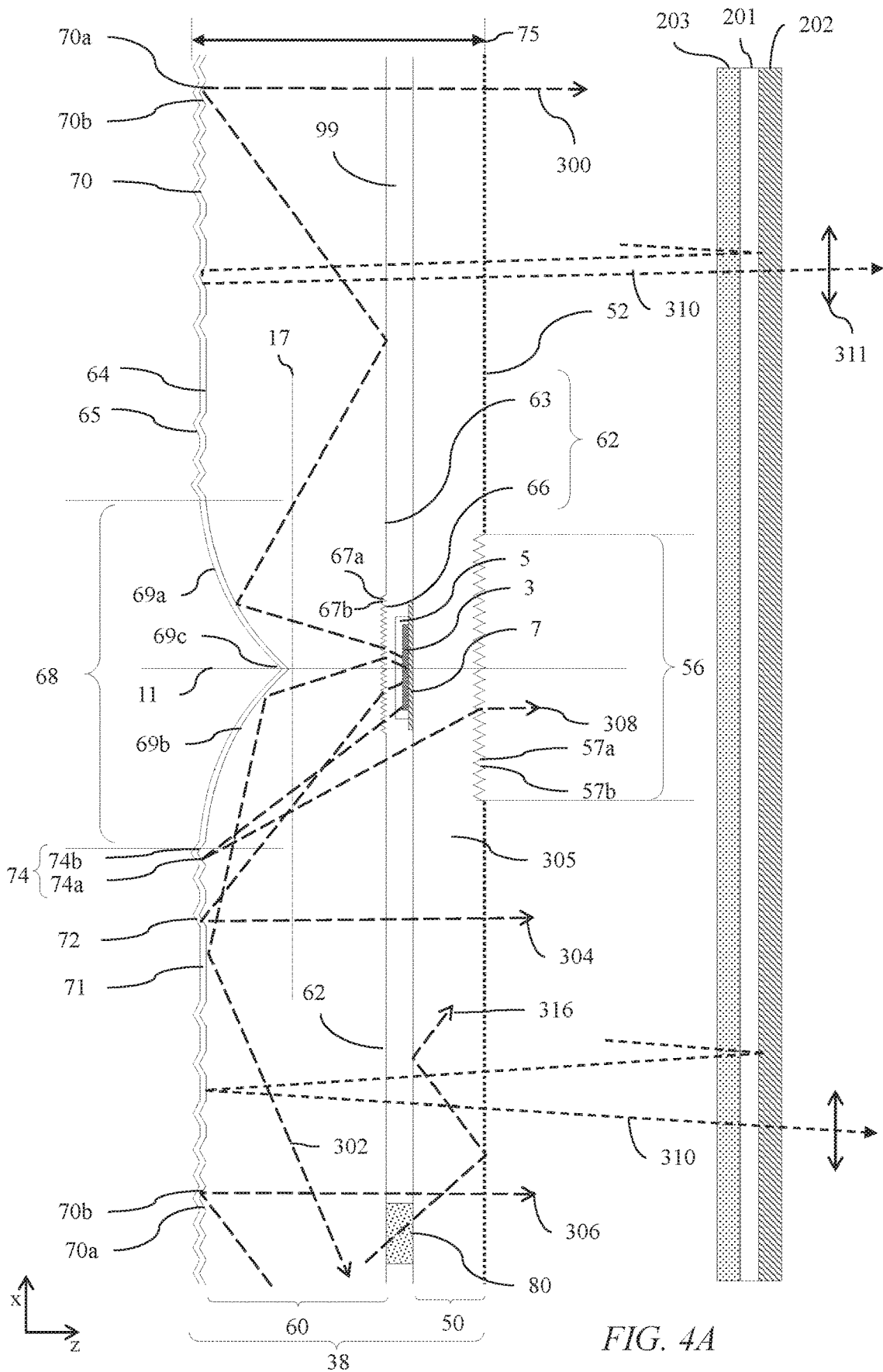
FIG. 4A is a schematic diagram illustrating in top view light rays from a micro-LED and catadioptric optical element comprising a light input microstructure for a catadioptric input substrate.

FIG. 4A is a schematic diagram illustrating in top view light rays from a micro-LED 3 and catadioptric optical element 38 comprising a refractive light input microstructure 66 for a catadioptric input substrate 60.

The plurality of micro-LEDs 3 is arranged between the reflective surface 64 and the transmissive output surface 52. The first surface 54 of the transmissive LED support substrate 50 for each catadioptric optical element 38 comprises an opaque mask region 7 wherein a respective one or more of the micro-LEDs 3 of the plurality of micro-LEDs 3 is arranged between the mask region 7 and the reflective surface 64.

The opaque mask region 7 is further provided between the refractive light output structure 56 and the respective one or more of the micro-LEDs 3 of the plurality of micro-LEDs 3. Opaque mask region 7 is aligned with an optical axis 11 of the catadioptric optical element 38 and may be provided by an addressing electrode of the micro-LED 3 as illustrated in FIG. 1 for example comprising aluminium or other reflective metal materials. Drive electrodes 8 that are not in the opaque mask region 7 may be provided by transparent conductor materials such as ITO or silver nanowires to advantageously achieve increased efficiency of light transmission through the transparent LED support substrate 50.

The plurality of micro-LEDs 3 is arranged to illuminate the reflective surface 64 with light rays 300, 302, 304, 306, 308. Light rays 300, 302, 304, 306, 308 from micro-LED 3 are incident on wavelength conversion layer 5 aligned to the micro-LED 3. The micro-LED may comprise a blue emitting gallium nitride LED chip and the wavelength conversion layer 5 may for example comprise phosphor or quantum dot materials that may be arranged to convert some of the blue light into yellow light or red and green light. Alternatively, the micro-LED 3 may comprise an ultra-violet emitting LED and the wavelength conversion material is arranged to provide white light output.

Light rays 300, 302, 304, 306, 308 are directed towards the reflective surface 64 and prevented from illuminating the transmissive output substrate 52 directly by opaque mask regions 7 that shield the transmissive output surface 52 from light from the micro-LED 3. By way of comparison with the present embodiments, if opaque mask regions 7 were not present, light rays from the micro-LED 3 would be transmitted directly to the transmissive output surface 52 and be output from the surface 52 with a Lambertian luminous intensity directional distribution that would undesirably provide a hot spot at the LED location for certain viewing angles. Advantageously the opaque mask regions 7 achieve reduced appearance of hot spots.

The opaque mask regions 7 may further be reflective such that light rays propagating with the catadioptric optical array that are reflected from the reflective surface 64 towards the micro-LED 3 are reflected and recirculated. Advantageously backlight efficiency may be increased.

Light rays 300 illustrate a raypath from the micro-LED 3 that passes through refractive light input structure 66. Light input structure 66 provides a redistribution of luminous intensity angular distribution from the micro-LED and will be described further below. Light ray 300 is incident onto reflective surface 64 at reflective light input structure 68 that extends from the reflective surface 64 to the transmissive output surface 52. In at least one catadioptric cross-sectional plane through its optical axis 11 the reflective light input structure 68 comprises a first inner surface 69*a* and a second inner surface 69*b* facing the first inner surface. The first and second inner surfaces 69*a*, 69*b* may comprise curved reflective surfaces 69*a*, 69*b*. Advantageously light may be efficiently reflected within the input substrate 60.

For each catadioptric optical element 38 of the catadioptric optical array 100, the refractive light input structure 66 and reflective light input structure 68 are arranged to direct at least some light from the respective aligned at least one micro-LED 3 to be the light ray 300 that is guided within the catadioptric optical array 100. Light rays 300 are reflected by the surface 69*a* within the input substrate 60 and are further incident on transmissive input substrate 62 that comprises planar regions 63 that extend between the input structures 66. Ray 300 has an angle of incidence greater than the critical angle at the interface of the input substrate 60 to the gap 99 that may comprise air and is guided within the catadioptric optical element 38 between the reflective surface 64 and transmissive input surface 62 such that it is directed back towards reflective surface 64 where it is incident onto inclined facet 70*a*.

Advantageously light ray 300 may be directed to regions of the catadioptric optical element 38 that are remote from the micro-LED 3. Further the guiding of light ray 300 within the input substrate 60 achieves a reduction in the total thickness 75 of the catadioptric optical array 100.

The plurality of light reflecting facets 70 is arranged to direct light through the transmissive output surface 52 of the catadioptric optical array 100. Some of the light reflecting facets 70 of the reflective surface 64 are arranged to direct at least some light through the transmissive output surface 52 of the catadioptric optical element 38 in a direction substantially normal to the transmissive output surface 52. In other words, facet 70*a* may be inclined to deflect guided light ray 300 in a direction that is substantially parallel to the optical axis 11. Other light rays (not shown) that guide within the input substrate 60 may be provided at other output angles that are close to the direction of the optical axis 11, as will be described further below.

The light reflecting facets 70 are illuminated by light cones from the light input structure 68 that has a limited cone angle of illumination. The angular output from the facets 70 when output into air thus has a non-Lambertian output. The facets 70 may further be arranged as elements of a curved surface to achieve increased collimation across the width of the element 38. The cone angle of illumination from the catadioptric optical element may be non-Lambertian as will be described below. Advantageously display efficiency may be increased for head on viewing in comparison to Lambertian backlights. Further for displays in which angular output similar to Lambertian displays is desirable, such as for highly curved displays, uniform illumination of a Lambertian diffuser can be achieved. Further a backlight for a privacy display may be provided with reduced off-axis luminance such that the display is not clearly visible for off-axis viewing locations.

Light ray 302 illustrates a raypath that after reflection from curved inner surface 69*b* is incident on reflective planar regions 71 between at least some of the light reflecting facets 70 of the reflective surface 64. Light ray 300 is guided within the input substrate 60 such that it is directed into a neighbouring catadioptric optical element 38 of the catadioptric optical array 100.

Such a ray from a neighbouring catadioptric optical element 38 is further illustrated by ray 306. The light reflecting facets 70 of the reflective surface 64 are provided by pairs of inclined facets 70*a*, 70*b* that are inclined with opposing inclination angles. Light rays 306 are incident on inclined reflective facet 70*b* to be directed to the output surface 52 in a direction that is substantially normal to the plane of the substrates 60, 50.

Advantageously light rays 302, 306 may provide some mixing between neighbouring catadioptric optical elements 38. Such mixing may provide a spatial uniformity at the nominal interface between the two elements 38. Further, the luminous intensity directional distributions are substantially the same at the nominal interface, achieving improved uniformity for a wide range of viewing angles. Advantageously display uniformity is improved.

It would be desirable to achieve uniform output luminous intensity distribution near to the optical axis 11, illustrated by light ray 304 for light that has not guided within the input substrate 60. Some of the light reflecting facets 72 arranged on the reflective surface 64 of the catadioptric optical element 38 are arranged to direct light ray 304 that has not guided within the catadioptric optical array 100. Advantageously spatial uniformity may be increased while achieving luminous intensity angular directional distribution that is the same across different regions of the catadioptric optical element 38.

Light rays 308 may be provided from the region of the transmissive output surface 52 between the opaque mask 7 and the spatial light modulator 200. Light ray 308 illustrates a raypath that achieves illumination in an otherwise shadowed region of surface 52. Light reflecting facets 74 of the reflective surface 64 of the respective catadioptric optical element 38 are arranged to direct light to the refractive light output structure 56. In at least one catadioptric cross-sectional plane the refractive light output structure 56 comprises a plurality of pairs of oppositely inclined transmissive light deflecting facets 57*a*, 57*b*. As illustrated in FIG. 3, the refractive light output structure 56 comprising plurality of pairs of oppositely inclined transmissive light deflecting facets 57a, 57b may be circularly or elliptically symmetric, in the plane of the transmissive output surface 52. Hexagonal boundaries may be used in arrays of catadioptric optical elements to provide continuous arrays. The facets 70, 72, 74 may be concentric with the optical axis, but may be interrupted in the outer regions of each catadioptric optical element 38.

To continue the illustrative embodiment, the facets 57a, 57b may be planar facets with a surface normal direction that has an inclination of 60 degrees to the optical axis 11 in at least one catadioptric cross sectional profile.

Adhesive regions 80 may further comprise a transparent material so that some of the light rays 316 that guide in the input substrate 60 are directed to guide within the transparent LED support substrate 50. Such guiding light may provide reduction of non-uniformities and may be extracted by means of diffusion on or in the substrate 50 or by refractive light output structure 56.

The operation of the light input structure 66 will now be described further.

As illustrated in FIG. 4A, for each catadioptric optical element 38 in at least one catadioptric cross-sectional plane the transmissive surface 62 of the input substrate 60 comprises a refractive light input structure 66 aligned to the respective optical axis 11. Each light input structure 66 extends from the transmissive input surface 62 to the reflective surface 64 of the input substrate 60. In other words, the refractive light input structure 66 may be a microstructure that is arranged on the transmissive input surface 62 of the input substrate 60. The refractive input structure 66 may be fully or partially recessed into the substrate 60 or may be proud of the surface 62. The refractive input structure 66 may be formed on the surface of a transparent substrate such as a polymer or glass, for example by means of UV casting, printing, embossing or injection moulding.

The refractive light input structure 66 comprises a plurality of pairs of oppositely inclined refractive input facets 67a. 67b that may be inclined at equal and opposite inclination angles to the normal direction in the at least one catadioptric cross-sectional plane. As illustrated in FIG. 3, in the plane of the catadioptric optical array 38 the plurality of pairs of inclined refractive input facets 67a. 67b are circularly or elliptically symmetric. In an illustrative embodiment, each input facet may have a planar surface and the angle of each surface 67a, 67b to the optical axis 11 may be 52 degrees. The pitch of the microstructure may be 50 microns for example. Advantageously refractive input facets 67a. 67b may have a low depth, minimising total backlight thickness 75.

It would be desirable to recycle unwanted polarised light from a spatial light modulator 200 comprising an LCD. Reflective polariser 202 is arranged to provide polarisation recirculation of light reflected from the reflective surface 64 of the catadioptric optical element 38. Incident light rays 308, 310 are typically unpolarised and a single polarisation state 311 is transmitted, while an orthogonal polarisation state is reflected. Optional retarder 201 that may be a quarter waveplate may be arranged to modify the reflected polarisation state to the planar regions 71 of the reflective surface 64. Reflected light has a polarisation state that is transformed into an orthogonal polarisation state and transmitted through the reflective polariser 202. Advantageously efficiency may be improved. Further, diffuser layers arranged on the reflective polariser and/or retarder may be arranged to further increase spatial uniformity and reduce mura visibility. In comparison to conventional light recirculating backlights, thickness and cost is reduced because no separate rear reflector layer (that may typically have a thickness of 0.1 mm or more) is used.

Features of the arrangement of FIG. 4A not discussed in further detail may be assumed to correspond to the features with equivalent reference numerals as discussed above, including any potential variations in the features.

Diffuser 203 may be provided by a surface and/or bulk diffusing structure. It may be desirable to provide diffusion for light that is output from the output refractive microstructure 56.

Figure 4B:
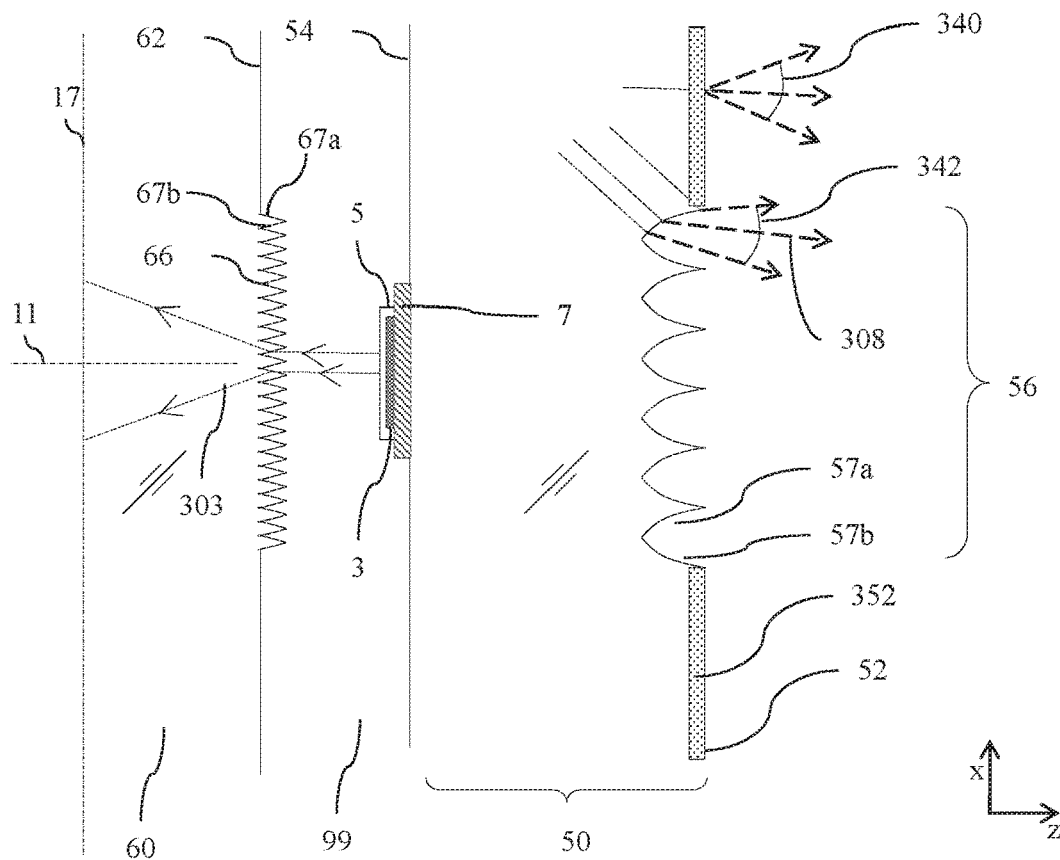
FIG. 4B is a schematic diagram illustrating in top view the transmissive output surface of the LED support substrate arranged to provide diffused output.

FIG. 4B is a schematic diagram illustrating in top view a detail of the catadioptric optical element 38 comprising the refractive light input structure 66 and refractive light output structure 56 of the transmissive output surface 52 of the LED support substrate arranged to wherein the structure 56 further provides diffused output.

Transmissive light deflecting facets 57a, 57b may be provided with curved surfaces, such that light cone solid angle 342 for light rays 308 from the surfaces 57a, 57b is substantially the same as the cone 340 from diffuser surface 352 that may be arranged on the surface 52.

Thus, the angular light output distribution of light from the refractive light output structure 56 is substantially the same as the angular light output distribution of light from the plurality of reflective light reflecting facets 70 that is transmitted through regions of the transmissive output substrate that do not comprise a refractive light output structure 56.

Features of the arrangement of FIG. 4B not discussed in further detail may be assumed to correspond to the features with equivalent reference numerals as discussed above, including any potential variations in the features.

The output of the micro-LED 3 and refractive light input structure 66 will now be further described. In FIG. 4B, light rays that are emitted in the normal direction from the micro-LED 3 are directed towards the refractive light input structure 66 and are deflected towards the reflective surface 64 inclined to the optical axis 11. The optical output of a Lambertian micro-LED will now be described further.

Figure 4C:
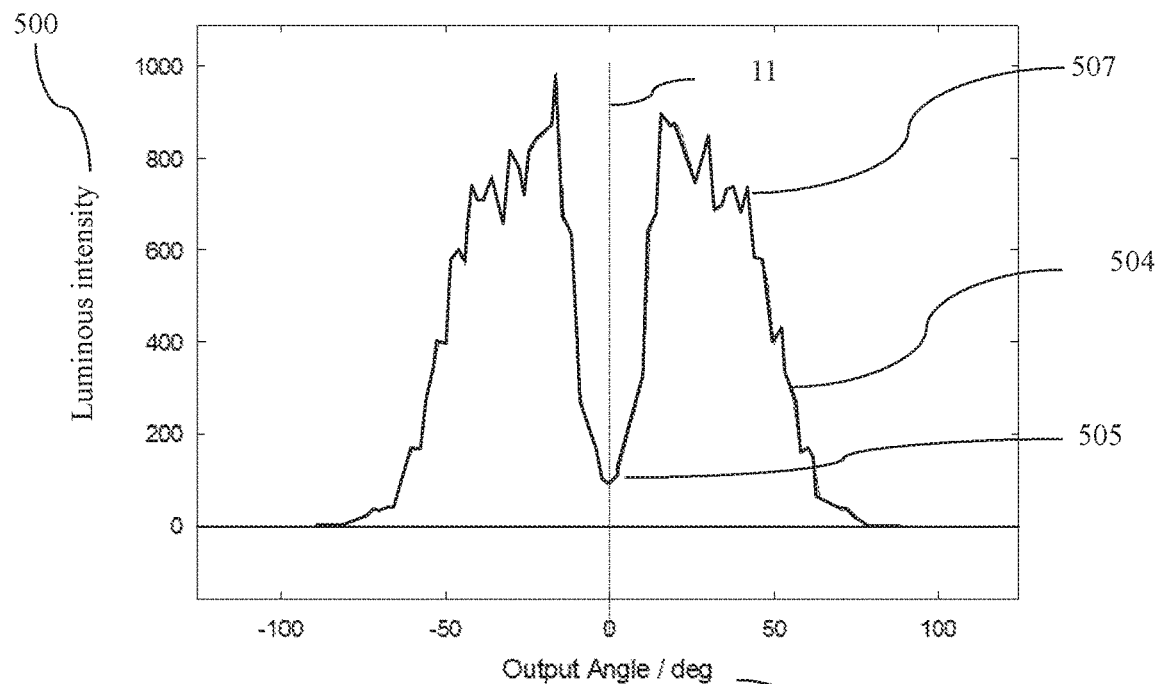
FIG. 4C is a schematic graph illustrating the variation of output luminous intensity from a refractive microstructure of FIG. 4A on the transmissive side of the input substrate of a catadioptric optical element.

FIG. 4C is a schematic graph illustrating in at least one catadioptric cross-sectional plane the profile 504 of simulated output luminous intensity 500 with illumination angle 502 from a refractive light input structure 66 onto a nominal detector plane 17 arranged between the light input structure 66 and the reflective surface 64 and arranged to receive light before incidence onto the reflective surface 64. Features of the arrangement of FIG. 4C not discussed in further detail may be assumed to correspond to the features with equivalent reference numerals as discussed above, including any potential variations in the features.

Profile 504 has a dip 505 in directions that are on-axis and thus reduced luminous intensity is directed towards the axial location of the cusp 69c of the refractive light input structure 68 of FIG. 4A. Facets 67a, 67b provide increased luminous intensity in directions near peak 507 that illuminate reflective facets 74 of the rear reflective surface in FIG. 4, and increase luminous intensity of light rays 308 that are directed to the refractive light output structure 56.

Advantageously increased luminous intensity is provided in the region of the refractive light output structure 56 and the uniformity of output across the transmissive output surface 52 may be increased. Further the thickness of the LED support substrate 50 and the total thickness 75 may be reduced. Light may be provided with a spatial and angular luminous intensity distribution that matches other regions of the output surface 52. The uniformity of the display from a wide range of viewing angles may be maintained, minimising image mura.

In the at least one catadioptric cross-sectional plane the distance 75 between the transmissive output surface 52 and reflective surface 64 is less than 750 micrometres, preferably less than 500 micrometres and more preferably less than 250 micrometres. Such low thickness can be achieved by (i) light guiding within the catadioptric optical array (ii) low thickness of the output microstructure 56 and (iii) use of reflective optics and (iv) the low thickness of the reflective substrate provided by refractive input microstructure 66. Advantageously a thin and flexible LCD display may be provided with high dynamic range local dimming operation.

The output directional distribution of an illustrative embodiment will now be described.

Figure 5A:
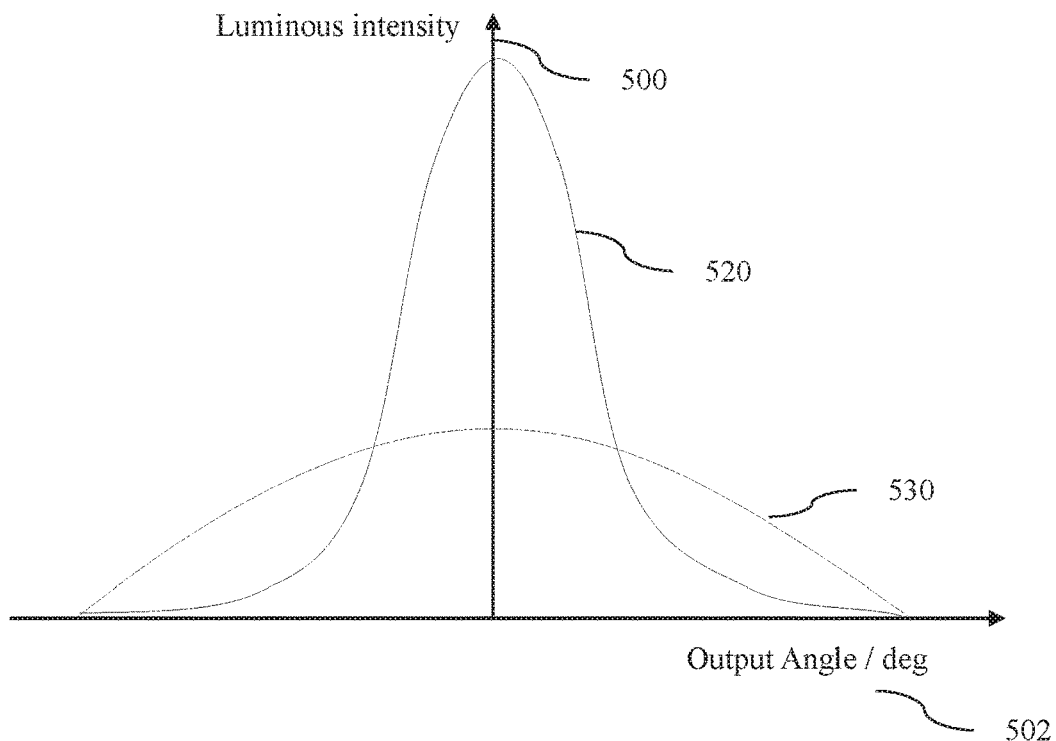
FIG. 5A is a schematic graph illustrating the luminous intensity variation of a directional distribution in comparison to a Lambertian directional distribution.
Figure 5B:
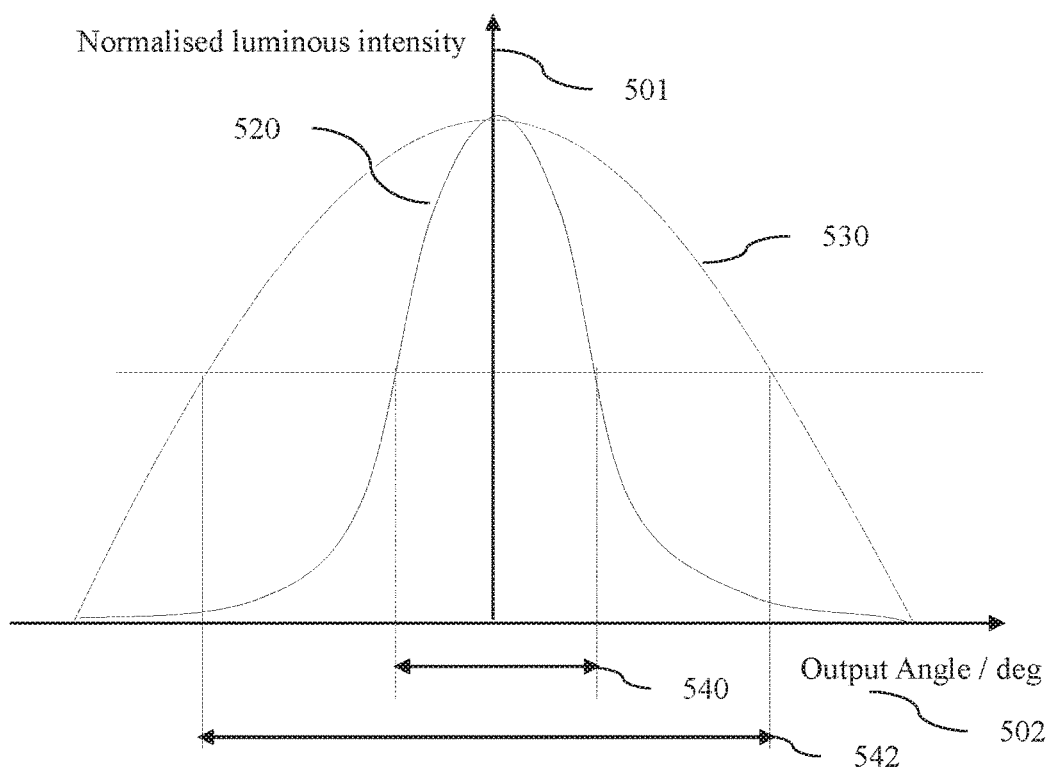
FIG. 5B is a schematic graph illustrating the luminous intensity variation of a normalised directional distribution in comparison to a Lambertian directional distribution.

FIG. 5A is a schematic graph illustrating in one catadioptric cross-sectional plane the directional distribution 520 from the catadioptric array 100 of the present embodiments in comparison to a Lambertian directional distribution 530; and FIG. 5B is a schematic graph illustrating in one catadioptric cross-sectional plane the solid angle of a normalised directional distribution 520 in comparison to a normalised Lambertian directional distribution 530.

Luminous intensity is a measure of the energy density in a light cone and is the number of lumens per unit solid angle. In the present embodiments the luminous intensity half maximum solid angle describes the subtended size of the illumination output cone for which the luminous intensity is half of the peak luminous intensity in each direction.

Luminance of a display is determined by the luminous intensity per subtended unit area. A Lambertian surface has a has a luminance that is independent of viewing angle and thus luminous intensity that is proportional to the cosine of the angle of observation to the normal direction to the surface.

The luminous intensity half maximum solid angle is the solid angle defined by the cone of light in which the luminous intensity in any direction falls to 50% of the peak luminous intensity. The solid angle Ω of a symmetric cone of full width half maximum angle 2θ is given by Equation 1.

$$\Omega = 2\pi*(1-\cos\theta) \quad \text{Equation 1}$$

A Lambertian light source has a cosine distribution of luminous intensity such that the FWHM 542 illustrated in FIG. 5B is 120 degrees and the half angle. θ is 60 degrees. In the two-dimensional arrays of the present embodiments described in FIG. 3, the directional distribution is also two dimensional, so that the profiles 520, 530 are representative of the solid angle of the output.

In the present embodiments, the output is directional, that is the light output distribution 540 thus has a luminous intensity half maximum solid angle that is smaller than the luminous intensity half maximum solid angle of the light output distribution from each of the plurality of micro-LEDs 3 (that have substantially Lambertian output). The present embodiments achieve half maximum solid angles that are less than π steradian and the half cone angle θ in a single cross-sectional plane is less than 60 degrees, preferably less than approximately 40 degrees, more preferably less than approximately 30 degrees and most preferably less than approximately 20 degrees. In other words, the ratio of luminous intensity half maximum solid angle of the present embodiments to the luminous intensity half maximum solid angle of a Lambertian light source is less than 1, preferably less than 50% and more preferably less than 25%. For a privacy display the ratio is most preferably less than 10%.

In the present disclosure, the angular directional distribution refers to the distribution of luminous intensity for a point on the display, in other words the angular directional distribution is the spread of ray density with angle for the point. The uniformity of a display represents the spatial distribution across the catadioptric optical array 100 for any given viewing angle.

The simulated optical output of the illustrative embodiment of FIG. 4A will now be described.

Figure 5C:
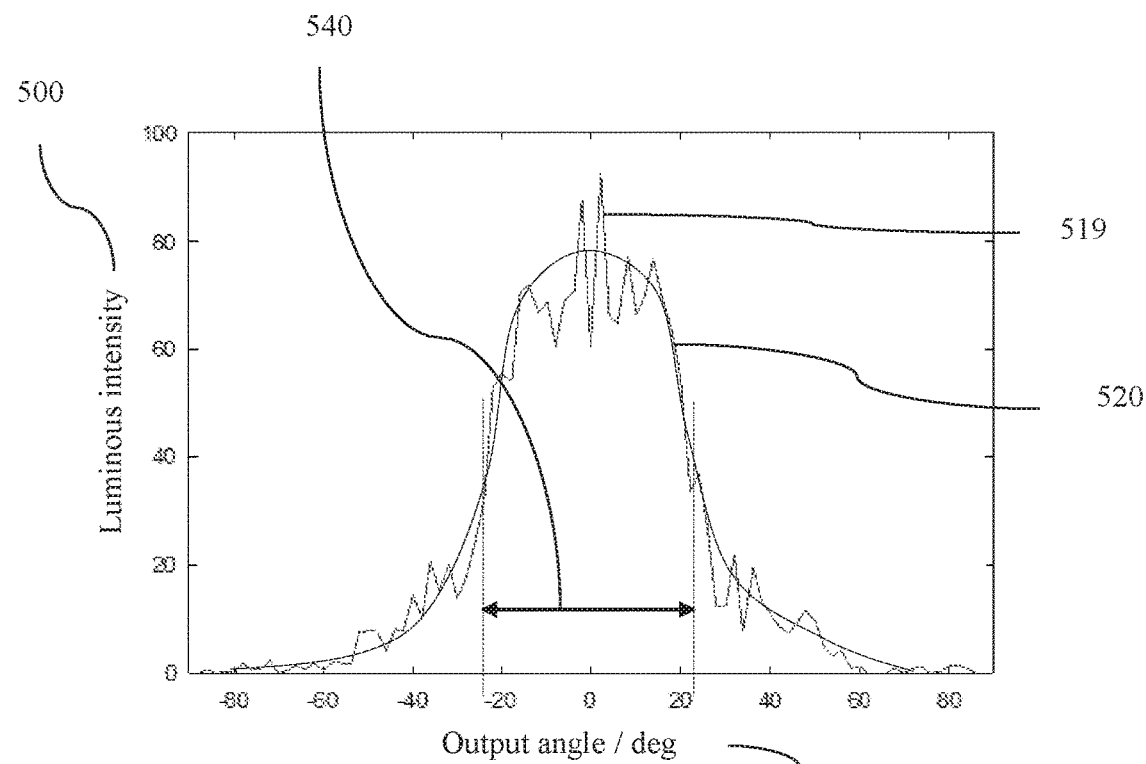
FIG. 5C is a schematic graph illustrating the variation of simulated output luminous intensity against output angles for the arrangement of FIG. 4A.

FIG. 5C is a schematic graph illustrating the simulated variation 519 by raytracing of total output luminous intensity 500 against output angles 502 for the arrangement of FIG. 4A. The smoothed variation 520 illustrates the profile shape for a higher ray count.

FIG. 5C illustrates the integrated luminous intensity 500 at each angle of output for all positions 502 across the output aperture of the catadioptric optical element 38. A FWHM 540 (full angular width for half maximum luminous intensity) of less than 50 degrees may be achieved and low output luminance at angles greater than 40 degrees from the surface normal direction. In the rotationally symmetric illumination system of FIG. 4A, the luminous intensity half maximum solid angle S is determined from the FWHM 540 that is 48 degrees, thus ratio of luminous intensity half maximum solid angle to the luminous intensity half maximum solid angle of a Lambertian light source is 17%.

The FWHM 540 with cross sectional cone half angle θ of 25 degrees illustrated in FIG. 5C achieves a luminous intensity half maximum solid angle of 0.19, and is thus substantially less than the luminous intensity half maximum solid angle of a Lambertian diffuser.

Advantageously for the same power consumption, increased head-on luminance may be provided in comparison to the output directly from the Micro-LEDs 3. Display brightness and efficiency is increased in comparison to Lambertian emission.

The variation of luminous intensity with distance from the optical axis 11 will now be described.

Figure 6:
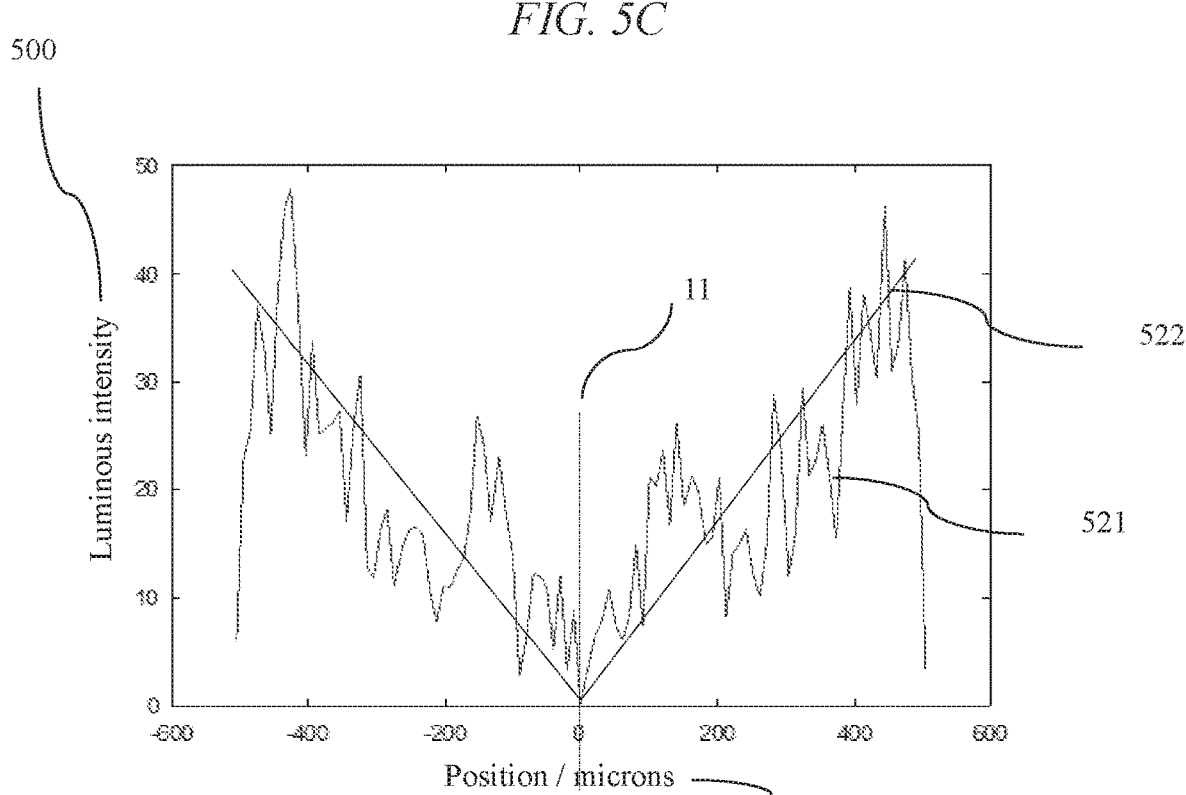
FIG. 6 is a schematic graph illustrating the variation of simulated output luminous intensity against position across the output aperture for the arrangement of FIG. 4A.

FIG. 6 is a schematic graph illustrating the simulated variation 521 by raytracing of total output luminous intensity against position across the output aperture 502 for the arrangement of FIG. 4A. FIG. 6 illustrates the variation 521 of integrated luminous intensity for all angles at each position 502 across the output aperture of the respective catadioptric optical element 38.

The variation in luminous intensity 500 with distance 508 from the optical axis 11 is determined by the reflective and refractive structure designs including the locations and angles of the input structures 66,68 facets 70, 72, 74 and planar regions 71 on the reflective surface 64 and refractive light output structure 56. To provide increased spatial uniformity across the array, the arrangement of at least facets 70, 72 74 may be modified and further diffusers may be provided on the output of the catadioptric optical array 100.

Desirably the variation 521 increases in luminous intensity proportional to the distance from the optical axis 11 as illustrate by profile 522. Such an increase in luminous intensity provides compensation for the increase in the circumference or length of the light extracting facets 70, 72, 74 with the distance from the optical axis, and thus maintains a uniform luminous intensity per unit area, achieving uniform luminance Advantageously uniform output luminance may be provided for a wide range of viewing directions in a rotationally symmetric catadioptric optical element 38.

It would be desirable to reduce the number of alignment steps during manufacture of the catadioptric optical element array 100.

Figure 7:
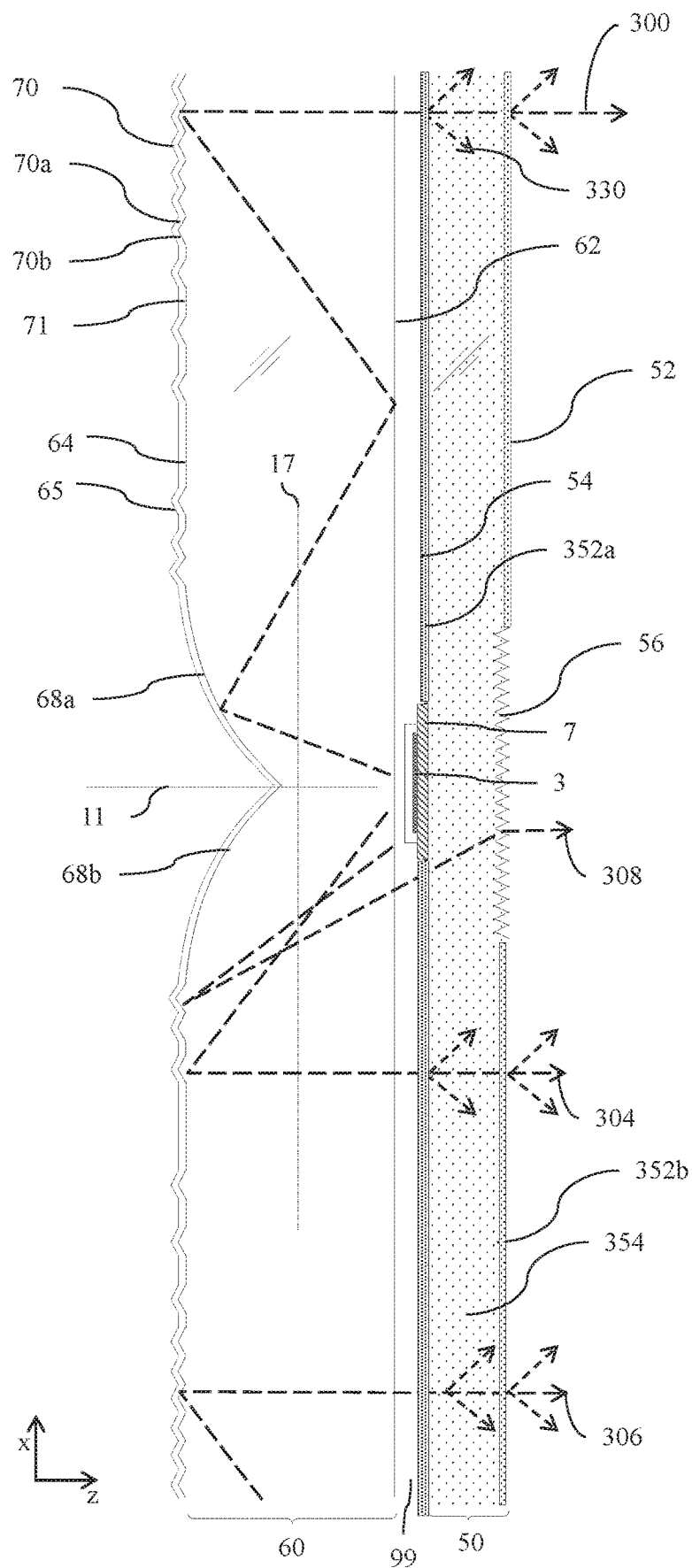
FIG. 7 is a schematic diagram illustrating in top view light rays from a micro-LED and catadioptric optical element comprising a planar transmissive surface for a catadioptric input substrate.

FIG. 7 is a schematic diagram illustrating in top view light rays from a micro-LED 3 and catadioptric optical element 38 comprising a planar transmissive surface 62 for a catadioptric input substrate 60. Thus FIG. 7 illustrates a planar input surface for the transmissive input surface 62 of the input substrate 60 in comparison to the microstructured input structure 66 of FIG. 4A. Features of the arrangement of FIG. 7 not discussed in further detail may be assumed to correspond to the features with equivalent reference numerals as discussed above, including any potential variations in the features.

Advantageously during fabrication of input substrate 60, an alignment step to align input microstructure 66 with reflective input structure 68 is not provided, reducing complexity and cost.

The luminous intensity profile at plane 17 for the planar input surface 62 will now be described.

Figure 8:
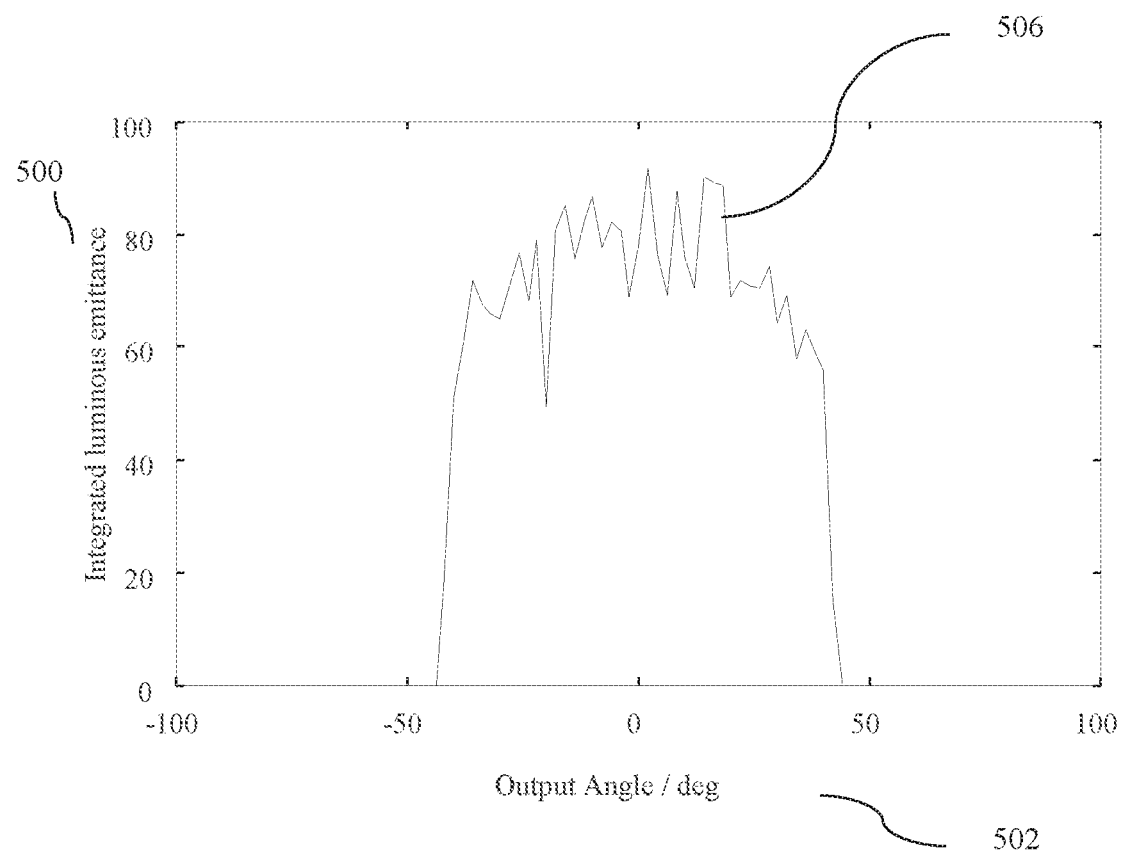
FIG. 8 is a schematic graph illustrating the variation of output luminance from a refractive microstructure of FIG. 7 on the transmissive side of the input substrate of a catadioptric optical element.

FIG. 8 is a schematic graph illustrating in at least one catadioptric cross-sectional plane the simulated profile 506 of output luminous intensity 500 with illumination angle 502 from a planar transmissive input surface 62 onto the detector plane 17 by way of comparison with FIG. 4C. In comparison to the profile 504 in FIG. 4C, profile 506 has no dip for light rays that are substantially parallel to the optical axis 11, so that less light is directed to refractive light output structure 56 by light rays 308 as illustrated in FIG. 4A. The density of microstructures 74 may be increased to compensate for the reduction in output luminance.

The simulated optical output of the structure similar to FIG. 7 will now be described.

Figure 9A:
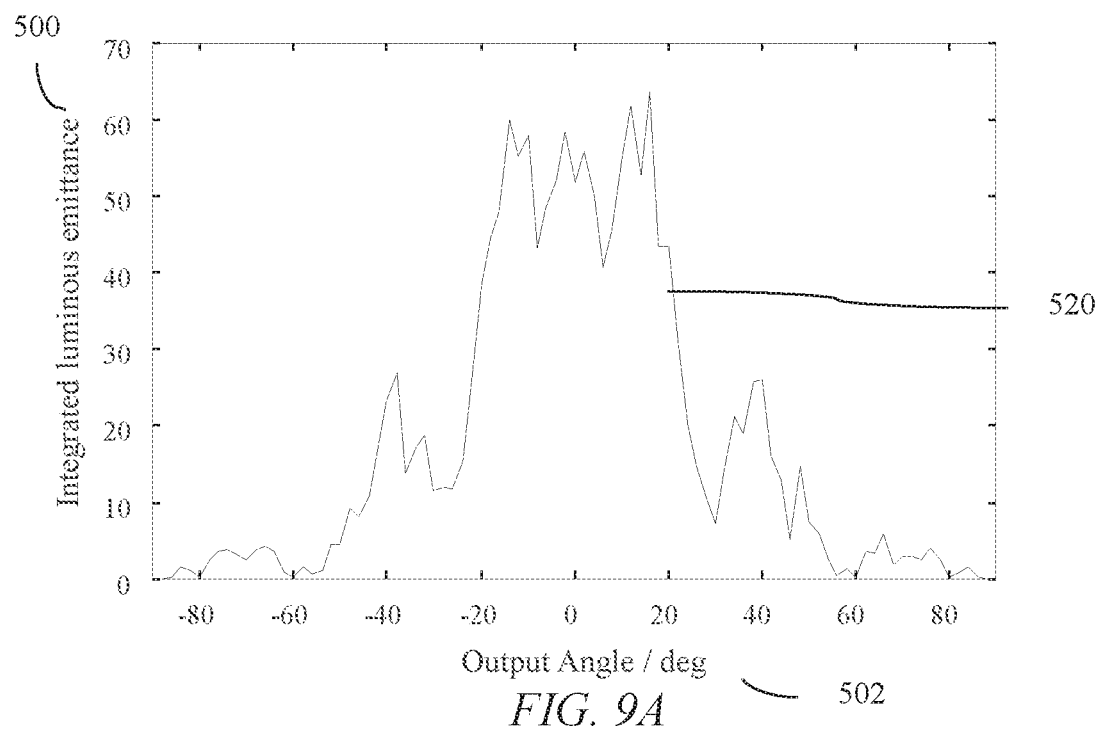
FIG. 9A is a schematic graph illustrating the simulated variation of total output luminous intensity against output angles for the arrangement of FIG. 7.
Figure 9B:
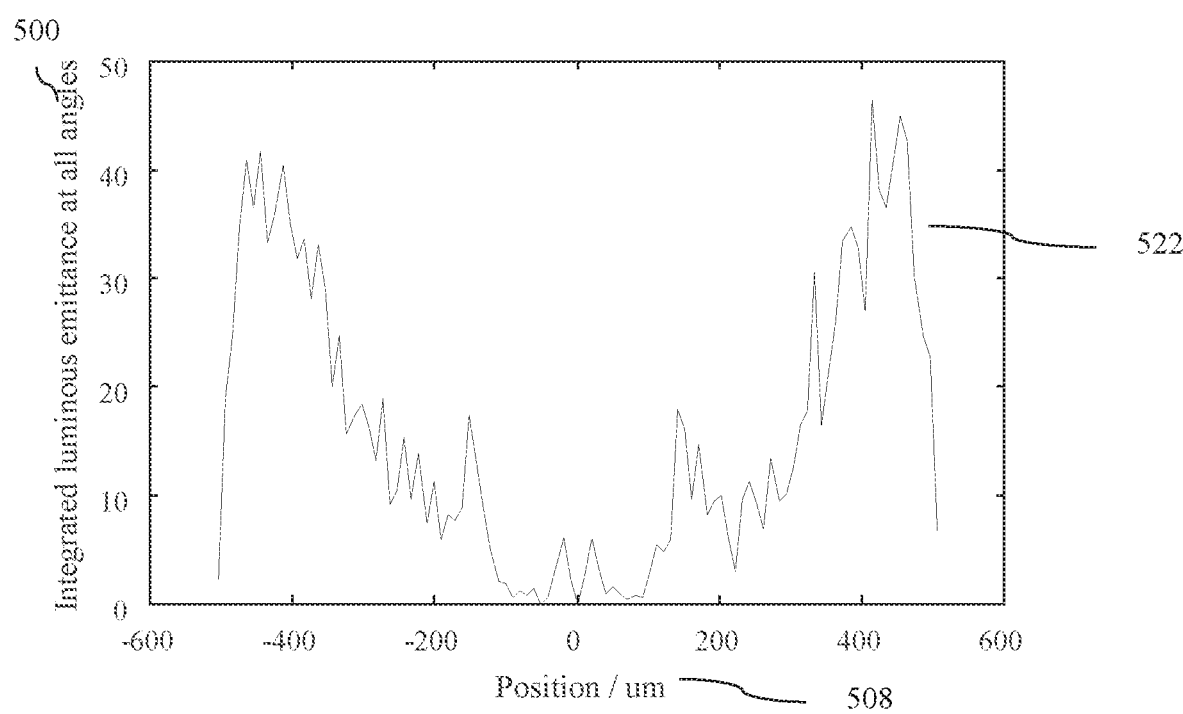
FIG. 9B is a schematic graph illustrating the simulated variation of total output luminous intensity against position across the output aperture for the arrangement of FIG. 7.

FIG. 9A is a schematic graph illustrating the variation of total output luminance against output angles for the arrangement of FIG. 7; and FIG. 9B is a schematic graph illustrating the variation of total output luminance against position across the output aperture for the arrangement of FIG. 7. In comparison to FIGS. 5A-C, increased luminance is seen at angles near to 45 degrees, there is increased non-uniformity with viewing position and less light is directed from the region of the output structure 56.

In the present embodiments it would be desirable to diffuse the output from the catadioptric optical array 100 to provide increased spatial and angular uniformity. Returning to the description of FIG. 7, further surface relief diffuser structures 352a, 352b are arranged on at least one surface 52, 54 of the transmissive LED support substrate 50. In fabrication, surface relief diffusers 352 may be formed with the same tool that form structures 56 to reduce cost. Further the substrate 50 may have some bulk diffusion property, for example provided by filler material 354.

Advantageously mura effects arising from visibility of facets 70, 72, 74 may be reduced. Further, light scatter may be provided for polarisation recirculation, increasing efficiency.

It would be desirable to provide light cone angular output that is substantially the same in the at least one catadioptric cross-section and in the direction orthogonal to the at least one catadioptric cross section, such that the output cone angles are uniform across the catadioptric optical array 100.

Figure 10:
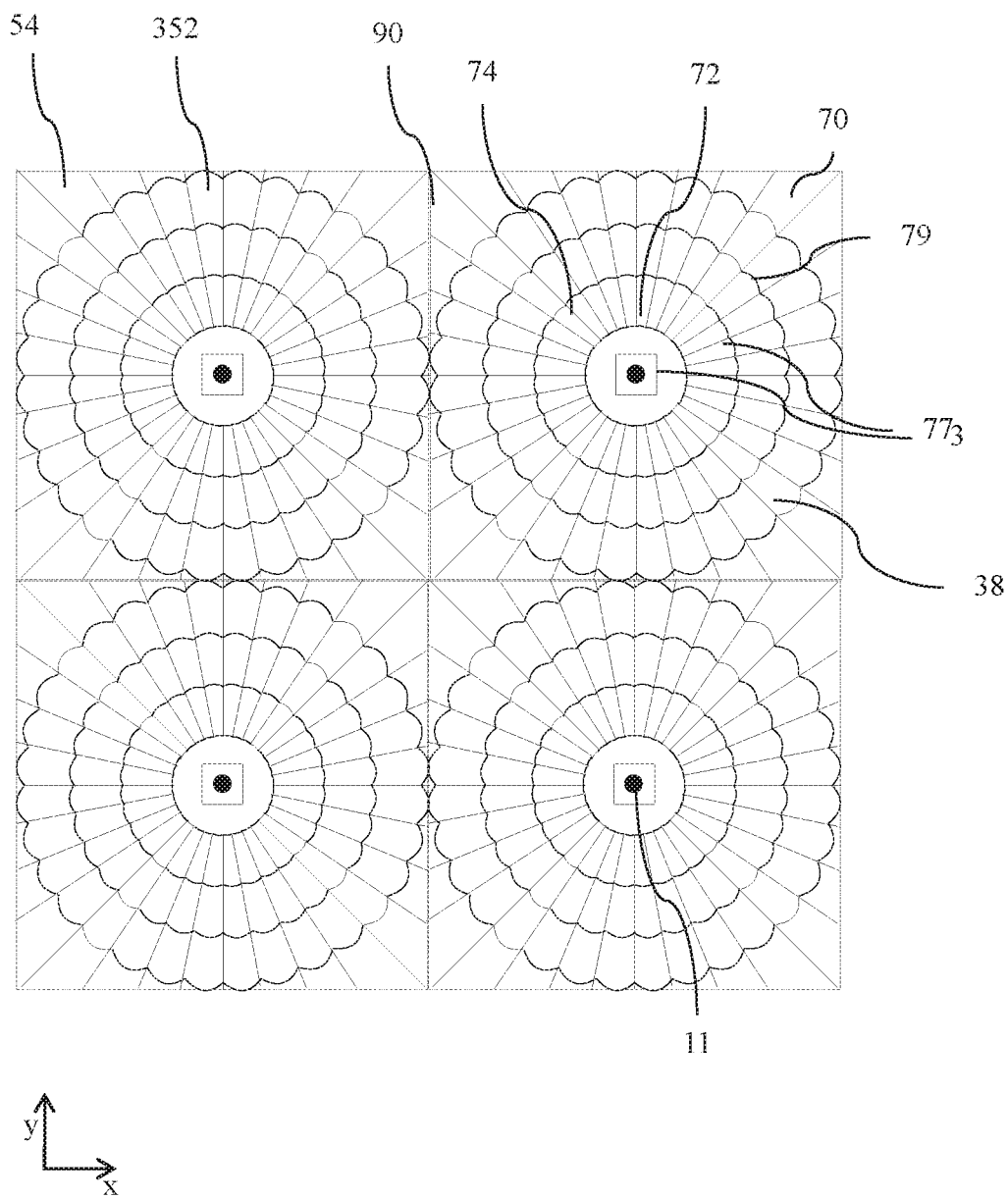
FIG. 10 is a schematic diagram illustrating in front view an arrangement of a diffuser structure provided on at least one surface of the transmissive LED support substrate.

FIG. 10 is a schematic diagram illustrating in front view an arrangement of diffuser provided on at least one of the surfaces 52, 54 of the transmissive LED support substrate 50. Features of the arrangement of FIG. 10 not discussed in further detail may be assumed to correspond to the features with equivalent reference numerals as discussed above, including any potential variations in the features.

Diffuser structures 352 may comprise radially extended lens surfaces that provide diffusion in a direction that is orthogonal to the at least one catadioptric optical cross section illustrated in FIG. 7. In operation, light from facets 70 may have an angle of illumination as illustrated by profile 520 in FIG. 5C or FIG. 9A. In the plane orthogonal to the cross-sectional plane, the spread of light may be related to the size of the micro-LED 3. Such angle may vary with distance from the micro-LED 3 and may be different from the angle of the profiles 520. It would be desirable to achieve a light cone angle orthogonal to the cross-sectional plane that is similar to the cone angle 340 in the cross-sectional plane.

The radial lenses of FIG. 10 may be provided with a constant radius of curvature and thus the sag of the lenses increases with distance from the optical axis 11. Diffusion may be increased by the higher sag for light that is output further from the micro-LED 3 and advantageously increased uniformity of light cone in a plane orthogonal to the at least one cross-sectional plane of FIG. 7. Advantageously improved spatial and angular uniformity of directional distribution may be achieved.

It would be desirable to provide displays with high spatial and angular uniformity, very low bezel widths and with free form shapes. The arrangement of the optical structures of the present embodiments will now be considered further in front view.

Figure 11A:
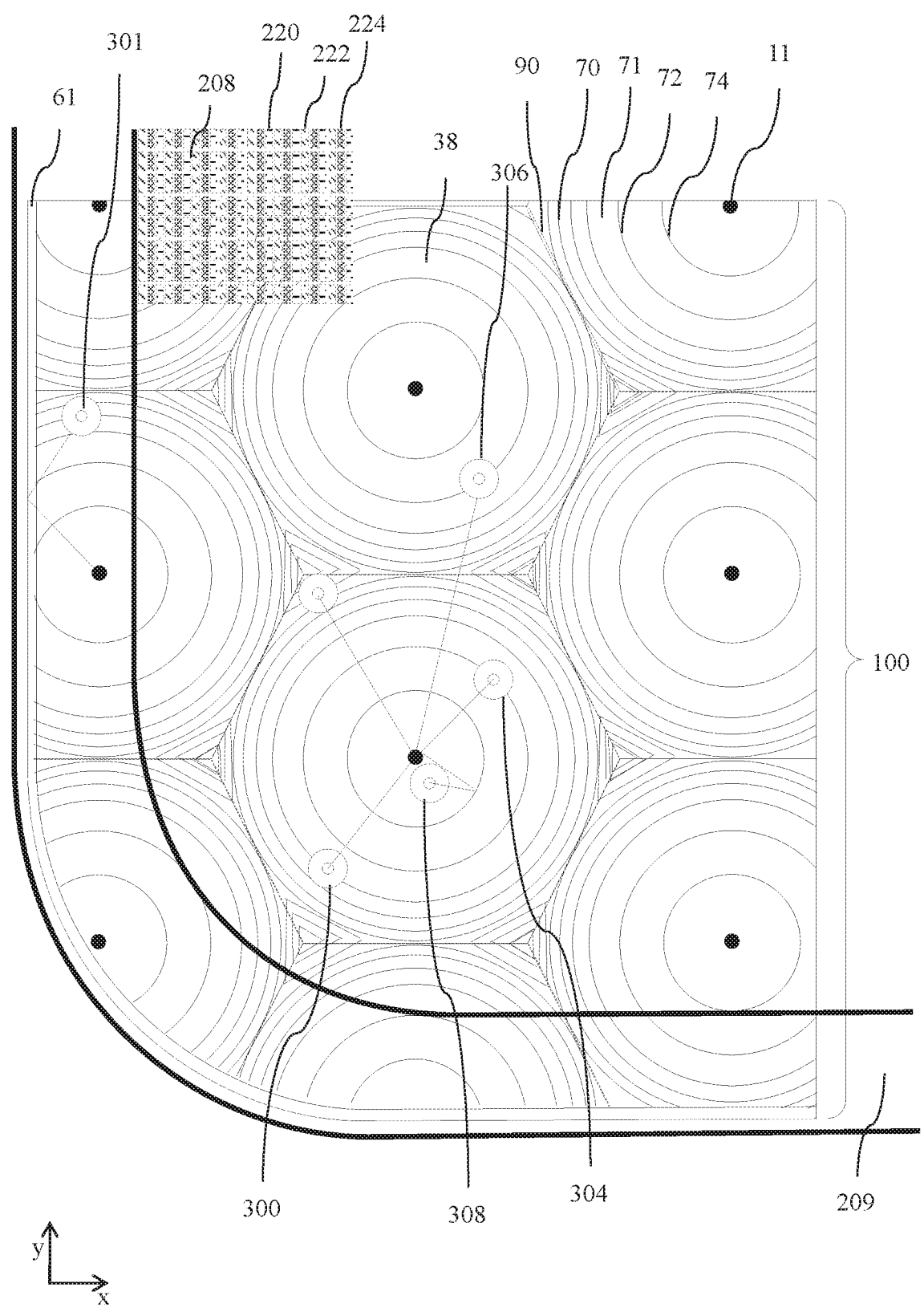
FIG. 11A is a schematic diagram illustrating in front view an arrangement of light reflecting facets of the reflective surface with a hexagonal packing of catadioptric optical elements.

FIG. 11A is a schematic diagram illustrating in front view arrangements of light reflecting facets 70,72 of the reflective surface 64 with a hexagonal extent 90 and hexagonal packing of catadioptric optical elements 38. Features of the arrangement of FIG. 11A not discussed in further detail may be assumed to correspond to the features with equivalent reference numerals as discussed above, including any potential variations in the features.

In the plane of the catadioptric array 100 the light reflecting facets 70, 72, 74 are circularly symmetric. The plurality of light reflecting facets 70 of a catadioptric optical element 38 are concentric with the optical axis 11 of said catadioptric optical element 38.

The propagation of light rays 300, 304, 306, 308 as described in FIG. 4A are illustrated. Light from micro-LED 3 aligned to the optical axis 11 is directed through each of the pixels 220, 222, 224 of the spatial light modulator 200 with substantially the same luminous intensity directional distribution. Advantageously high spatial uniformity may be provided with high efficiency.

In other embodiments (not illustrated), the light reflecting facets may be elliptically symmetric about the optical axis 11. Elliptical light extracting facets 70, 72, 74 may provide asymmetric light output cones in orthogonal directions, for example to provide preferential viewing comfort in one direction compared to the other. For example, a fixed landscape display may have higher viewing freedom in the lateral direction compared to the elevation direction. Advantageously increased efficiency or increased viewing freedom may be provided.

Referring to the lower edge of the display of FIG. 2, in seal region 209 no pixels are provided and outside the seal region 209 the liquid crystal layer 208 comprises pixels 220, 222, 224. The width of the seal region may be 1 mm or less. FIG. 11A further illustrates raypath 301 that may be reflected from reflective material 61 arranged on the edges of the catadioptric optical array 100 as illustrated by ray 301 in FIG. 2. Advantageously, display bezel width may be minimised and free form display shapes achieved such as the curved display corner illustrated in FIG. 11A.

It would be desirable to provide further control of display luminance uniformity.

In a rotationally symmetric catadioptric optical element 38 the luminous intensity of extracted light falls with distance from the optical axis 11 as the total area of the reflecting facet 70 increases with distance, being proportional to the circumference of the facet. The length of circular reflecting facets 70 increases in proportion to the radius. It is desirable to maintain a uniform luminance across the area of the catadioptric optical array 100.

Returning to FIG. 6, a cross sectional variation of luminous intensity 522 to is illustrated achieve a uniform luminance in a rotationally symmetric catadioptric optical element 38. The provision of uniform extracted luminance from the catadioptric optical element will now be described further.

The extracted luminance over the area of a catadioptric optical element 38 is determined by the incident luminous intensity in any notional region across the element 38 and the area of extraction facets 70 in said area. For facets 70 that are arranged with equal width and equal pitch, the total facet 70 area is determined by the facet 70 circumference and increases proportionally with distance from the micro-LED 3. For a fixed luminous intensity in each notional region, the output luminance will fall towards the edge of the element, and create a non-uniformity. It would be desirable to maintain uniform luminance across the area of the element 38 by increasing the luminous intensity of extracted light from the centre to the edges of the element 38. To continue the illustrative example, a desirable increase of luminous intensity towards the edges is illustrated in FIG. 6 and FIG. 9B.

In the present embodiments, as illustrated in FIG. 4A, some increased luminous intensity at the outer notional regions of the element 38 is achieved by guiding light from the micro-LED 3 to the outer regions.

Further, in the embodiment of FIG. 11A, the light reflecting facets 70 of each catadioptric optical element 38 are arranged with a separation that decreases with distance from the optical axis 11 of the catadioptric element. Thus, the number of facets 70 per unit area increases at high radius, and such an increase in facet 70 density provides increased light extraction that compensates for the increased facet 70 circumference.

Further light ray 312 is shown for light rays that are reflected from the edge reflector 61. Advantageously very low bezel widths may be achieved with free-form shapes.

Further arrangements to achieve uniform spatial uniformity of luminance will now be described.

Figure 11B:
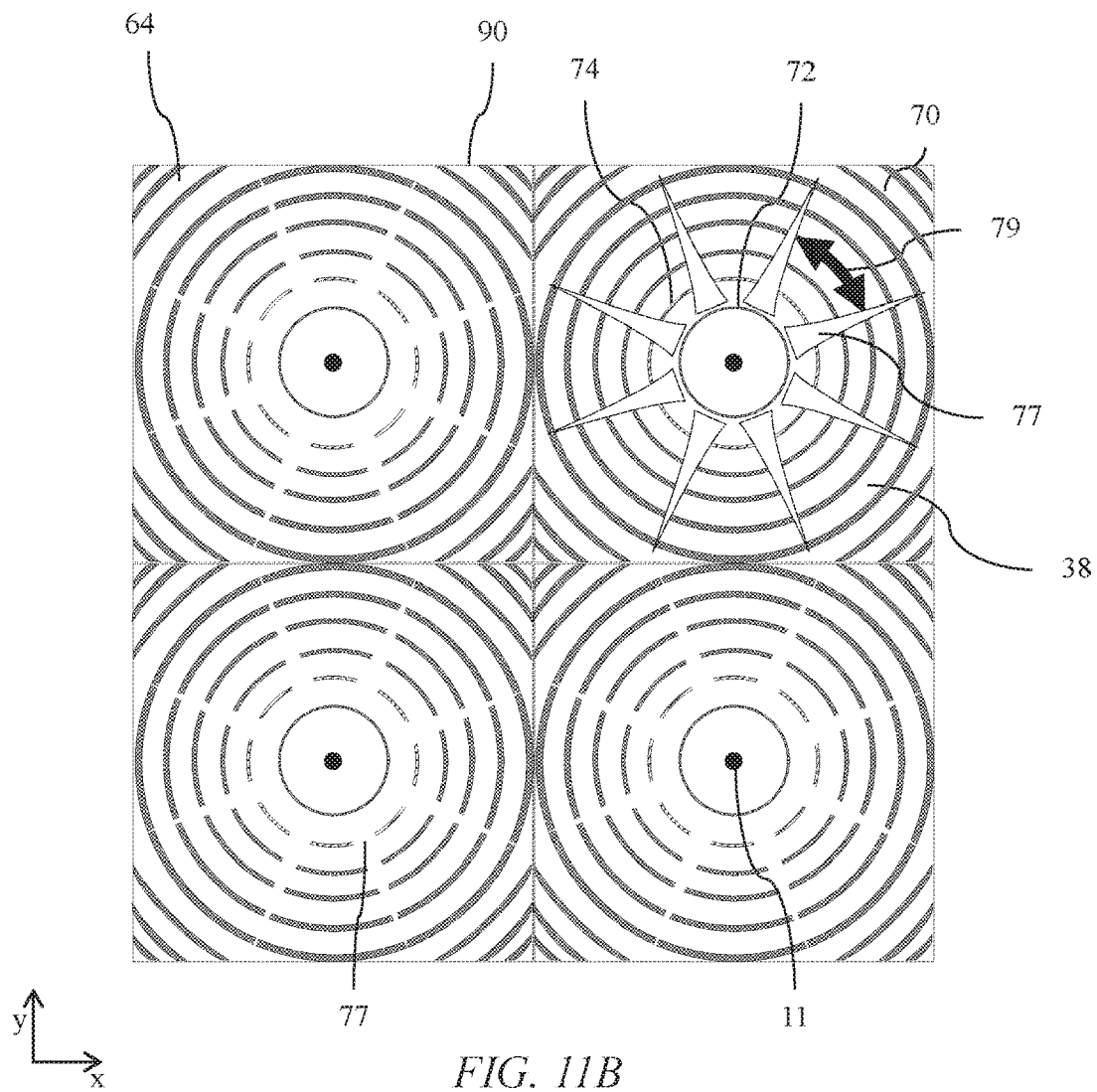
FIG. 11B is a schematic diagram illustrating in front view arrangements of light reflecting facets of the reflective surface with a square packing of catadioptric optical elements.

FIG. 1B is a schematic diagram illustrating in front view arrangements of light reflecting facets 70 of the reflective surface 64 with a square extent 90 and a square packing of catadioptric optical elements 38. Square extent 90 may provide a different mura visibility to the hexagonal extent of FIG. 11A. Features of the arrangement of FIG. 11B not discussed in further detail may be assumed to correspond to the features with equivalent reference numerals as discussed above, including any potential variations in the features.

In comparison with the arrangement of FIG. 11A, the spacing of the facets 70, 72, 74 in at least one catadioptric cross sectional plane may be similar. Additional planar regions 77 are provided that reduce the total length of each facet 70, 72, 74, with length that varies depending on facet function and distance from the optical axis 11. Thus facets 70, 72, 74 may comprise facet segments 79, the length of the facet segments increasing with distance from the micro-LED 3. Output diffusers, for example arranged on surfaces 52, 54 of transmissive LED support substrate 50 may be arranged to provide uniform output in gap between facet segments. Thus in the plane of a catadioptric optical element 38 the length of the light reflecting facets 70 increases with distance from the optical axis 11 of the respective catadioptric optical element 38. Typically, the facets 70 will have an area in the plane of the catadioptric optical element such that the total area of the light reflecting facets 70 increases with the distance from the optical axis 11 of the respective catadioptric optical element 38. Further, the total area of the light reflecting facets 70 is proportional to the distance from the optical axis 11 of the respective catadioptric optical element 38. Compensation for the non-linear variation in luminous intensity of FIG. 9B may be provided.

Figure 11C:
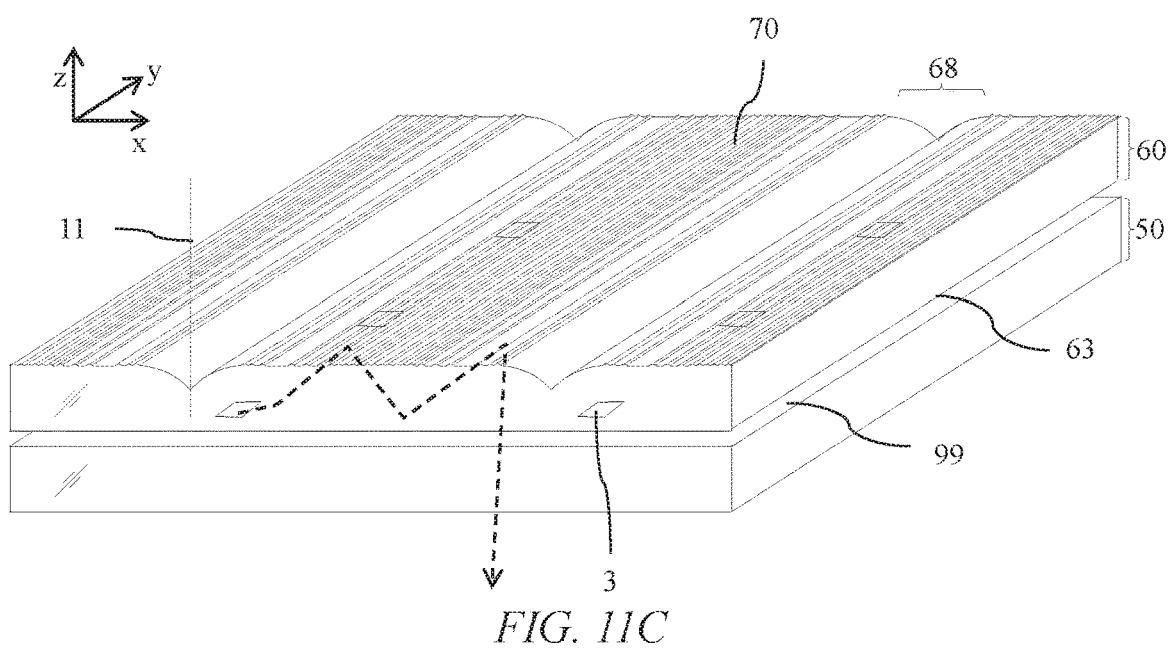
FIG. 11C is a schematic diagram illustrating in perspective side view a one dimensional catadioptric optical element array with reflective surface structure of the type illustrated in FIG. 2 and aligned micro-LED array.

FIG. 11C is a schematic diagram illustrating in perspective side view a one dimensional catadioptric optical element array with reflective surface structure of the type illustrated in FIG. 2 and aligned micro-LED array. Features of the arrangement of FIG. 11C not discussed in further detail may be assumed to correspond to the features with equivalent reference numerals as discussed above, including any potential variations in the features.

In comparison to the arrangement of FIG. 1, the catadioptric optical element array 60 is extended in the y-direction. Such an arrangement provides control of cone angle in the x-z plane and substantially Lambertian output in the y-z plane. The display may be observed with substantially the same luminance for rotation about the x-axis and with reduced luminance for rotation about the y axis. Advantageously comfortable viewing freedom may be achieved for a head on user for various display orientations. Further, manufacture of such components may also be conveniently achieved.

Figure 11D:
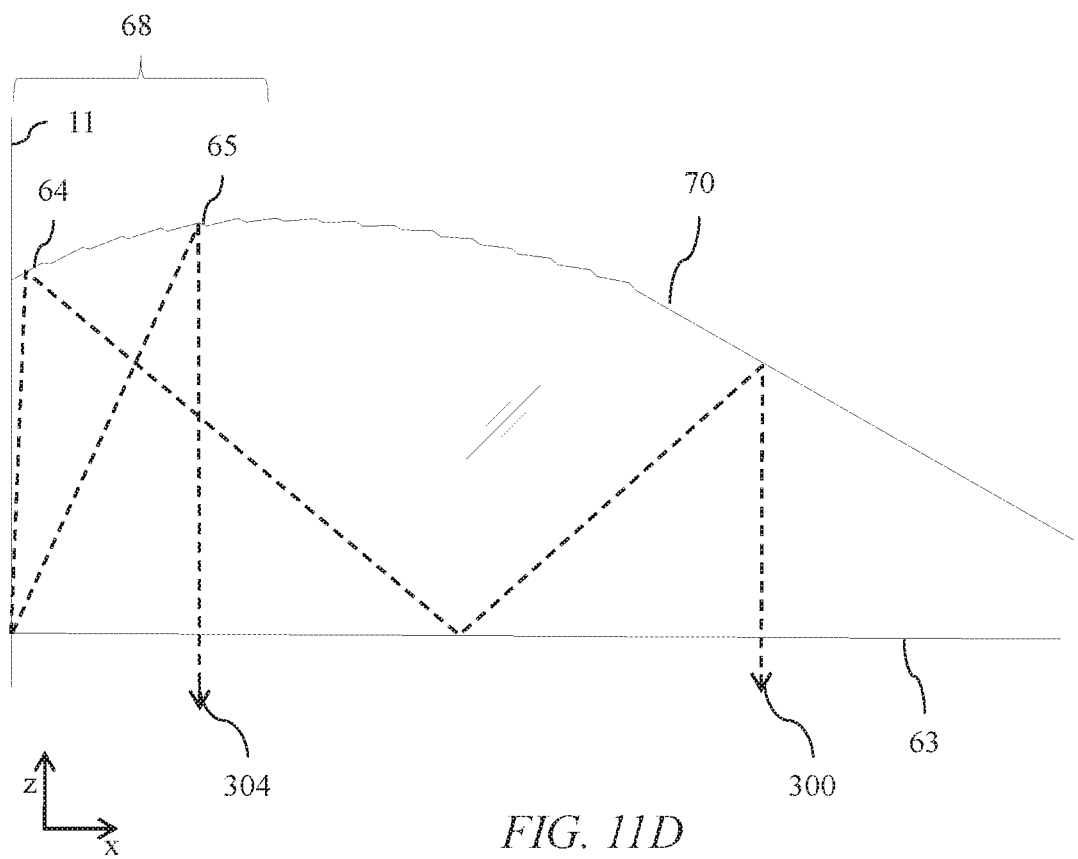
FIG. 11D is a schematic diagram illustrating in side view a reflective surface structure for a catadioptric optical element array.
Figure 11E:
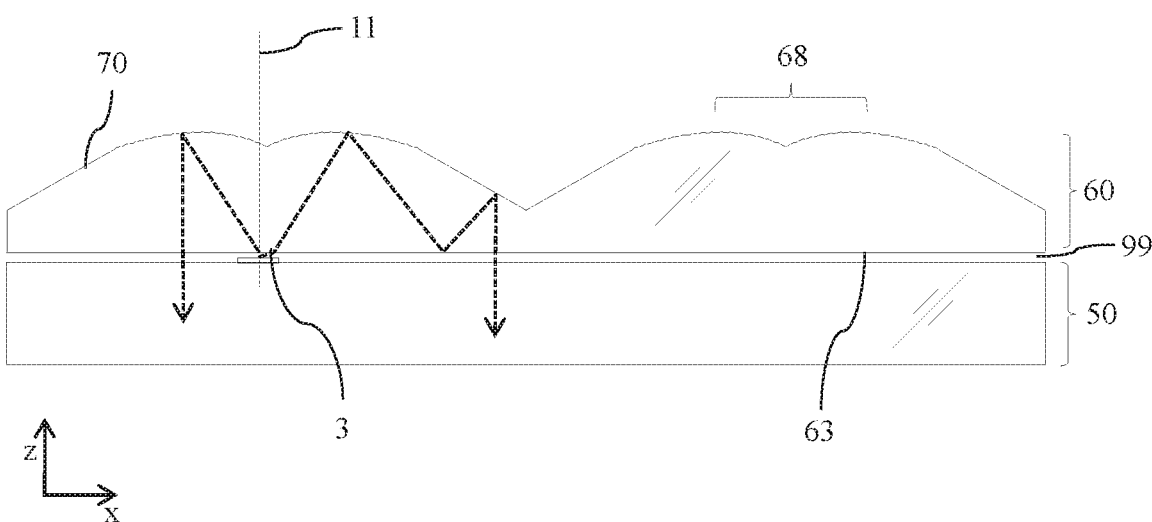
FIG. 11E is a schematic diagram illustrating in side view a catadioptric optical element array comprising the structure of FIG. 11D.
Figure 11F:
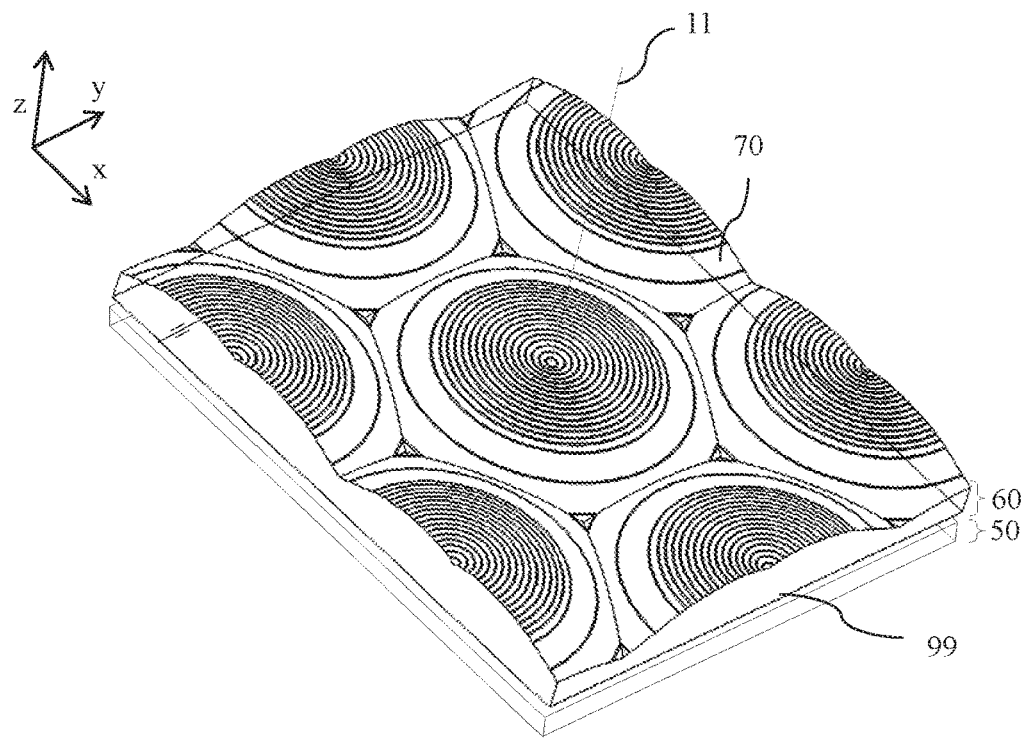
FIG. 11F is a schematic diagram illustrating in perspective side view a two dimensional catadioptric optical element array with reflective surface structure of the type illustrated in FIGS. 11D-E and aligned micro-LED array.

FIG. 11D is a schematic diagram illustrating in side view a reflective surface structure for a catadioptric optical element array; FIG. 11E is a schematic diagram illustrating in side view a catadioptric optical element array comprising the structure of FIG. 11D and FIG. 11F is a schematic diagram illustrating in perspective side view a two dimensional catadioptric optical element array with reflective surface structure of the type illustrated in FIGS. 11D-E and aligned micro-LED array. Features of the arrangements of FIGS. 11D-F not discussed in further detail may be assumed to correspond to the features with equivalent reference numerals as discussed above, including any potential variations in the features.

In comparison to the arrangement of FIG. 1 for example, the facets 64, 65 may have different tilt angles and the outer surface 70 may be linear. Such a structure may be tooled with reduce cost and complexity.

It may be desirable to achieve at least two different luminance angular distributions, for example to achieve switching between a wide angle and privacy mode of operation.

Figure 12A:
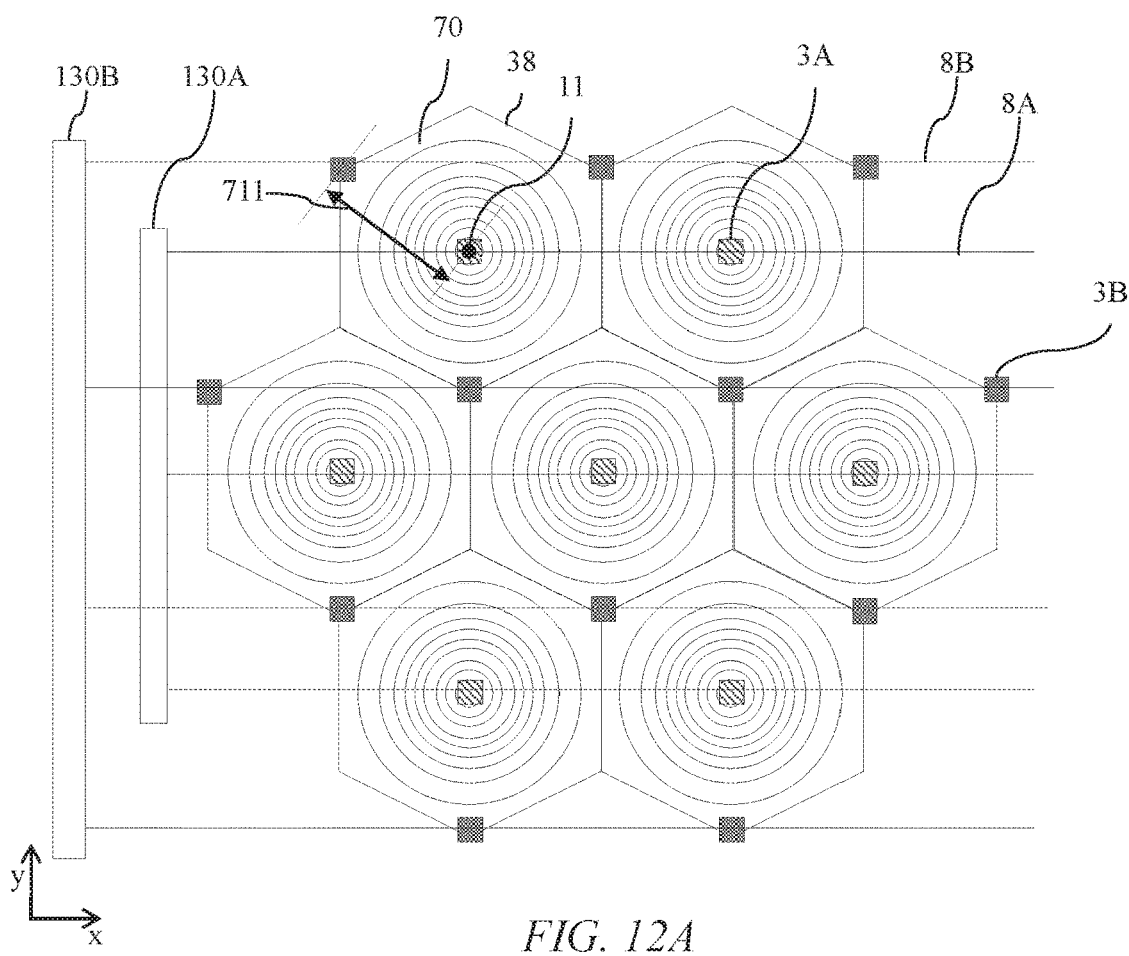
FIG. 12A is a schematic diagram illustrating in front view a reflective surface structure for a catadioptric optical element array and first and second micro-LED arrays arranged to provide switching between a narrow angle and wide angle field of view.

FIG. 12A is a schematic diagram illustrating in front view a reflective surface structure for a catadioptric optical element array and first and second micro-LED arrays arranged to provide switching between a narrow angle and wide angle field of view. Features of the arrangement of FIG. 12A not discussed in further detail may be assumed to correspond to the features with equivalent reference numerals as discussed above, including any potential variations in the features.

The illumination apparatus comprises first plurality of LEDs 3A and further comprises a second plurality of LEDs 3B arranged in an LED array, wherein the second plurality of LEDs 3B are micro-LEDs or mini-LEDs. Each optical axis 11 is offset from one or more of the LEDs 3B of the second plurality of LEDs, and each of the LEDs 3B of the second plurality of LEDs is offset from the optical axis 11 of at least one of the catadioptric optical elements (e.g. at a distance 711 from the optical axis 11). Each optical axis 11 is aligned in correspondence with an LED 3A of the first plurality of LEDs, and each of the first plurality LEDs 3A is aligned in correspondence with the optical axis 11 of one of the catadioptric optical elements. In the embodiment of FIG. 12A the first LEDs 3A are arranged at the optical axis 11 (such that the distance 711 is zero) and the second LEDs 3B are arranged at some of the apices of the hexagonal catadioptric optical elements 38.

Drive controller 130A is arranged to provide LEDs 3A with drive signals that may comprise image data to achieve high image contrast by means of local area dimming. Drive controller 130B is arranged to provide LEDs 3B with drive signals that may comprise image data to achieve high image contrast by means of local area dimming.

Figure 12B:
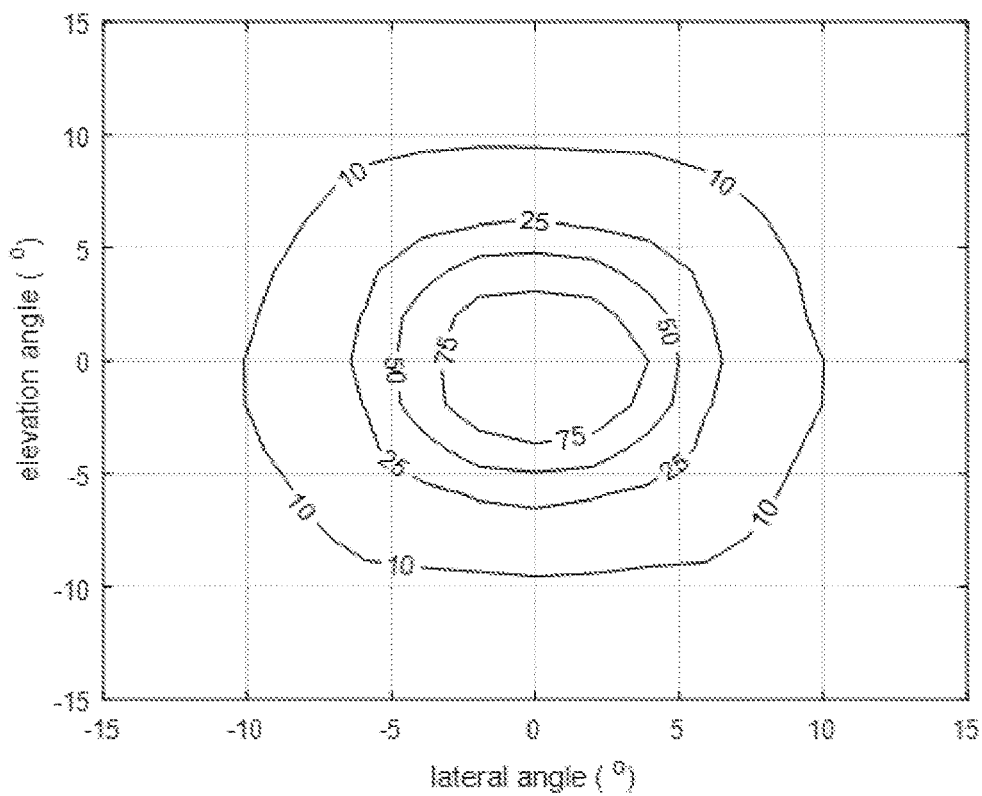
FIG. 12B is a schematic graph illustrating the angular profile for the first micro-LED array of FIG. 12A.
Figure 12C:
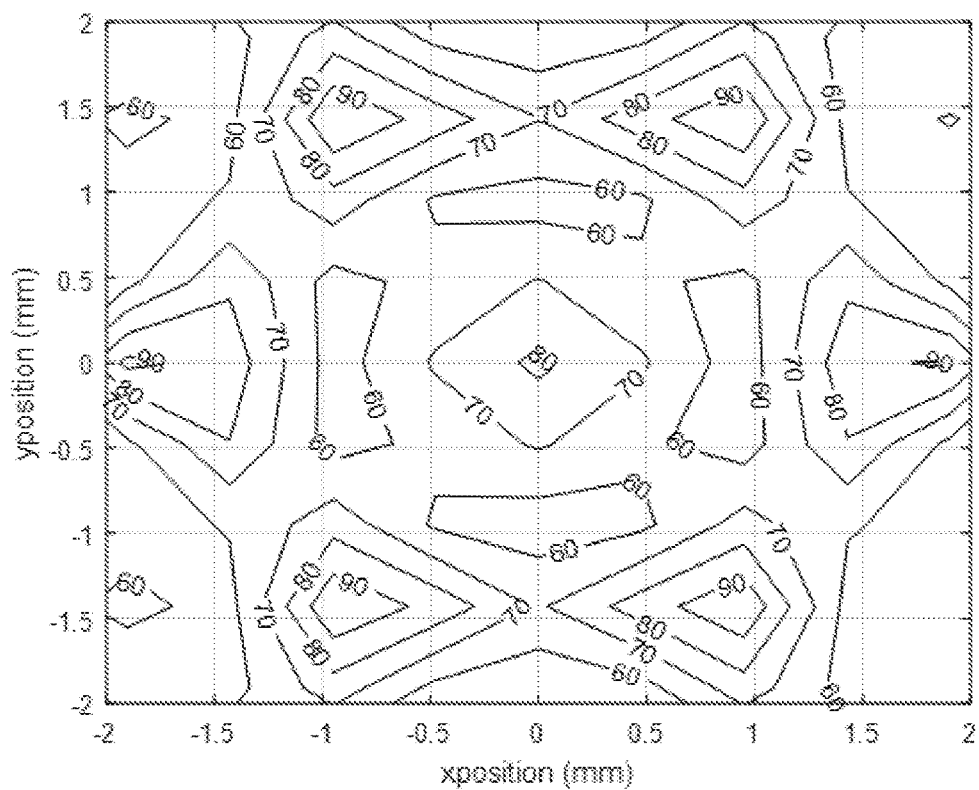
FIG. 12C is a schematic graph illustrating the spatial uniformity across the array for the first micro-LED array of FIG. 12A.

FIG. 12B is a schematic graph illustrating the polar variation of luminous intensity for one region on the backlight for the first micro-LED array of FIG. 12A; and FIG. 12C is a schematic graph illustrating the spatial uniformity of luminous intensity for the first micro-LED array of FIG. 12A for a normal direction and for an illustrative embodiment with a micro-LED 3 pitch of 2 mm in the x-axis.

Advantageously a narrow cone angle can be achieved with relatively high spatial uniformity. Addition of a diffuser may be used to increase spatial uniformity while increasing solid angle of the output light cone. Desirably after diffusion, the FWHM of the output light cone is less than 30 degrees, preferably less than 25 degrees and most preferably less than 20 degrees.

Figure 12D:
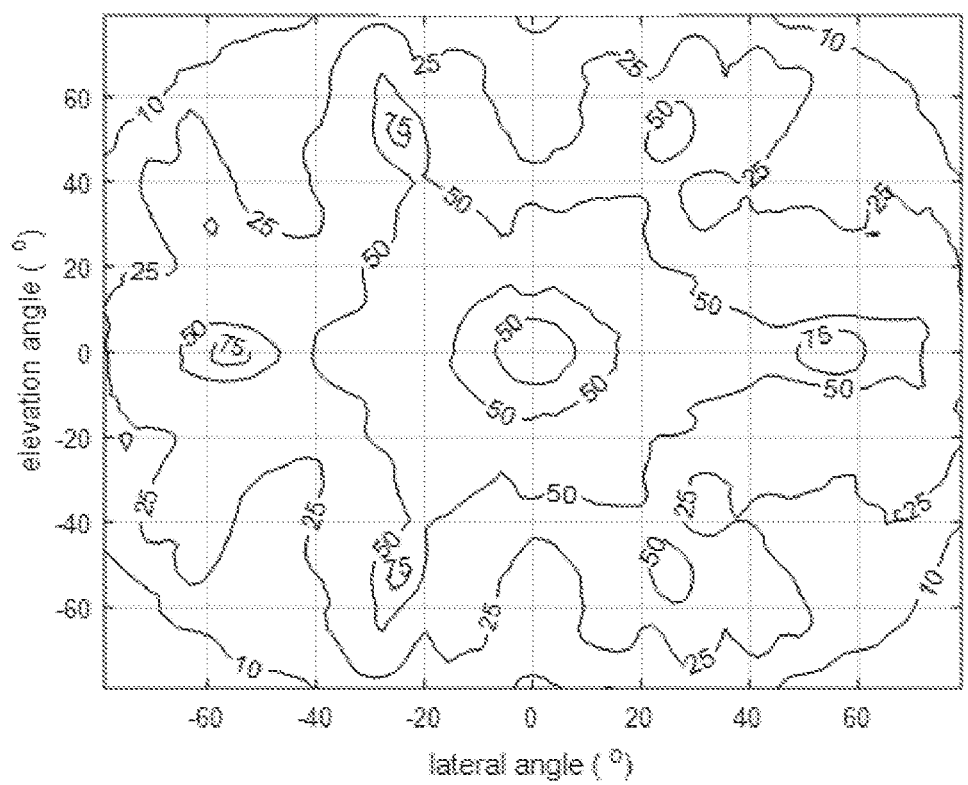
FIG. 12D is a schematic graph illustrating the angular profile for the second micro-LED array of FIG. 12A.
Figure 12E:
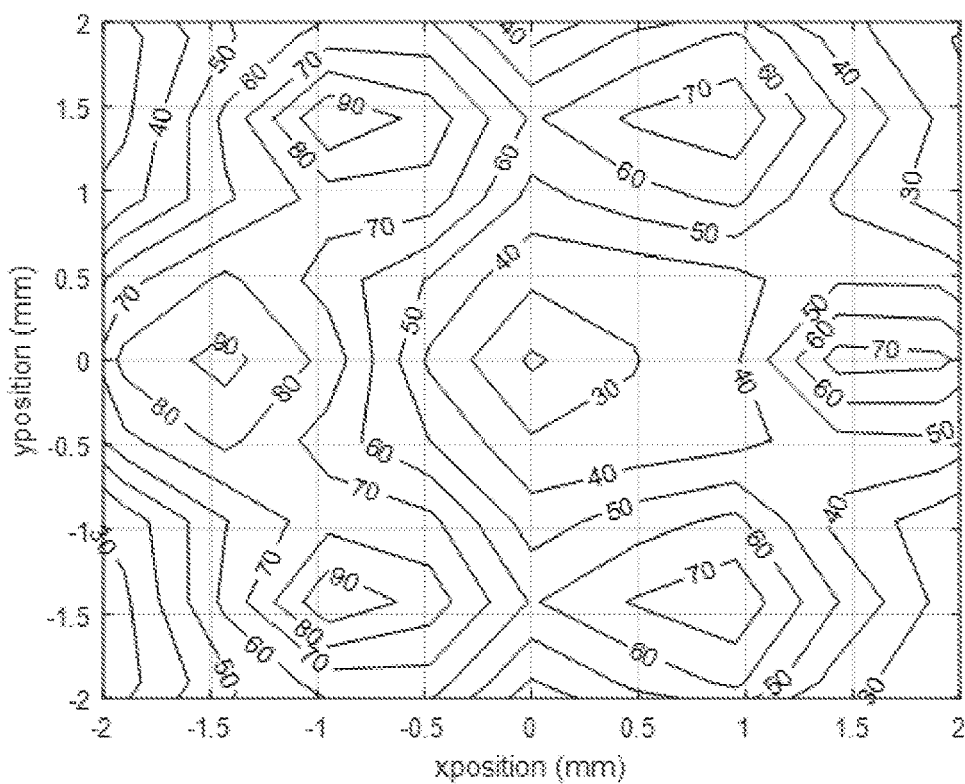
FIG. 12E is a schematic graph illustrating the spatial uniformity across the array for the second micro-LED array of FIG. 12A.

FIG. 12D is a schematic graph illustrating the polar variation of luminous intensity for one region on the backlight for the second micro-LED array of FIG. 12A; and FIG. 12E is a schematic graph illustrating the spatial uniformity of luminous intensity across the array for the second micro-LED array of FIG. 12A for a pitch of catadioptric optical elements of 2 mm.

As shown in FIGS. 12D-E, the light output distribution of the re-directed light provided by each catadioptric optical element using light output from the second plurality of LEDs 3B has a luminous intensity half maximum solid angle that is greater than the luminous intensity half maximum solid angle of the of the re-directed light provided by each catadioptric optical element using light output from the first plurality of LEDs 3A that is shown in FIG. 12B. Advantageously the light may be spread over a wide field of view by driving the LEDs 3B.

Advantageously a display may be provided that can switch between wide angle mode for use by multiple users and for wide range of viewing directions; and a narrow angle mode of operation that may provide privacy viewing, low stray light operation and high power efficiency with extended battery lifetime. Further very high luminance may be achieved in on-axis directions for low power consumption.

The distance 711 of the micro-LEDs 3A from the optical axis 11 may further be modified across the area of the illumination apparatus, such that the direction of peak luminance is pointed at a nominal observer location. The output may be pupillated such that for an observer in a nominal viewing location advantageously display luminance uniformity may be increased.

Alternative arrangements for reflective light input structure 68 and refractive light output structure 56 will now be described.

Figure 13A:
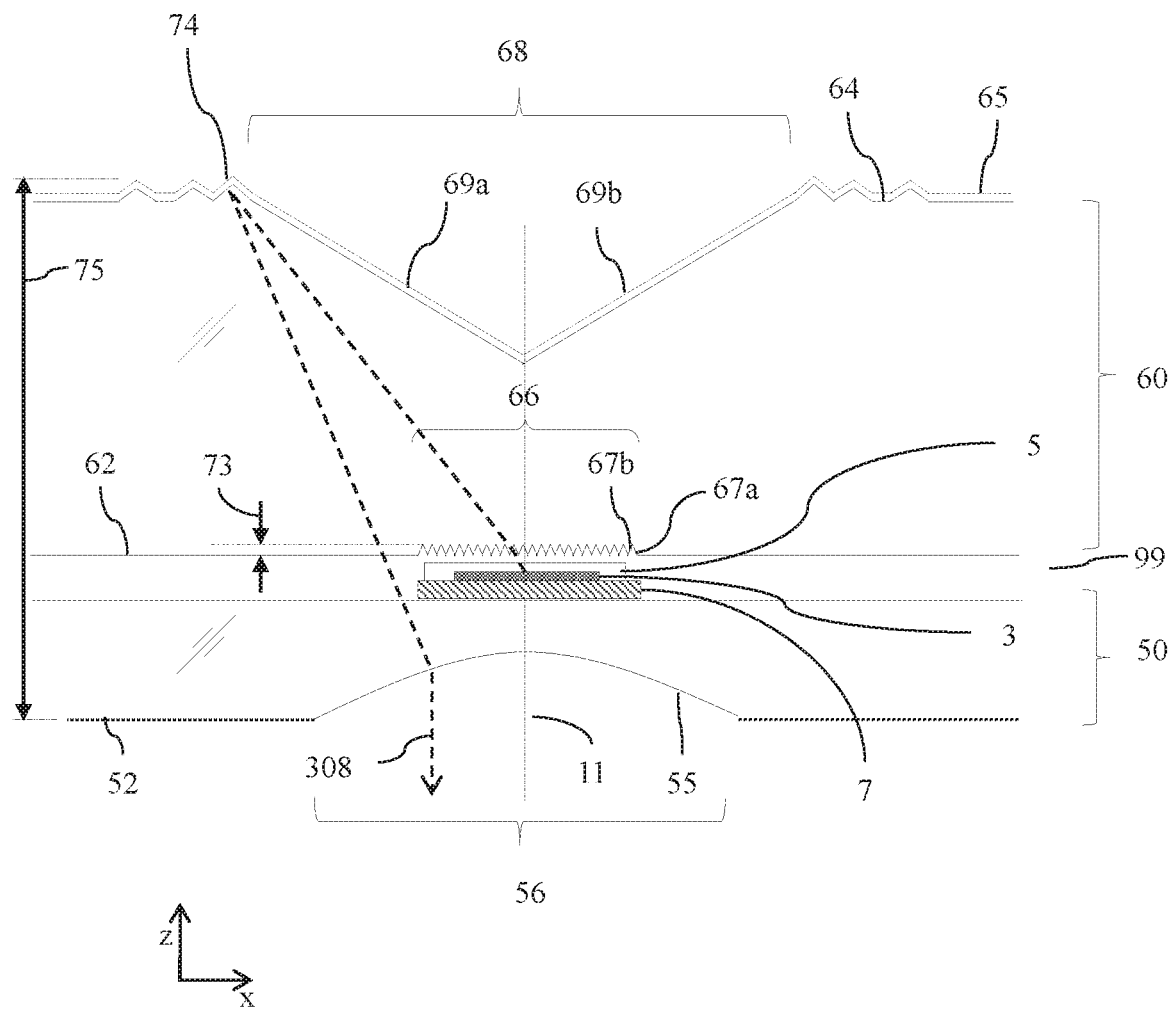
FIG. 13A is a schematic diagram illustrating in top view light the input region of a catadioptric optical element and aligned micro-LED.

FIG. 13A is a schematic diagram illustrating in top view light the input region of a catadioptric optical element 38 and aligned micro-LED 3 in at least one catadioptric cross-sectional plane through its optical axis 11. Features of the arrangement of FIG. 13A not discussed in further detail may be assumed to correspond to the features with equivalent reference numerals as discussed above, including any potential variations in the features.

The operation of the refractive light output structure 56 arranged on the transmissive output surface 52 will now be described. In the embodiment of FIG. 13A, the refractive light output structure 56 comprises a concave refractive surface 55 arranged to provide negative optical power. Light rays 308 from reflective facets 74 are redirected by concave surface 55 to reduce the angle of the rays to the optical axis 11, thus improving the collimation of the output in the region that is otherwise shadowed by the opaque mask 7. Features of the arrangement of FIG. 13A not discussed in further detail may be assumed to correspond to the features with equivalent reference numerals as discussed above, including any potential variations in the features.

FIG. 13A further illustrates reflective light input structure 68 may comprise linear inner surfaces 69a, 69b. Advantageously the surfaces 69a, 69b may be more conveniently tooled than the curved inner surfaces of FIG. 4A.

It would be desirable to provide a backlight with increased robustness and reduced sensitivity to thermal variations.

Figure 13B:
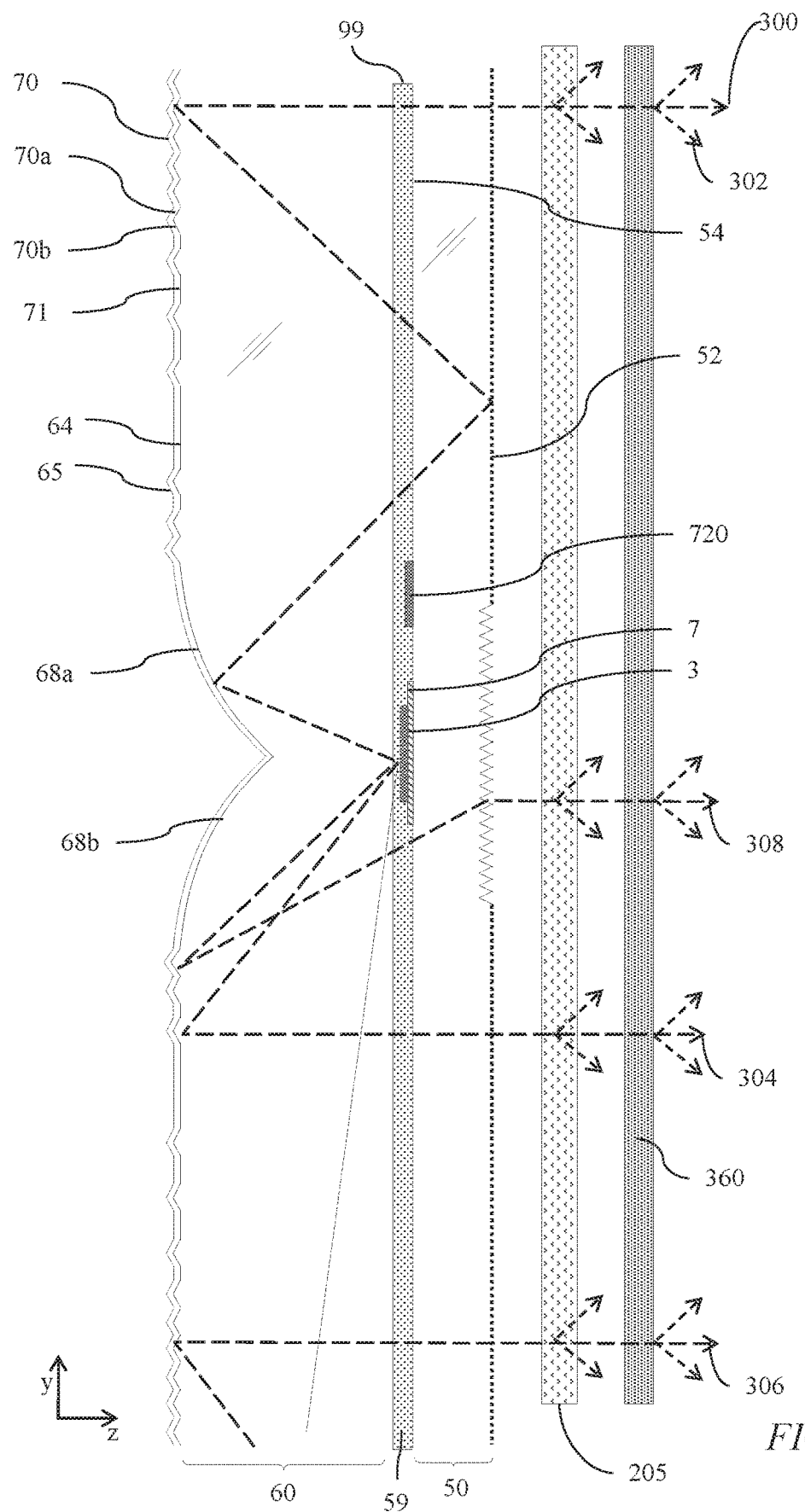
FIG. 13B is a schematic diagram illustrating in top view light rays from a micro-LED and catadioptric optical element comprising an LED support substrate that is attached to the catadioptric substrate.

FIG. 13B is a schematic diagram illustrating in top view light rays from a micro-LED and catadioptric optical element 38 comprising a LED support substrate that is attached to the catadioptric substrate. Transparent material 59 is provided between the first surface 54 of the transmissive LED support substrate 50 and the transmissive input surface 62. Features of the arrangement of FIG. 13B not discussed in further detail may be assumed to correspond to the features with equivalent reference numerals as discussed above, including any potential variations in the features.

Light rays from the plurality of micro-LEDs 3 is guided within the catadioptric optical array 100 between the reflective surface 64 and the second surface 52 of the transmissive LED support substrate 50. Advantageously such a backlight may achieve increased robustness to thermal variations and mechanical deformations.

FIG. 13B further illustrates an embodiment wherein a wavelength conversion layer 205 is arranged to receive light from catadioptric optical array 100. The light rays 300, 304, 306, 308 that propagate within the catadioptric optical array 100 may comprise blue light for example and may be incident on the separate wavelength conversion layer 205 wherein some of the light is converted to yellow light and white light is output from the wavelength conversion layer onto a diffuser 360.

Alternatively, the micro-LED may be provide ultra-violet light and the wavelength conversion layer 205 may be provided to achieve white output light.

The operating temperature of the wavelength conversion layer 205 may be reduced in comparison to the conversion layer 5 aligned to the micro-LED 3 in FIG. 4A and advantageously efficiency of colour conversion may be increased. Further the wavelength conversion layer 205 may comprise quantum dot materials that may encapsulated within appropriate protective substrates to inhibit the conduction of water and/or oxygen. Alternatively, the wavelength conversion layer 205 may be provided by the transmissive LED support substrate, wherein wavelength conversion material may be provided on the first surface 54, within the bulk of the substrate 50 or on the output surface 52. Such wavelength conversion layer 205 also achieves diffused output light, providing increased uniformity.

FIG. 13B further illustrates part of a circuit 720 controlling one or more micro-LEDs 3 and located within the LED array. Circuit 720 may comprise one or more integrated circuits and may comprise one or more TFTs and may comprise one or more passive components such as capacitors. Advantageously integrated circuit elements may be provided across the array rather than at the edges, achieving reduced bezel width and free-form shapes.

Figure 13C:
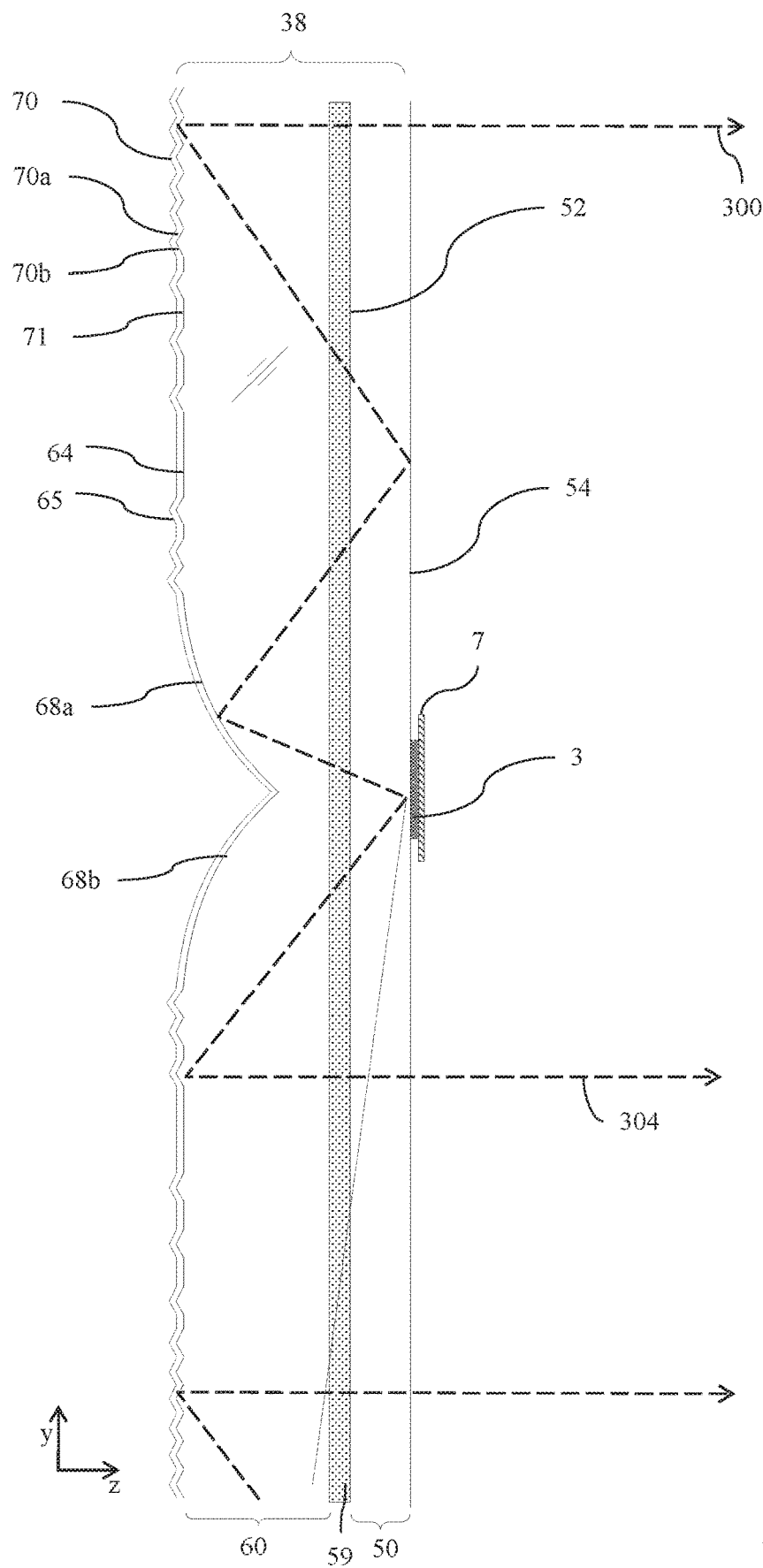
FIG. 13C is a schematic diagram illustrating in top view light rays from a micro-LED and catadioptric optical element comprising a transparent LED support substrate wherein the second side of the transparent substrate is attached to the catadioptric substrate.

FIG. 13C is a schematic diagram illustrating in top view light rays from a micro-LED 3 and catadioptric optical element 38 comprising a transparent LED support substrate wherein the second side of the transparent substrate is attached to the catadioptric substrate. Features of the arrangement of FIG. 13C not discussed in further detail may be assumed to correspond to the features with equivalent reference numerals as discussed above, including any potential variations in the features.

In comparison to FIG. 13B, the LED 3 is arranged to illuminate through transparent LED support substrate 50 which is bonded to the reflective input structure 60. Advantageously device thickness may be reduced while achieving guiding rays 300 to increase lateral uniformity.

It would be desirable to provide a flexible backlight.

Figure 14A:
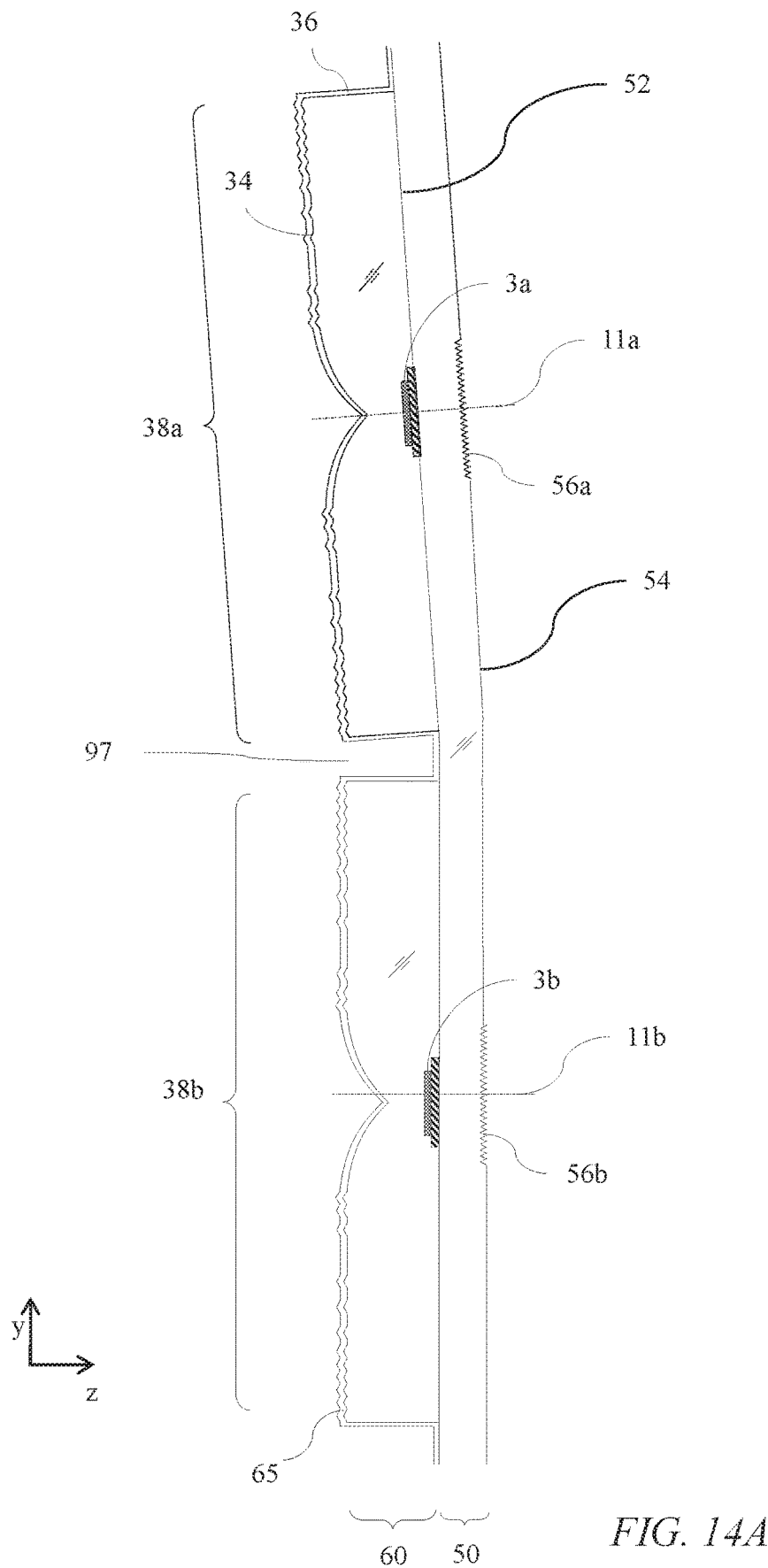
FIG. 14A is a schematic diagram illustrating in top view a catadioptric optical array and plurality of micro-LEDs wherein the reflective input structures do not comprise an integrated body.

FIG. 14A is a schematic diagram illustrating in top view a catadioptric optical array and plurality of micro-LEDs wherein the reflective input structures 60 do not comprise an integrated body. Features of the arrangement of FIG. 14A not discussed in further detail may be assumed to correspond to the features with equivalent reference numerals as discussed above, including any potential variations in the features.

Each catadioptric optical element 38a, 38b is separated from adjacent element 38b by gap 97 that is arranged to provide some mechanical deformation region during flexing of the substrates. Reflective coating 65 is arranged to extend over the outer surface of each element 38 including the reflective sides 36 of each catadioptric optical element 38. In operation, light that is guided within the catadioptric optical array is reflected from the sides 36. Advantageously increased deformation of the catadioptric optical elements may be provided to enable the catadioptric optical array to confirm to a curved shape in at least one dimension. Features of the arrangement of FIG. 14A not discussed in further detail may be assumed to correspond to the features with equivalent reference numerals as discussed above, including any potential variations in the features.

Further in the embodiment of FIG. 14A, the catadioptric optical array 100 is illustrated as comprising input substrate 60 formed on the transparent LED support substrate 50. Advantageously robustness of alignment may be increased.

Figure 14B:
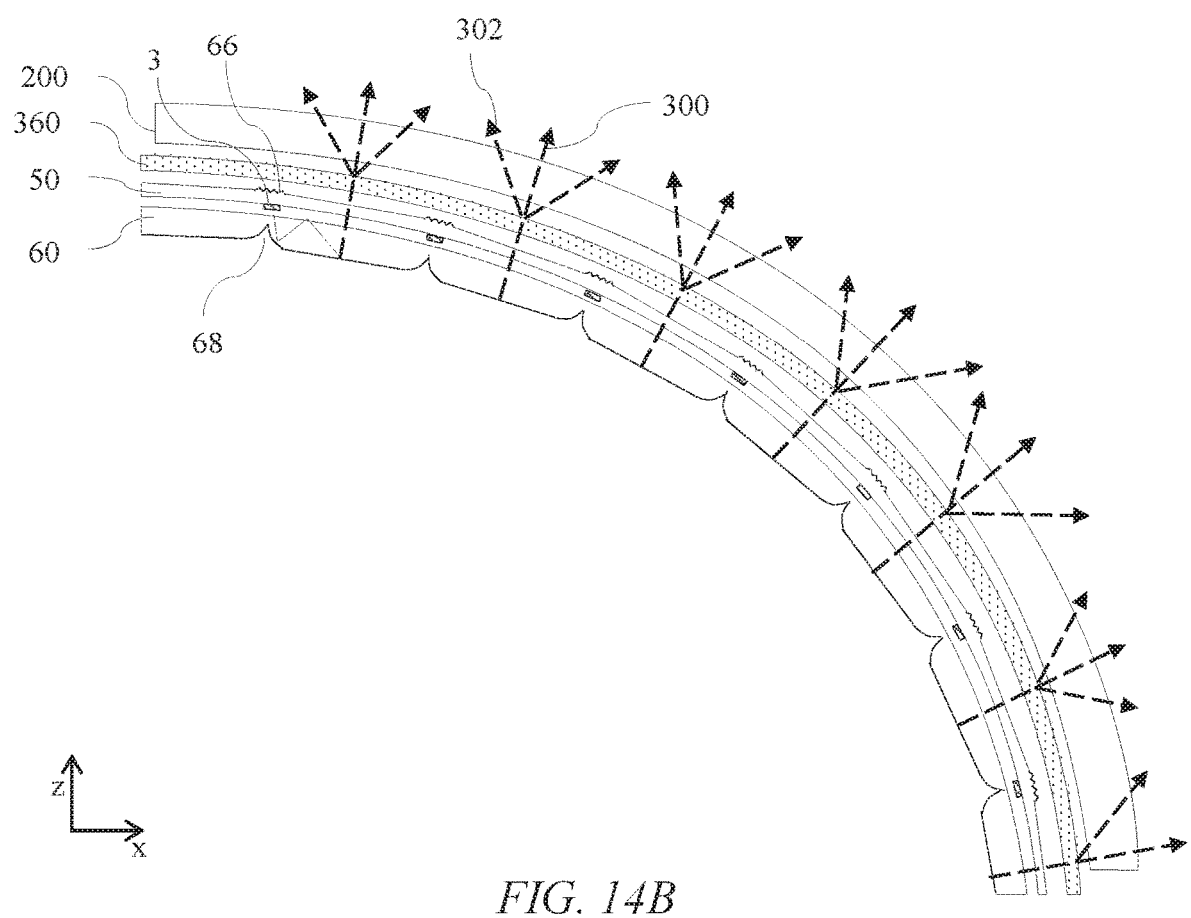
FIG. 14B is a schematic diagram illustrating in top view a curved display comprising a catadioptric backlight and LCD.

FIG. 14B is a schematic diagram illustrating in top view a curved backlight for a curved spatial light modulator 200 such as an LCD comprising flexible substrates. Features of the arrangement of FIG. 14B not discussed in further detail may be assumed to correspond to the features with equivalent reference numerals as discussed above, including any potential variations in the features.

Light rays 300, 302 that are output from the curved display may have an increased cone angle in comparison to that illustrated in FIG. 5C for example, such that the roll off of display brightness across the curved display for an observer in a fixed viewing position is reduced. Increased diffusion may be provided by diffuser 360 and diffusing elements in and on substrate 50. Features of the arrangement of FIG. 14B not discussed in further detail may be assumed to correspond to the features with equivalent reference numerals as discussed above, including any potential variations in the features.

It would be desirable to address an array of micro-LEDs 3 in an efficient way. It would also be desirable to address micro-LEDs 3 with a reduced number of column electrodes 700 and row electrodes 702.

It may be desirable to reduce the complexity of the reflective surface 70.

Figure 15A:
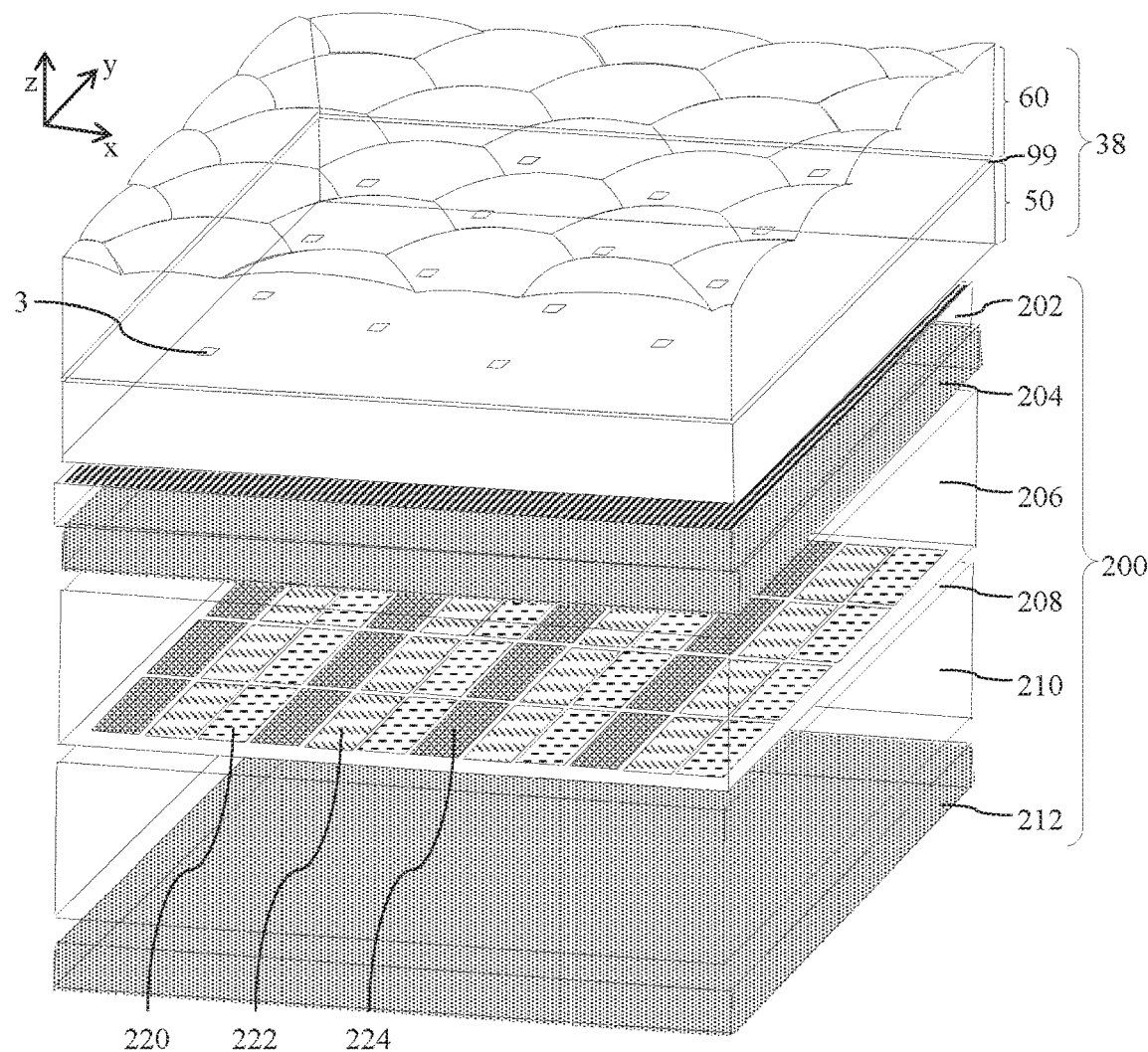
FIG. 15A is a schematic diagram illustrating in side perspective view a display apparatus comprising a backlight comprising a micro-LED and a catadioptric optical element arranged to illuminate an LCD wherein the catadioptric optical element does not comprise regions arranged to provide guiding with the catadioptric optical element.
Figure 15B:
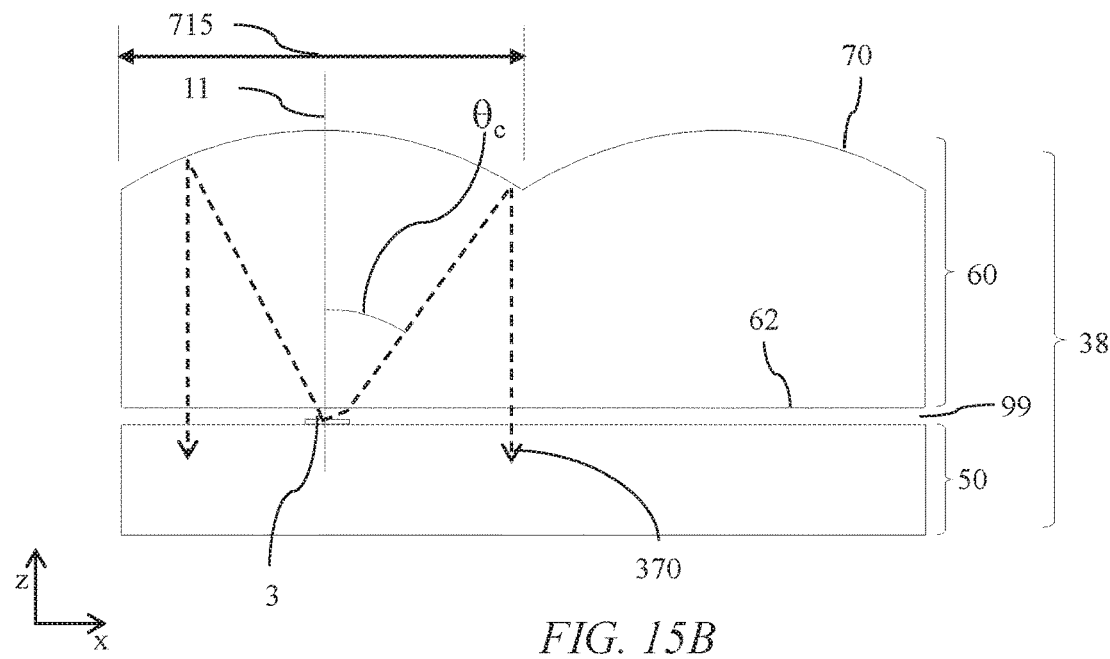
FIG. 15B is a schematic diagram illustrating in side view a catadioptric optical element arranged wherein the catadioptric optical element does not comprise regions arranged to provide guiding with the catadioptric optical element and the micro-LEDs are arranged in alignment with the optical axes.
Figure 15C:
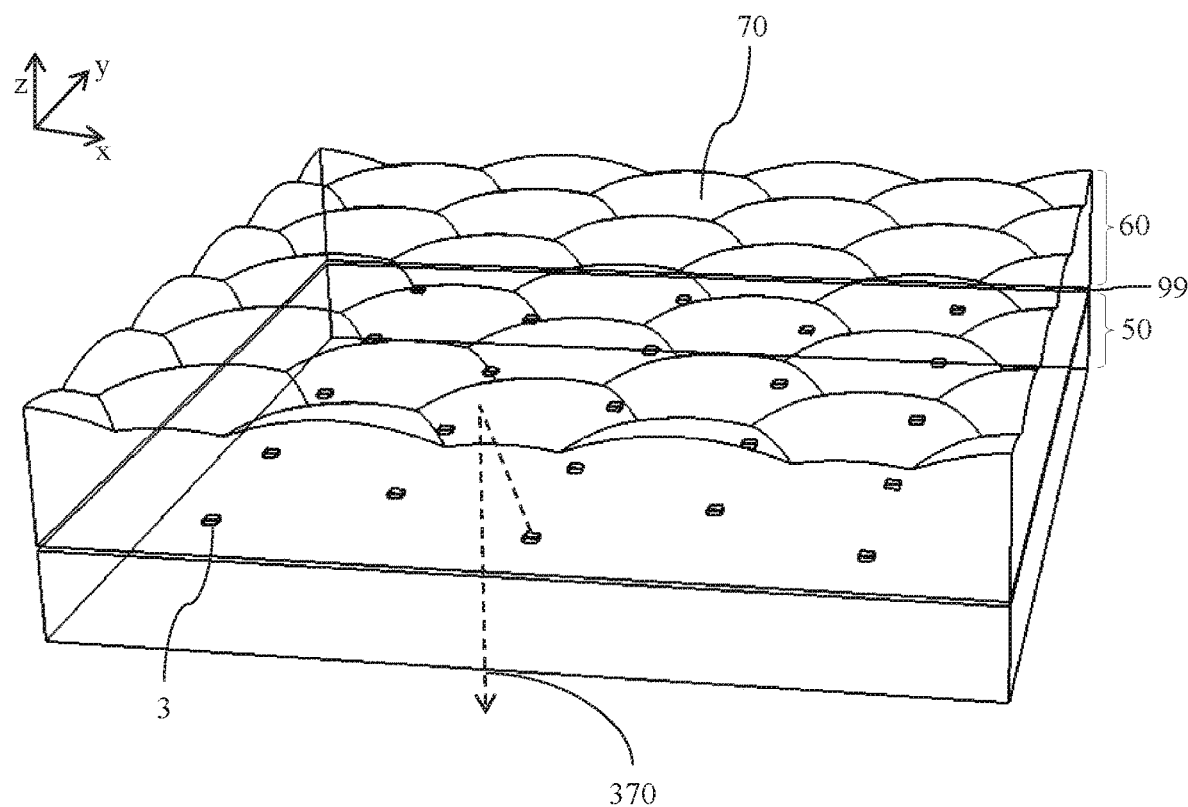
FIG. 15C is a schematic diagram illustrating in side perspective view a two dimensional catadioptric optical element and aligned array of micro-LEDs.

FIG. 15A is a schematic diagram illustrating in side perspective view a display apparatus comprising a backlight comprising a micro-LED 3 and a catadioptric optical element 38 arranged to illuminate an LCD 200 wherein the reflective surface 70 of the catadioptric optical element 38 does not comprise regions 71 arranged to provide guiding with the catadioptric optical element 38; FIG. 15B is a schematic diagram illustrating in side view the catadioptric optical element 38 of FIG. 15A and the micro-LEDs 3 are arranged in alignment with the optical axes 11 of the respective aligned catadioptric optical elements 38; and FIG. 15C is a schematic diagram illustrating in side perspective view a two dimensional catadioptric optical element and aligned array of micro-LEDs.

The surface 70 is arranged to provide output rays 370 with a narrow cone angle. In comparison to the arrangement of FIG. 2 or FIGS. 11D-E, the reflective surface 70 has a simpler non-faceted shape so that advantageously light scatter and tooling complexity and cost may be reduced. Further, the aperture width 715 may be arranged to match the luminance output profile of the light injected at the transmissive input surface 62, that is defined by the critical angle $\theta_c$ in the case of the input refractive surface being planar. As illustrated in FIG. 8, the luminous intensity roll-off at the edge of the reflective aperture is 70% of the peak luminous intensity and desirably a relatively spatially uniform output may be achieved that can be further corrected by means of diffusion in the backlight apparatus including on diffusers attached to the LCD as illustrated elsewhere herein.

Figure 15D:
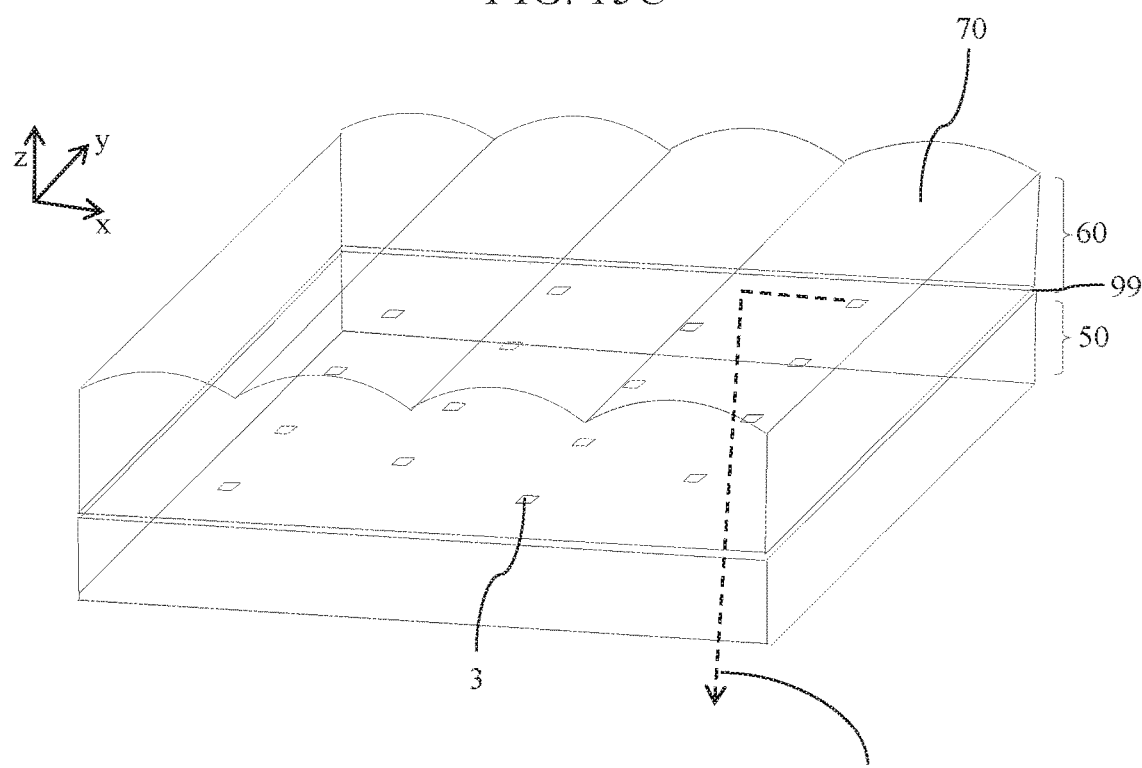
FIG. 15D is a schematic diagram illustrating in side perspective view a one dimensional catadioptric optical element and aligned array of micro-LEDs.

FIG. 15D is a schematic diagram illustrating in side perspective view a one dimensional catadioptric optical element and aligned array of micro-LEDs. In comparison to the arrangement of FIG. 15C, a one dimensional luminance roll-off may be achieved, advantageously increasing uniformity and viewing freedom for display rotations about the x-axis. Further the complexity of tooling may be further reduced.

It may be desirable to provide off-axis viewing of a display operating in privacy mode or with low stray light.

Figure 15E:
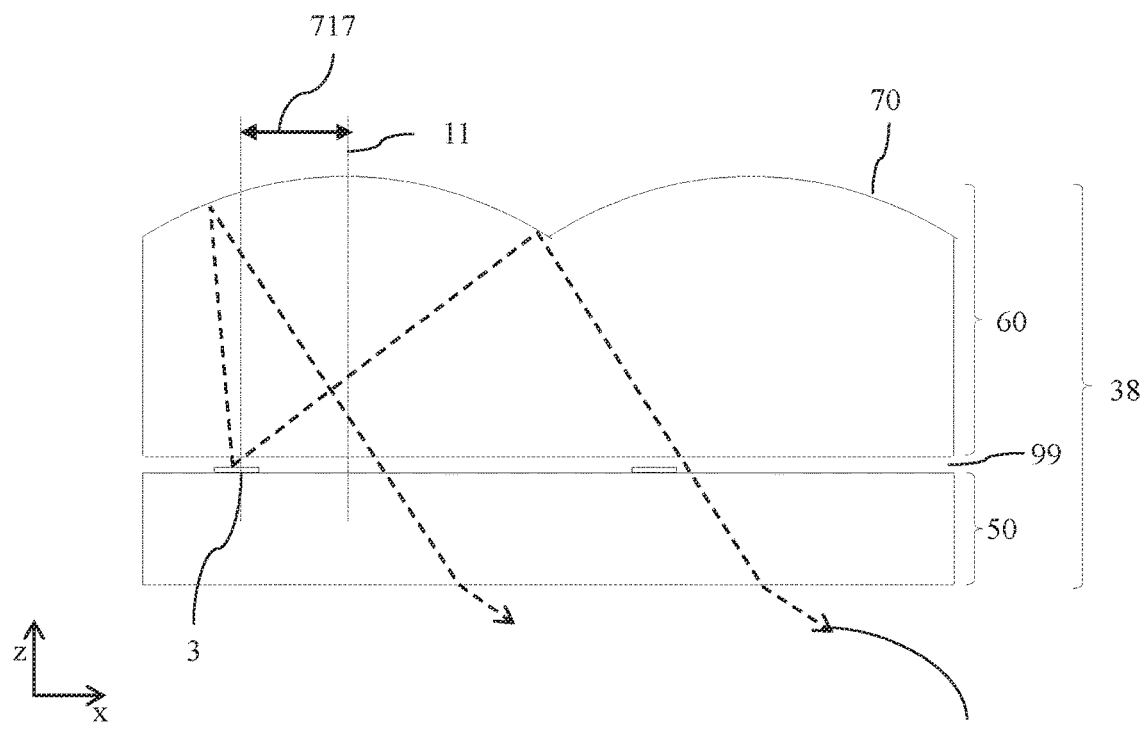
FIG. 15E is a schematic diagram illustrating in side view a catadioptric optical element arranged wherein the micro- LEDs are arranged offset from the optical axes of respective aligned catadioptric optical element.

FIG. 15E is a schematic diagram illustrating in side view a catadioptric optical element arranged wherein the micro-LEDs 3 are arranged offset by distance 717 from the optical axes 11 of respective aligned catadioptric optical element 38. In comparison to the arrangement of FIG. 15B, off-axis illumination of the LCD 200 may be provided. Advantageously a display that is viewable from a limited range of off-axis angles. Such a display may for example provide a centre console display in a vehicle that is only visible for a driver or passenger. Further second plurality of LEDs may be provided (not shown) so that such a display is switched between wide angle and narrow angle modes.

Figure 15F:
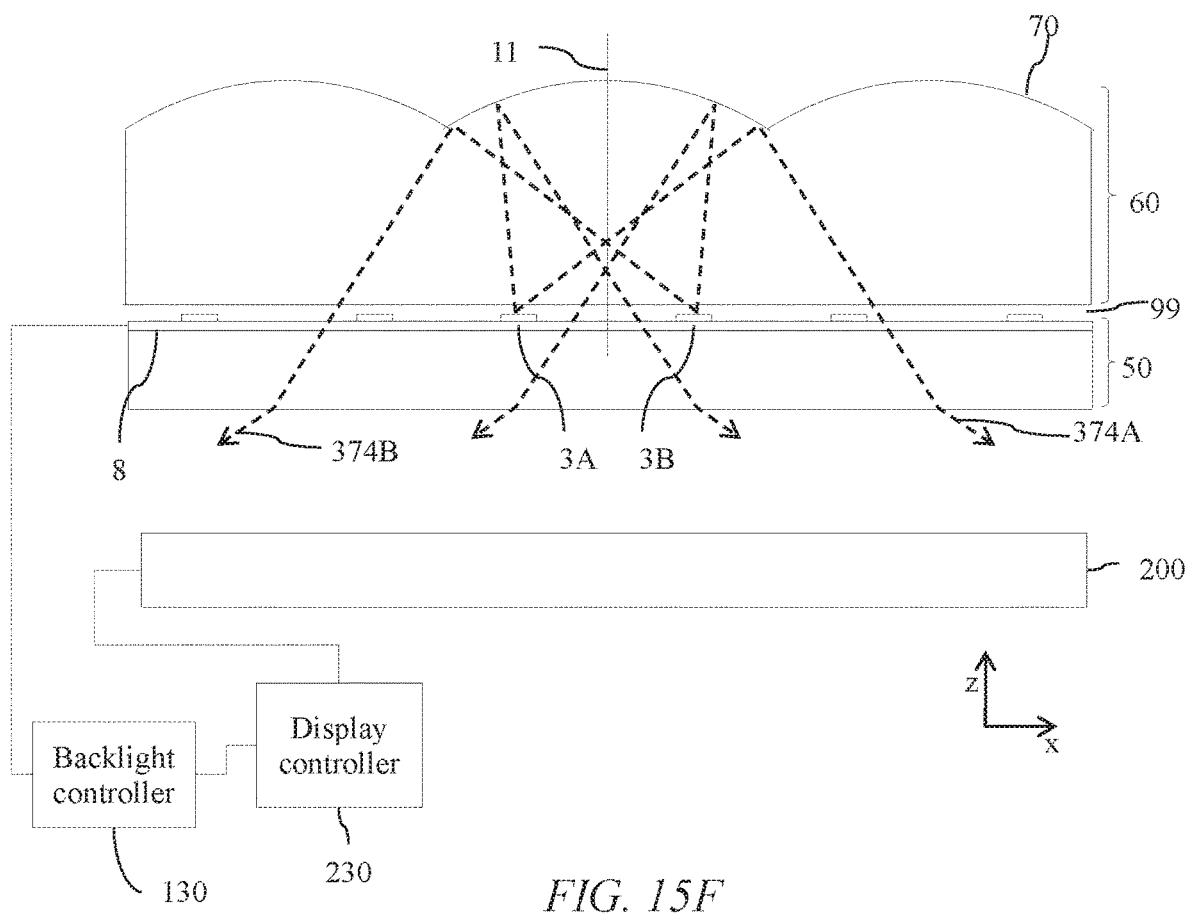
FIG. 15F is a schematic diagram illustrating in side view a catadioptric optical element arranged wherein the catadioptric optical element wherein first and second micro-LEDs are arranged offset from the optical axes of respective aligned catadioptric optical element by first and second distances respectively.

It would be desirable to provide a display that is visible from more than one direction FIG. 15F is a schematic diagram illustrating in side view a catadioptric optical element arranged wherein the catadioptric optical element wherein first and second micro-LEDs are arranged offset from the optical axes of respective aligned catadioptric optical element by first and second distances respectively.

First and second pluralities of LEDs 3A, 3B may be provided where each LED is offset from the optical axis 11 of the respective aligned catadioptric optical element 38. Output rays 374A may be provided in one direction and output rays 374B provided in a different direction. Such a display may provide low stray light images for two users, for example the driver and passenger of a vehicle.

Further the backlight controller 130 and display controller 230 may cooperate to provide a dual view display. In a first phase of operation the LEDs 3A are illuminated and a first image displayed on the LCD 200. In a second phase of operation the LEDs 3B are illuminated and a second image display on the LCD 200. The first and second images may be different. Advantageously a dual view display may be provided.

Figure 15G:
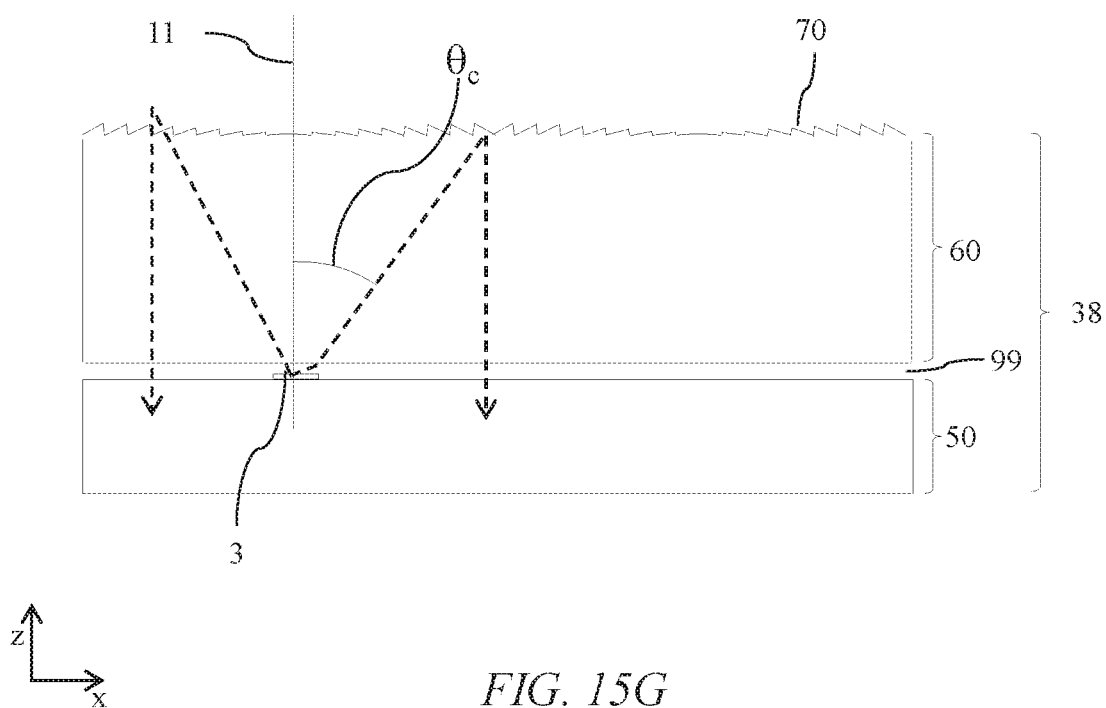
FIG. 15G is a schematic diagram illustrating in side view a catadioptric optical element similar to FIG. 15B wherein the reflective surface is provided by a Fresnel reflector.

FIG. 15G is a schematic diagram illustrating in side view a catadioptric optical element 38 similar to FIG. 15B wherein the reflective surface 70 is provided by a Fresnel reflector. Advantageously thickness is reduced.

Features of the arrangement of FIGS. 15A-G not discussed in further detail may be assumed to correspond to the features with equivalent reference numerals as discussed above, including any potential variations in the features.

Figure 16A:
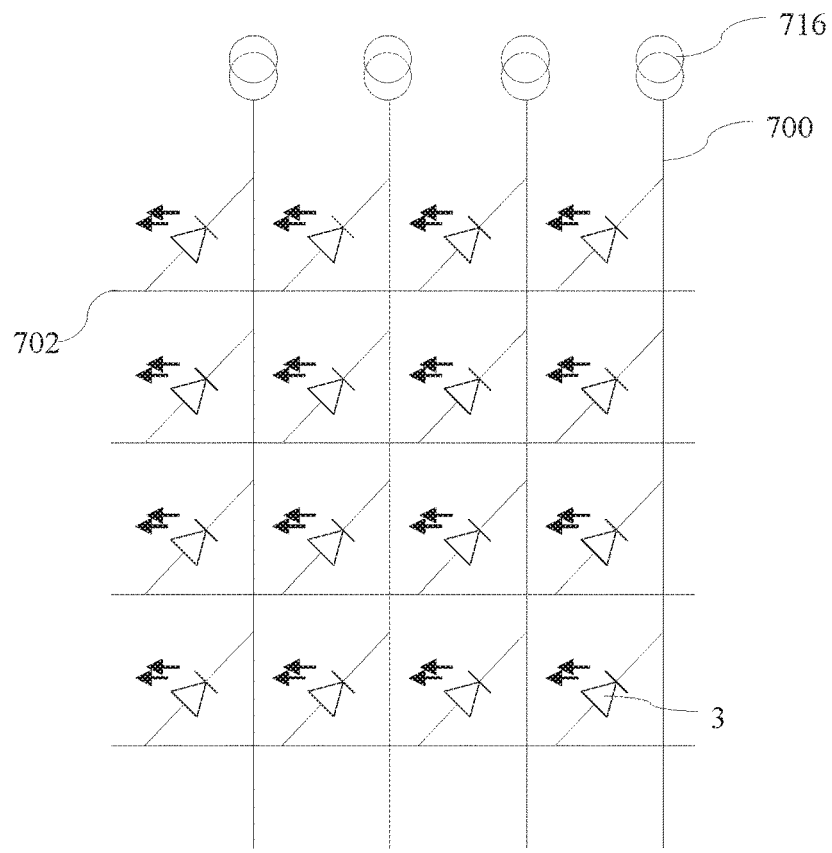
FIGS. 16A-D are schematic diagrams illustrating addressing systems for the plurality of LEDs.

FIG. 16A is a schematic diagram illustrating an addressing system for the plurality of LEDs. The electrodes 7, 8 of FIG. 1 of each of the micro-LEDs 3 of the plurality micro-LEDs 3 are respectively connected to one column addressing electrode 700 and one row addressing electrode 702 to form a matrix. In this embodiment an array of current sources 716 is used to drive the addressing electrodes 700. The voltage on each of the row electrodes 702 is pulsed in sequence to scan or address the array of micro-LEDs 3. A current source 716 may be provided for each column electrode 700 or may be time multiplexed (shared) amongst a set of column electrodes 700. The micro-LEDs 3 have a relatively sharp voltage vs. current curve and can be operated with very short pulses without cross-talk between them. The array of micro-LEDs 3 forms an addressable backlight or a display without the need for additional active components such as TFTs or integrated circuits at each pixel. However, all the energy to illuminate the micro-LEDs must be provided during the addressing pulse. Advantageously the addressing matrix is simple and low cost.

It would be desirable to reduce the peak LED current while maintaining light output levels.

Figure 16B:
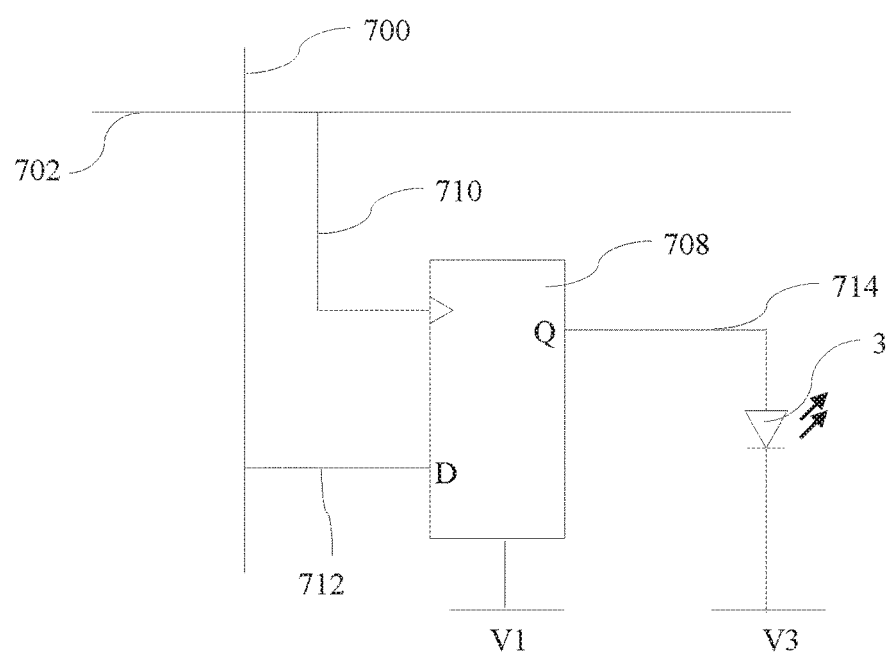

FIG. 16B is a schematic diagram illustrating another addressing embodiment for the plurality of LEDs. The micro-LEDs 3 of the plurality micro-LEDs 3 are addressed by column addressing electrodes 700 and row addressing electrodes 702 to form a one-dimensional or two-dimensional matrix. For clarity only one micro-LED 3 and one column electrode 700 and one row electrode 702 of the matrix is shown. FIG. 16B differs from FIG. 16A in that each micro-LED 3 has associated with it an integrated circuit 708 which includes a storage or memory or latching function. The integrated circuit 708 may be an analog or digital circuit and may be embodied as a separate chip located using a method that is similar to the micro-LED 3 location method or may be embodied with TFTs. The integrated circuit 708 may be provided with one or more additional supply potentials V1, V2 (only V1 shown). The drive circuit 720 shown in FIG. 13B is comprises integrated circuit 708. When the row electrode 702 is pulsed the clock input 710 of integrated circuit 708 stores the column electrode 700 voltage connected to the Data input 712. The output 714 of the integrated circuit 708 drives the micro-LED 3. The other end of the micro-LED is connected to supply potential V3. The integrated circuit 708 may include a voltage to current converter. The potential V3 and the anode and cathode connections of the micro-LED 3 may be configured so that the micro-LED is forward biased and emits light. The integrated circuit 708 provides drive to the micro-LED 3 for longer than the duration of the addressing pulse on row electrode 702 and the peak current drive to the micro-LEDs 3 is reduced. Advantageously the peak current in each micro-LED 3 is reduced.

Figure 16C:
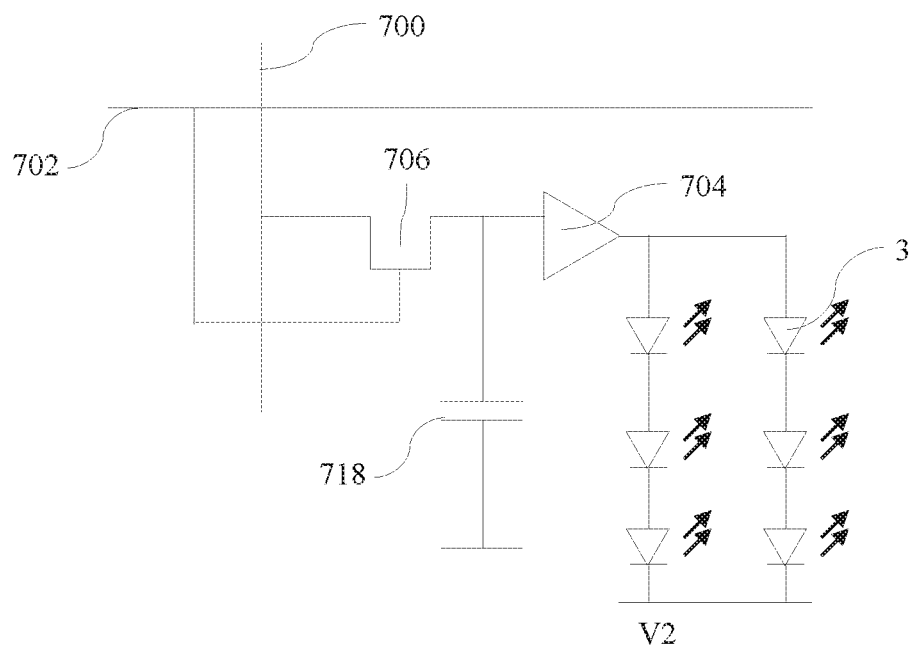

FIG. 16C is a schematic diagram illustrating another addressing embodiment for the plurality of LEDs. The micro-LEDs 3 of the plurality micro-LEDs 3 are addressed by column addressing electrodes 700 and row addressing electrodes 702 to form a 1-dimensional or 2-dimensional matrix or array. Drive circuit 720 illustrated FIG. 13B comprises TFT 706, amplifier 704 and capacitor 718. In this embodiment row electrodes 702 is connected to the gate of TFT 706 and when the row addressing electrode 702 is pulsed, the data from column addressing electrode 700 is stored on capacitor 718. Capacitor 718 may be small compared to that typically used in a matrix to drive an LCD panel and may be provided by the input capacitance of amplifier 704. The amplifier 704 may drive one or more micro-LEDs 3. Amplifier 704 may be provided with 1 or more supply voltages (not shown). Amplifier 704 may include a voltage to current converter circuit. Amplifier 704 may drive one or more strings of one or more micro-LEDs 3. In this example embodiment two strings of 3 micro-LEDs 3 are illustrated. The other end of the strings of micro-LEDs 3 is connected to potential V2, and the voltage output from amplifier 704 must be greater than voltage V2 by the combined forward voltage drop (Vf) of the string of micro-LEDs 3 in order for the micro-LEDs 3 to illuminate.

It would be desirable to provide some resilience of the display or backlight to failure of individual micro-LEDs 3. The failure may be an open circuit which may be caused for example by mis-placement of micro-LEDs 3 in manufacture or may be a short circuit for example from damaged electrode wiring.

Figure 16D:
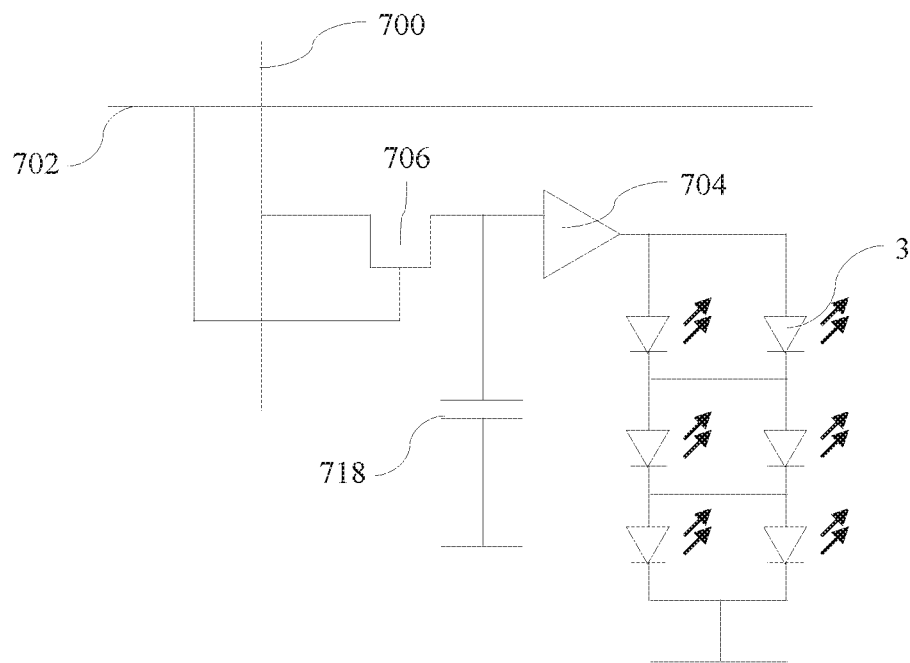

FIG. 16D is a schematic diagram illustrating another addressing embodiment for the plurality of LEDs. The micro-LEDs 3 of the plurality micro-LEDs 3 are addressed by column addressing electrodes 700 and row addressing electrodes 702 in a one-dimensional or two-dimensional matrix. In this embodiment the micro-LEDs 3 are arranged in bridged strings. This configuration provides some immunity to individual micro-LED 3 being open circuit or short circuit. Advantageously the display or backlight can be fault tolerant and more reliable.

Features of the arrangements of FIGS. 16A-D not discussed in further detail may be assumed to correspond to the features with equivalent reference numerals as discussed above, including any potential variations in the features.

It would be desirable to provide a large size display with precise and uniform alignment of micro-LEDs 3 to the optical axes of catadioptric optical elements 38 to achieve uniform output spatial and directional luminous intensity directional distribution. A method to form an illumination apparatus will now be further described.

Figure 17A:
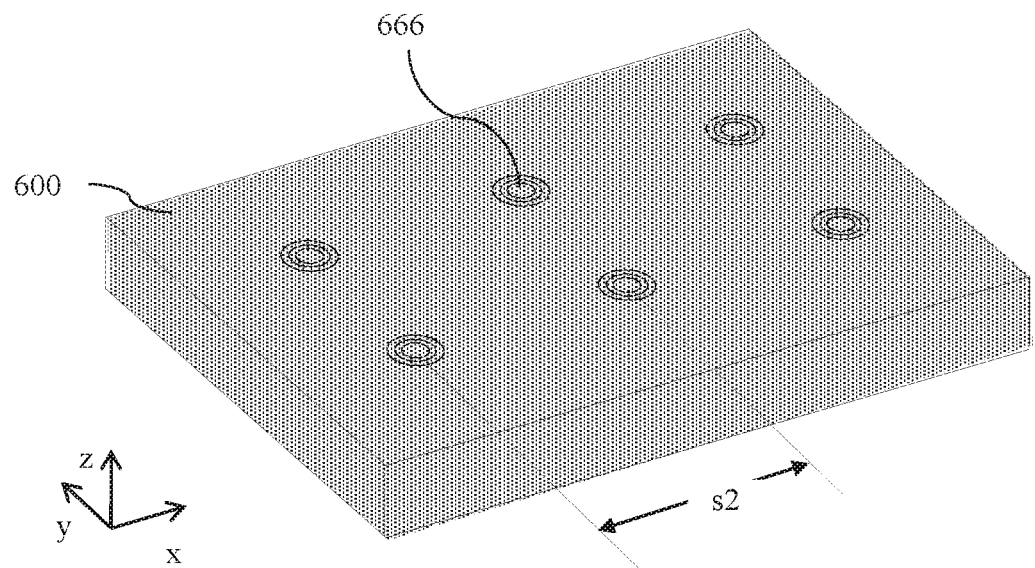
FIG. 17A is a schematic diagram illustrating in side perspective view a tool for forming a plurality of refractive light input structures.

A shaped tool 600 may be provided as shown in FIG. 17A which is a schematic diagram illustrating in side perspective view a tool 600 with features 666 that have separation s2 in at least a first direction for forming a plurality of refractive light input structures 66.

Figure 17B:
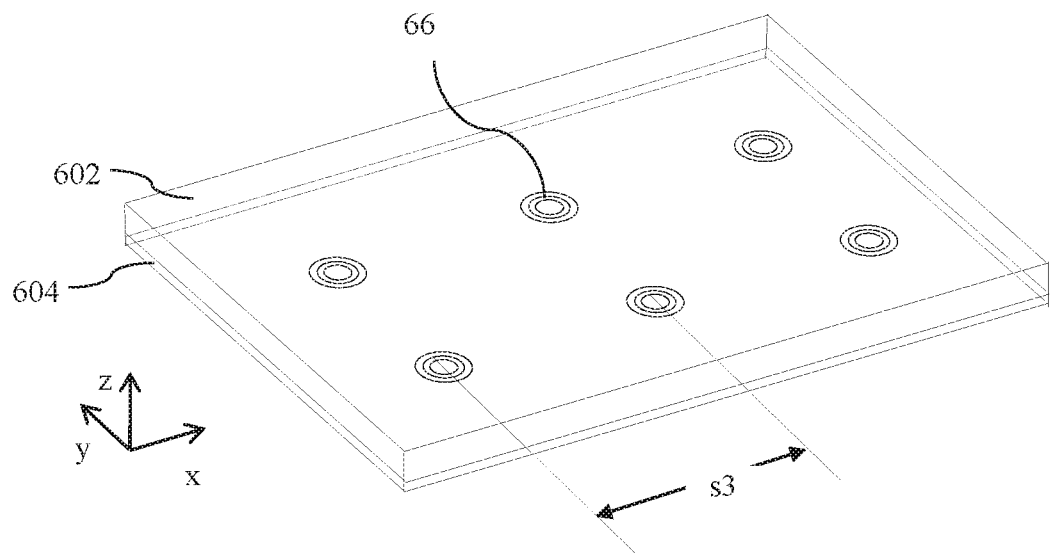
FIG. 17B is a schematic diagram illustrating in side perspective view an input substrate comprising a plurality of refractive light input structures.

In a first step an input substrate 602 is provided as shown in FIG. 17B which is a schematic diagram illustrating in side perspective view an input substrate comprising a plurality of refractive light input structures. In the second step the tool 600 may be arranged to provide the refractive light input structures 66 on a side of a transparent substrate 602 in a curable layer 604 of transparent material, such as a UV cast acrylate material. The structures 66 may be provided by other known replication methods such as injection moulding or hot embossing. The separation of the features s3 in the at least first direction may be the same as the separation s2, or may have a calibrated adjustment to take into account differences in thermal expansion of the materials of the tool and substrate 602 during replication.

Figure 17C:
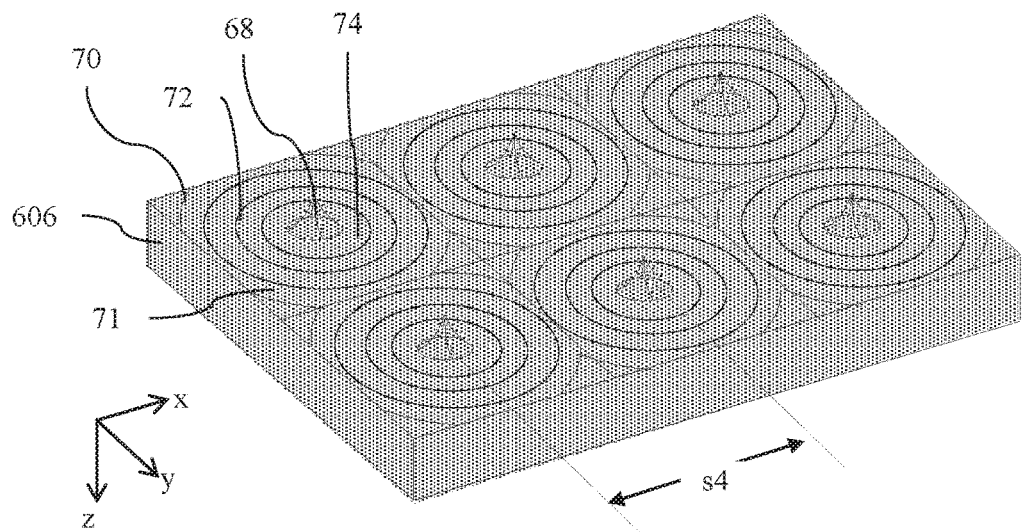
FIG. 17C is a schematic diagram illustrating in side perspective view a tool for forming a plurality of reflective light input structures.

A shaped tool 606 may be provided as shown in FIG. 17C which is a schematic diagram illustrating in side perspective view a tool 606 for forming a plurality of reflective light input structures 68, 70, 71, 72, 74 with separation s4 in the at least first direction.

Figure 17D:
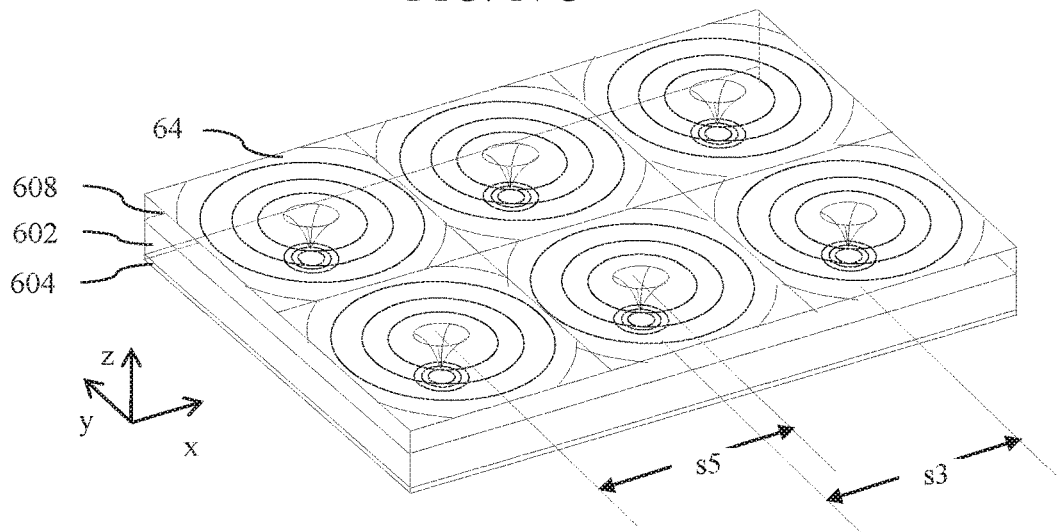
FIG. 17D is a schematic diagram illustrating in side perspective view an input substrate comprising a plurality of refractive light input structures and a reflective surface comprising a plurality reflective structures.

In a second step a reflective surface 64 is provided as shown in FIG. 17D which is a schematic diagram illustrating in side perspective view an input substrate comprising a plurality of refractive light input structures 66 and a reflective surface 64 comprising a plurality reflective structures 68, 70, 71, 72, 74. The reflective surface may be provided by UV casting onto layer 608. Alternatively, the first and second steps may be combined in a single process, in which the tools 600, 606 are aligned prior to the replication process. The plurality of reflective structures each arranged as an array with a separation s5 in the at least first direction and are aligned to the input refractive structures 66. The separation s5 is arranged to be the same as separation s3.

Figure 17E:
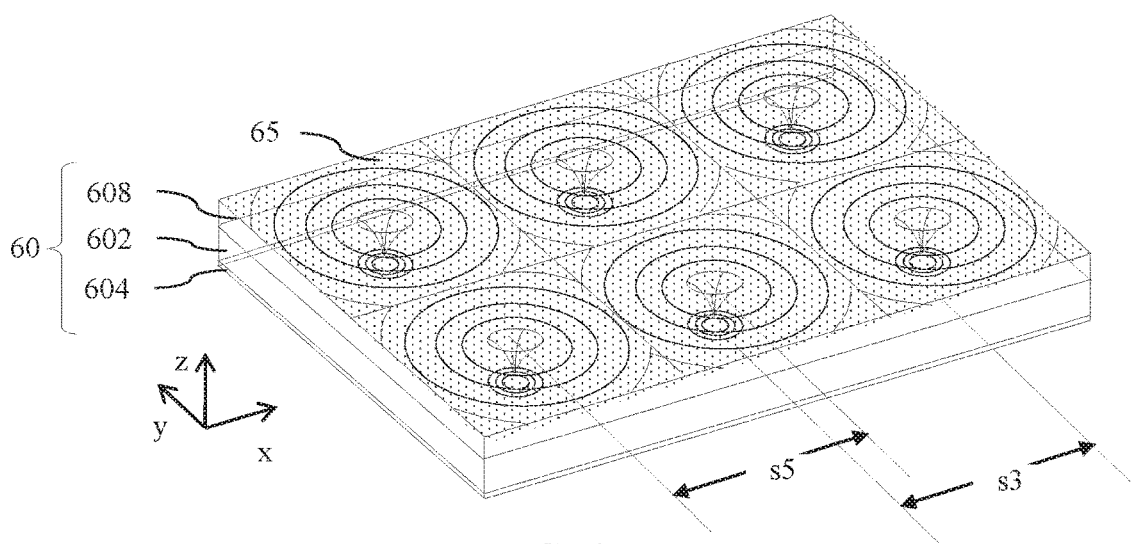
FIG. 17E is a schematic diagram illustrating in side perspective view a coated input substrate.

In a third step a reflective coating 65 is provided as shown in FIG. 17E which is a schematic diagram illustrating in side perspective view a coated input substrate 60.

Features of the arrangements of FIGS. 17A-E not discussed in further detail may be assumed to correspond to the features with equivalent reference numerals as discussed above, including any potential variations in the features.

Figure 18A:
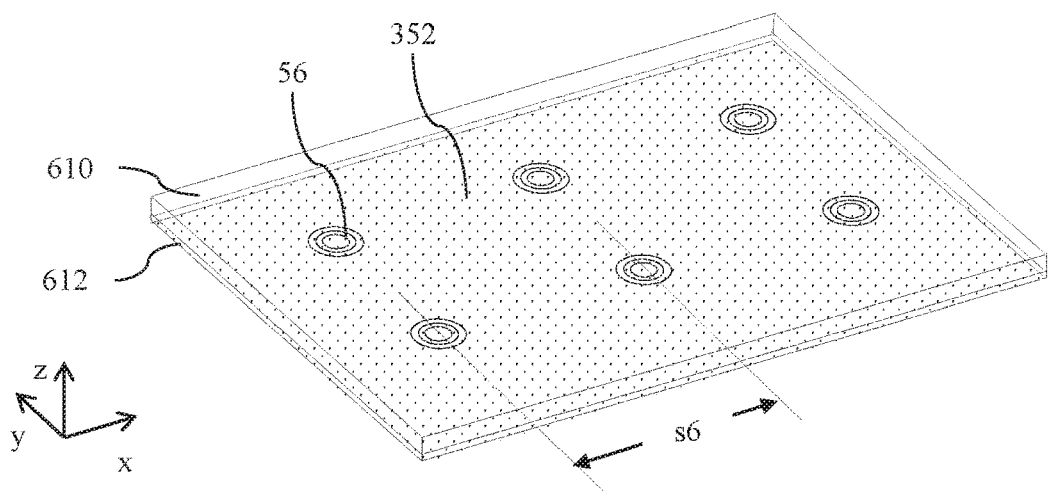
FIG. 18A is a schematic diagram illustrating in side perspective view an LED support substrate comprising a plurality of refractive light output structures and a diffusing surface.

In a fourth step a refractive light output structure 56 is provided on a substrate 610 as shown in FIG. 18A which is a schematic diagram illustrating in side perspective view part of an LED support substrate 50 comprising a plurality of refractive light output structures 56 and a diffusing structure 352 formed in layer 612 on substrate 610 for example by UV casting. Alternatively, the structures 56, 352 may be formed by moulding and are formed in the same material as the substrate 610. Separation s6 is arranged to be the same as separation s5.

Figure 18B:
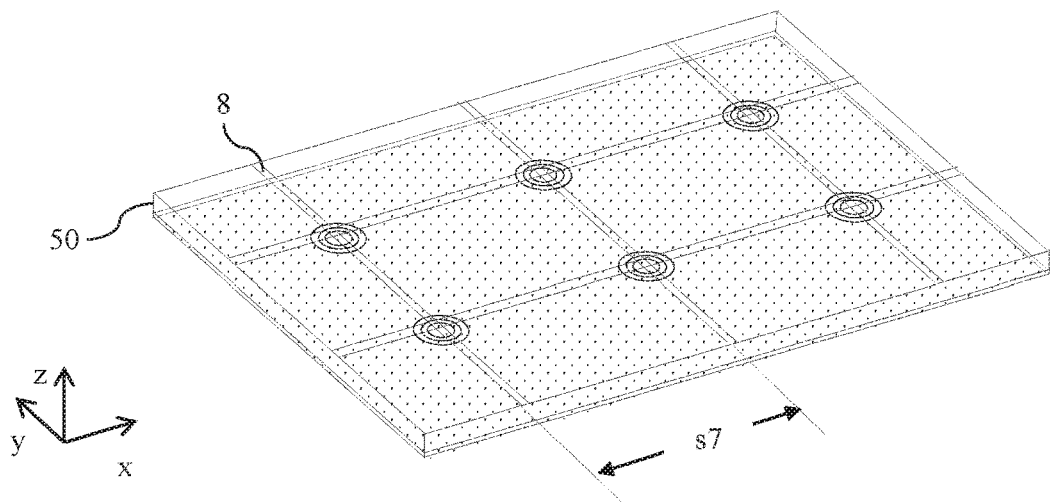
FIG. 18B is a schematic diagram illustrating in side perspective view an LED support substrate further comprising a plurality of addressing electrodes.

In a fifth step an addressing electrode array may be provided as shown in FIG. 18B which is a schematic diagram illustrating in side perspective view an LED support substrate 50 further comprising a plurality of addressing electrodes 8. Electrodes 8 may be formed by lithography, mask deposition, printing or other known methods with separation s7 in the at least first direction that is substantially the same as the separation s5.

Figure 18C:
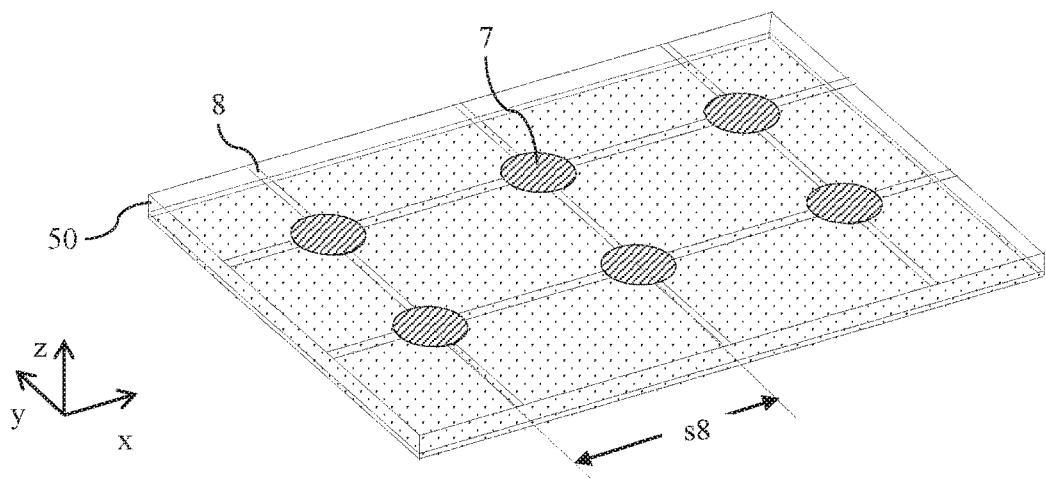
FIG. 18C is a schematic diagram illustrating in side perspective view an LED support substrate further comprising a plurality of opaque mask regions.

In a sixth step, opaque mask regions 7 may be provided as shown in FIG. 18C which is a schematic diagram illustrating in side perspective view an LED support substrate further comprising a plurality of opaque mask regions 7. Mask regions 7 may be electrodes or may be dielectric materials that are formed between the electrodes 8 and substrate 610 and may have separation s7 that is the same as separation s5 in the at least first direction.

Features of the arrangements of FIG. 18A-C not discussed in further detail may be assumed to correspond to the features with equivalent reference numerals as discussed above, including any potential variations in the features.

Figure 19A:
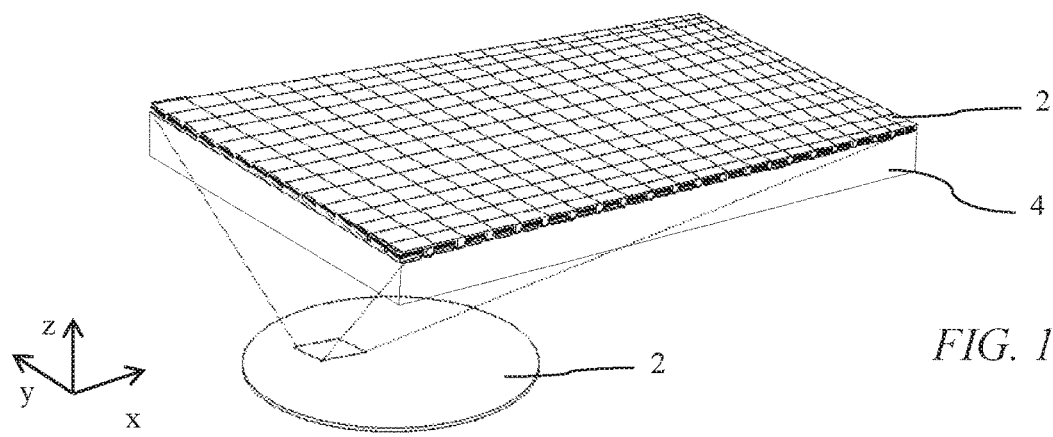
FIG. 19A is a schematic diagram illustrating in side perspective view a monolithic LED wafer.

In a seventh step a monolithic semiconductor wafer 2 may be provided as shown in FIG. 19A which is a schematic diagram illustrating in side perspective view a monolithic LED wafer 2. For example, the monolithic wafer 2 may comprise multiple doped gallium nitride layers and may be formed on a substrate 4 that may be sapphire, silicon carbide or silicon for example.

Figure 19B:
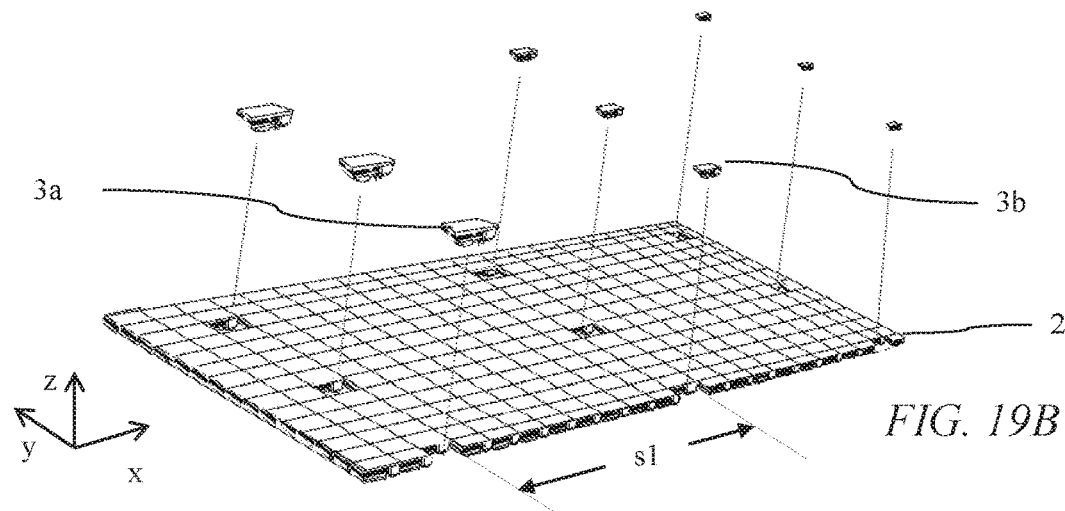
FIG. 19B is a schematic diagram illustrating in side perspective view extraction of a sparse array of micro-LEDs from a monolithic LED wafer.

In an eighth step a non-monolithic array of micro-LEDs 3a. 3b may be extracted from the monolithic wafer 2 as shown in FIG. 19B which is a schematic diagram illustrating in side perspective view extraction of a sparse array of micro-LEDs from a monolithic LED wafer 2 to provide micro-LEDs 3a, 3b with separation s1 in the at least first direction.

Figure 19C:
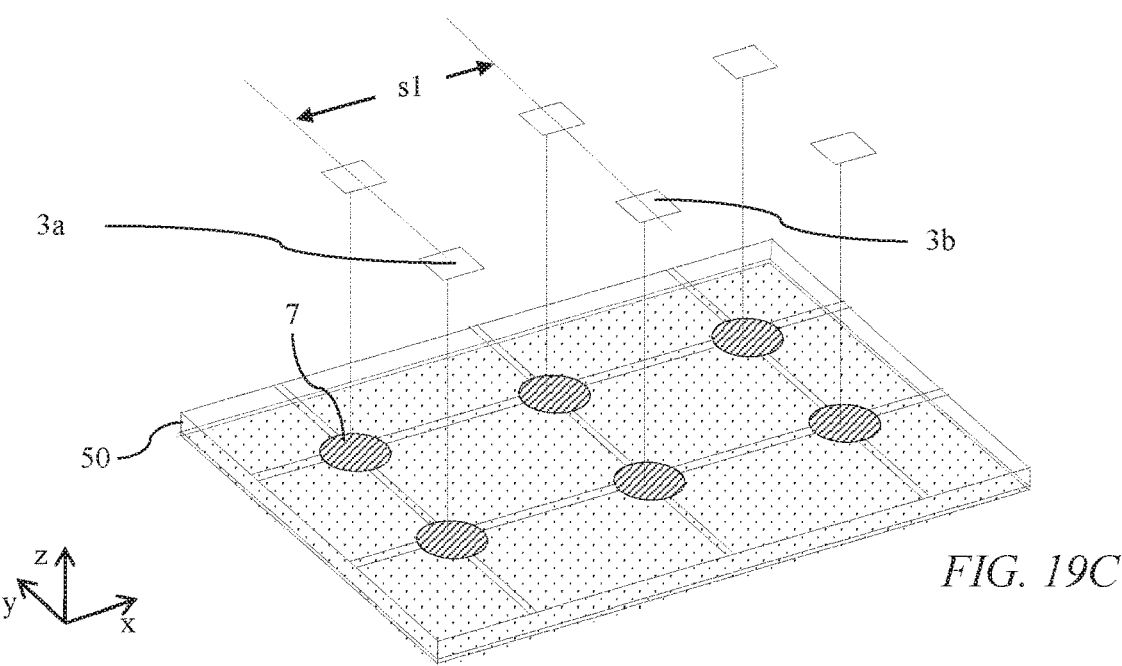
FIG. 19C is a schematic diagram illustrating in side perspective view placement of the sparse array of micro-LEDs from a monolithic LED wafer of FIG. 19A onto the LED support substrate of FIG. 18C.

In a ninth step the non-monolithic array of micro-LEDs 3a, 3b may be transferred onto the transparent LED support substrate 50 as shown in FIG. 19C which is a schematic diagram illustrating in side perspective view placement of the sparse array of micro-LEDs 3a, 3b from a monolithic LED wafer 2 of FIG. 19A onto the LED support substrate of FIG. 18C. Features of the arrangements of FIGS. 19A-C not discussed in further detail may be assumed to correspond to the features with equivalent reference numerals as discussed above, including any potential variations in the features.

Micro-LEDs 3a, 3b may be arranged on substrate 52 in alignment with electrodes 8 and refractive light output structure 66. The LED support substrate 50 may already be provided with drive circuit 720 comprising for example TFT 706 and/or integrated circuit 708 as described with reference to FIGS. 16A-D.

The LEDs of the plurality of LEDs are thus from a monolithic wafer 4 arranged in an array with their original monolithic wafer positions and orientations relative to each other preserved; and wherein in at least one direction, for at least one pair of the plurality of LEDs in the at least one direction, for each respective pair there was at least one respective LED in the monolithic wafer 4 that was positioned in the monolithic wafer 4 between the pair of LEDs in the at least one direction and that is not positioned between them in the array of LEDs 3.

In a tenth step, further layers (not shown) including addressing electrodes, wavelength conversion layers and optical bonding layers may be provided on the micro-LEDs 3 and the first surface of the transmissive LED support substrate 50. Further electrodes may alternatively or additionally be provided on the catadioptric input substrate 60 as described in WO2012052722, incorporated herein in its entirety by reference.

Figure 20:
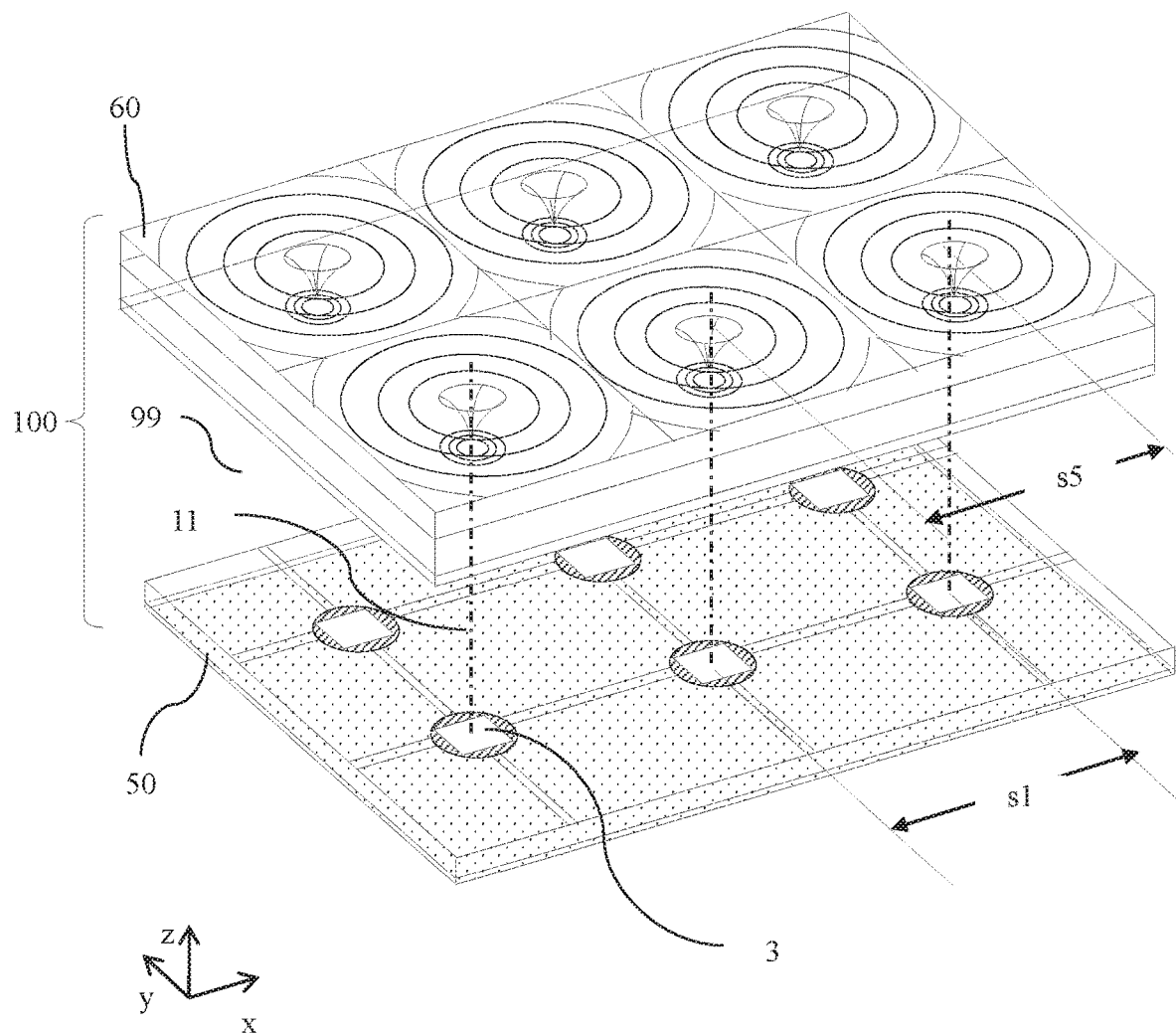
FIG. 20 is a schematic diagram illustrating in side perspective view assembly of a backlight comprising an input substrate and LED support substrate, in accordance with the present disclosure.

In an eleventh step an illumination apparatus may be provided as shown in FIG. 20 which is a schematic diagram illustrating in side perspective view assembly of a backlight 100 comprising an input substrate 60 and transparent LED support substrate 50. Features of the arrangement of FIG. 20 not discussed in further detail may be assumed to correspond to the features with equivalent reference numerals as discussed above, including any potential variations in the features.

The substrate 50 may be aligned with the plurality of catadioptric optical elements 38 with separations s5 to provide an illumination apparatus, such that separation s5 may be the same as separation s1. Optical bonding such as optically clear adhesives may be used to provide attachment between the two substrates 50, 60 to advantageously provide increased robustness of alignment. Advantageously large numbers of elements may be formed over large areas using small numbers of extraction steps, while preserving alignment to a respective array of optical elements. Alignment of micro-LEDs 3 to catadioptric optical elements is described further in WO2010038025, incorporated herein in its entirety by reference.

Further for the present disclosure, micro-LEDs are unpackaged LED die chips, and are not packaged LEDs. Advantageously individual wire bonding to LEDs is not used and the number of pick and place processes is significantly reduced.

The invention claimed is:

1. An illumination apparatus comprising:
a plurality of LEDs arranged in an LED array, wherein the plurality of LEDs are micro-LEDs or mini-LEDs, each of the plurality of LEDs being arranged to output light having a respective light output distribution; and
a plurality of catadioptric optical elements arranged in a catadioptric optical array, each catadioptric optical element comprising a reflective surface and a transmissive surface facing the reflective surface, wherein:
for each catadioptric optical element, the reflective surface is arranged to receive light output from one or more of the LEDs through the transmissive surface and to reflect the received light back through the transmissive surface, thereby to provide re-directed light having a respective light output distribution,
wherein the light output distribution of the re-directed light provided by each catadioptric optical element has a luminous intensity half maximum solid angle that is smaller than the luminous intensity half maximum solid angle of the light output distribution of the light output by each of the plurality of LEDs.

2. An illumination apparatus according to claim 1 wherein at least some of the light from the plurality of LEDs is guided, at least in part via total internal reflection, within the catadioptric optical array.

3. An illumination apparatus according to claim 1 wherein each of the plurality of LEDs is arranged on a first surface of at least one transmissive LED support substrate; and a transmissive output surface is provided by a second surface of the transmissive LED support substrate; wherein the second surface of the transmissive LED support substrate faces the first surface of the transmissive LED support substrate.

4. An illumination apparatus according to claim 3 wherein the reflective surface of each catadioptric optical element is arranged on a first surface of an input substrate, and a second surface of the input substrate facing the reflective surface comprises a transmissive input surface;
wherein the first surface of the transmissive LED support substrate faces the transmissive input surface.

5. An illumination apparatus according to claim 4 wherein at least some of the light from the plurality of LEDs is guided, at least in part via total internal reflection, within the catadioptric optical array, and wherein the light from the plurality of LEDs that is guided within the catadioptric optical array is guided, at least in part via total internal reflection, between the reflective surface and the transmissive input surface.

6. An illumination apparatus according to claim 3, wherein a transparent material is provided between the first surface of the transmissive LED support substrate and the transmissive surface of the catadioptric optical element; and the light from the plurality of LEDs that is guided within the catadioptric optical array is guided between the reflective surface and the second surface of the transmissive LED support substrate.

7. An illumination apparatus according to claim 6, wherein the transparent material is air.

8. An illumination apparatus according to claim 4, wherein a transparent material with a lower refractive index than a material from which the input substrate is made is arranged between the plurality of LEDs and the transmissive surfaces of the catadioptric optical elements.

9. An illumination apparatus according to claim 3, further comprising diffuser structures arranged on at least one surface of the transmissive LED support substrate.

10. An illumination apparatus according to claim 4, wherein for each catadioptric optical element the transmissive surface of the input substrate further comprises a refractive light input structure aligned in correspondence with a respective optical axis of the catadioptric optical element; wherein each refractive light input structure is arranged between the transmissive input surface and the reflective surface of the input substrate.

11. An illumination apparatus according to claim 10 wherein in at least one catadioptric cross-sectional plane through its optical axis the refractive light input structure comprises a plurality of pairs of oppositely inclined refractive input facets.

12. An illumination apparatus according to claim 11 wherein in at least one catadioptric cross-sectional plane the plurality of pairs of inclined input facets are inclined at equal and opposite inclination angles;
and in the plane of the catadioptric optical array the plurality of pairs of inclined refractive input facets are circularly or elliptically symmetric.

13. An illumination apparatus according to claim 10, wherein the transmissive surface of the input substrate comprises planar regions between the refractive light input structures.

14. An illumination apparatus according to claim 1, wherein each catadioptric optical element comprises an optical axis.

15. An illumination apparatus according to claim 14 wherein each optical axis is aligned in correspondence with a respective one or more of the LEDs, and each of the LEDs is aligned in correspondence with the optical axis of only one of the catadioptric optical elements.

16. An illumination apparatus according to claim 15 further comprising a further plurality of LEDs arranged in an LED array, wherein the further plurality of LEDs are micro-LEDs or mini-LEDs, and each optical axis is offset from one or more of the LEDs of the further plurality of LEDs, and each of the LEDs of the further plurality of LEDs is offset from the optical axis of at least one of the catadioptric optical elements.

17. An illumination apparatus according to claim 16, wherein:
for each catadioptric optical element, the reflective surface is arranged to receive light output from one or more of the further plurality of LEDs through the transmissive surface and to reflect the received light back through the transmissive surface, thereby to provide re-directed light having a respective light output distribution, and
the light output distribution of the re-directed light provided by each catadioptric optical element using light output from the further plurality of LEDs has a luminous intensity half maximum solid angle that is greater than the luminous intensity half maximum solid angle of the re-directed light provided by each catadioptric optical element using light output from the plurality of LEDs.

18. An illumination apparatus according to claim 14, wherein for each catadioptric optical element of the catadioptric optical array, the transmissive surface comprises at least one refractive light output structure arranged on the transmissive surface and aligned in correspondence with the optical axis of the catadioptric optical element.

19. An illumination apparatus according to claim 14, wherein the input substrate is formed as an integrated body that extends between the optical axes of the plurality of catadioptric optical elements.

20. An illumination apparatus according to claim 14, wherein the LED support substrate is formed as an integrated body that extends between the optical axes of the plurality of catadioptric optical elements.

21. An illumination apparatus according to claim 1, wherein the reflective surface of the catadioptric optical array comprises a reflective layer formed on the reflective surface.

22. An illumination apparatus according to claim 21 wherein the reflective layer comprises a metal material.

23. An illumination apparatus according to claim 21 wherein the reflective layer extends to cover the reflective surface of the catadioptric optical array.

24. An illumination apparatus according to claim 1, wherein the reflective surface of each catadioptric optical element comprises a plurality of light reflecting facets.

25. An illumination apparatus according to claim 1, wherein the reflective surface of each catadioptric optical element comprises a reflective light input structure that is arranged between the reflective surface and the transmissive input surface of the input substrate;
    wherein in at least one catadioptric cross-sectional plane through its optical axis the reflective light input structure comprises a first inner surface and a second inner surface facing the first inner surface;
    wherein for each catadioptric optical element of the catadioptric optical array, the refractive light input structure and reflective light input structure are arranged to direct at least some light from the respective aligned at least one LED to be the light that is guided within the catadioptric optical array.

26. An illumination apparatus according to claim 25 wherein in at least one catadioptric cross-sectional plane through its optical axis the first and second inner surfaces comprise curved reflective surfaces.

27. An illumination apparatus according to claim 1, wherein in at least one catadioptric cross-sectional plane through its optical axis the light reflecting facets of the reflective surface are provided by pairs of inclined facets that are inclined with opposing inclination angles.

28. An illumination apparatus according to claim 1, wherein the reflective surface comprises reflective planar regions between at least some of the light reflecting facets of the reflective surface.

29. An illumination apparatus according to claim 1, wherein some of the light reflecting facets of the reflective surface are arranged to direct at least some light through the transmissive output surface of the catadioptric optical element in a direction substantially normal to the transmissive output surface.

30. An illumination apparatus according to claim 1, wherein in the plane of the catadioptric array the light reflecting facets are circularly or elliptically symmetric about the optical axis of each catadioptric optical element.

31. An illumination apparatus according to claim 1, wherein the plurality of light reflecting facets of each catadioptric optical element are concentric with the optical axis of said catadioptric optical element.

32. An illumination apparatus according to claim 1, wherein in at least one catadioptric cross-sectional plane through its optical axis the light reflecting facets of a catadioptric optical element are arranged with a separation that decreases with distance from the optical axis of the catadioptric element.

33. An illumination apparatus according to claim 1, wherein for each catadioptric optical element the length of the light reflecting facets increases with distance from the optical axis of the respective catadioptric optical element.

34. An illumination apparatus according to claim 1, wherein for each catadioptric optical element the total area of the light reflecting facets increases with the distance from the optical axis of the respective catadioptric optical element.

35. An illumination apparatus according to claim 1, wherein for each catadioptric optical element, the total area of the at least one light reflecting facet at a distance, r from the optical axis is proportional to the distance, r.

36. An illumination apparatus according to claim 1, wherein some of the light reflecting facets arranged on the reflective surface of the catadioptric optical element are arranged to direct light that has not guided within the catadioptric optical array.

37. An illumination apparatus according to claim 36, wherein the angular light output distribution of light from the refractive light output structure is substantially the same as the angular light output distribution of light from the plurality of reflective light reflecting facets that is transmitted through regions of the transmissive output substrate that do not comprise a refractive light output structure.

38. An illumination apparatus according to claim 1, comprising a plurality of opaque mask regions wherein the first surface of the transmissive LED support substrate for each catadioptric optical element comprises an opaque mask region that is aligned with an optical axis of the catadioptric optical element;
    wherein a respective one or more of the LEDs of the plurality of LEDs is arranged between the mask region and the reflective surface; and
    wherein the opaque mask region is provided between the refractive light output structure and the respective one or more of the LEDs of the plurality of LEDs.

39. An illumination apparatus according to claim 38 wherein the plurality of opaque mask regions is provided by LED addressing electrodes.

40. An illumination apparatus according to claim 1, wherein some light reflecting facets of the reflective surface of the respective catadioptric optical element are arranged to direct light to the refractive light output structure.

41. An illumination apparatus according to claim 1, wherein in at least one catadioptric cross-sectional plane through its optical axis the refractive light output structure comprises a concave refractive surface arranged to provide negative optical power.

42. An illumination apparatus according to claim 1, wherein in at least one catadioptric cross-sectional plane the refractive light output structure comprises a plurality of pairs of oppositely inclined transmissive light deflecting facets.

43. An illumination apparatus according to claim 42 wherein for each catadioptric optical element the plurality of pairs of oppositely inclined transmissive light deflecting facets are circularly or elliptically symmetric in the plane of the transmissive output surface about the optical axis of the catadioptric optical element.

44. An illumination apparatus according to claim 1, further comprising a reflective polariser arranged to provide polarisation recirculation of light reflected from the reflective surface of the catadioptric optical element.

45. An illumination apparatus according to claim 1, wherein the ratio of luminous intensity half maximum solid angle of the output light cone to the luminous intensity half maximum solid angle of a Lambertian light source is less than 1, preferably less than 50%, more preferably less than 25% and most preferably less than 10%.

46. An illumination apparatus according to claim 1, further comprising a wavelength conversion layer.

47. An illumination apparatus according to claim 46 wherein the wavelength conversion layer is arranged between the LEDs of the plurality of LEDs and the reflective surface of each catadioptric optical element.

48. An illumination apparatus according to claim 46 wherein the wavelength conversion layer is arranged to receive light from the catadioptric optical array.

49. An illumination apparatus according to claim 1, wherein the electrodes of each of the LEDs of the plurality LEDs are respectively connected to one column addressing electrode and one row addressing electrode.

50. An illumination apparatus according to claim 1, further comprising an integrated circuit controlling one or more LEDs and located within the LED array.

51. An illumination apparatus according to claim 50 wherein the integrated circuit comprises a storage or memory or latching function.

52. An illumination apparatus according to claim 1, wherein the LEDs of the plurality of LEDs are from a monolithic wafer arranged in an array with their original monolithic wafer positions and orientations relative to each other preserved; and wherein in at least one direction, for at least one pair of the plurality of LEDs in the at least one direction, for each respective pair there was at least one respective LED in the monolithic wafer that was positioned in the monolithic wafer between the pair of LEDs in the at least one direction and that is not positioned between them in the array of LEDs.

53. An illumination apparatus according to claim 1, wherein the LEDs of the plurality of LEDs are micro-LEDs of width or diameter less than 300 micrometres, preferably less than 200 micrometres and more preferably less than 100 micrometres.

54. An illumination apparatus according to claim 1, wherein in the at least one catadioptric cross-sectional plane the distance between the transmissive output surface and reflective surface is less than 750 micrometres, preferably less than 500 micrometres and more preferably less than 250 micrometres.

55. A display apparatus comprising the illumination apparatus of claim 1 and a transmissive spatial light modulator arranged to receive light that has transmitted through the transmissive LED support substrate.

56. A backlight apparatus for a liquid crystal display comprising the illumination apparatus of claim 1.

* * * * *